US012681208B1

(12) United States Patent
Clark et al.

(10) Patent No.: US 12,681,208 B1
(45) Date of Patent: ***Jul. 14, 2026

(54) METHOD AND APPARATUS FOR MEASURING OPTICAL TURBULENCE USING AN UNMANNED AERIAL VEHICLE

(71) Applicant: BlueHalo, LLC, Huntsville, AL (US)

(72) Inventors: Alexis Henry Clark, Owens Crossroads, AL (US); Levi Judah Smolin, Huntsville, AL (US)

(73) Assignee: BlueHalo, LLC, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/039,728

(22) Filed: Jan. 28, 2025

Related U.S. Application Data

(63) Continuation of application No. 17/718,580, filed on Apr. 12, 2022, now Pat. No. 12,253,649.

(Continued)

(51) Int. Cl.
*G01W 1/00* (2006.01)
*B64U 10/13* (2023.01)
(Continued)

(52) U.S. Cl.
CPC .............. *G01W 1/00* (2013.01); *G01K 1/026* (2013.01); *G01K 1/14* (2013.01); *G01K 3/08* (2013.01); *G01P 5/00* (2013.01); *B64U 10/13* (2023.01); *B64U 2101/35* (2023.01); *B64U 2201/20* (2023.01); *G01W 2001/003* (2013.01)

(58) Field of Classification Search
CPC .............. G01W 1/00; G01W 2001/003; B64C 39/024; G01K 1/026; G01K 1/14; G01K 3/08; G01P 5/00; B64U 10/13; B64U 2101/36; B64U 2201/20
See application file for complete search history.

(56) References Cited

U.S. PATENT DOCUMENTS

| | | | |
|---|---|---|---|
| 3,465,339 A | 9/1969 | Marner | |
| 3,665,467 A | 5/1972 | Haroules et al. | |

(Continued)

FOREIGN PATENT DOCUMENTS

| | | | | |
|---|---|---|---|---|
| CN | 108693377 A | | 10/2018 | |
| CN | 112525826 A | * | 3/2021 | ................ G01P 5/24 |

(Continued)

*Primary Examiner* — Yossef Korang-Beheshti
(74) *Attorney, Agent, or Firm* — Amster, Rothstein & Ebenstein LLP

(57) ABSTRACT

A method and apparatus for measuring optical turbulence using an unmanned aerial vehicle are provided. The unmanned aerial vehicle may include a central body, at least one motor operatively connected to the central body, a mounting element, a three-dimensional anemometer mounted on the mounting element, a first differential temperature sensor mounted on the mounting element, a second differential temperature sensor mounted to the mounting element, and a base mounted to the central body via a payload mounting interface including a first barometric pressure sensor, a central processing board, memory operatively connected to the central processing board, and a processor configured to generate refractive-index structure coefficient information.

21 Claims, 39 Drawing Sheets
(4 of 39 Drawing Sheet(s) Filed in Color)

Related U.S. Application Data

(60) Provisional application No. 63/260,042, filed on Aug. 6, 2021.

(51) Int. Cl.
| | |
|---|---|
| *B64U 101/35* | (2023.01) |
| *G01K 1/02* | (2021.01) |
| *G01K 1/14* | (2021.01) |
| *G01K 3/08* | (2006.01) |
| *G01P 5/00* | (2006.01) |

(56) References Cited

U.S. PATENT DOCUMENTS

| | | | |
|---|---|---|---|
| 5,639,954 A | 6/1997 | Crothers et al. | |
| 5,639,964 A | 6/1997 | Djorup | |
| 12,253,649 B1 * | 3/2025 | Clark | G01K 1/026 |
| 2009/0257067 A1 | 10/2009 | Chapman et al. | |
| 2013/0314694 A1 | 11/2013 | Tchoryk, Jr. et al. | |
| 2018/0348375 A1 * | 12/2018 | Smolin | G01S 17/95 |
| 2019/0154874 A1 * | 5/2019 | Shams | B64C 3/54 |
| 2019/0377093 A1 | 12/2019 | Wiebold et al. | |
| 2021/0125348 A1 | 4/2021 | Bose-Pillai et al. | |
| 2022/0091007 A1 | 3/2022 | Fan et al. | |

FOREIGN PATENT DOCUMENTS

| | | | |
|---|---|---|---|
| GB | 1164688 A | 9/1969 | |
| RU | 2735909 C1 | 11/2020 | |
| WO | 1992004698 A1 | 3/1992 | |
| WO | 1997033187 A1 | 9/1997 | |
| WO | 2000007677 A1 | 2/2000 | |
| WO | 2012105973 A1 | 8/2012 | |
| WO | 2020257859 A1 | 12/2020 | |

* cited by examiner

524

526

530

528

522

520

550

520

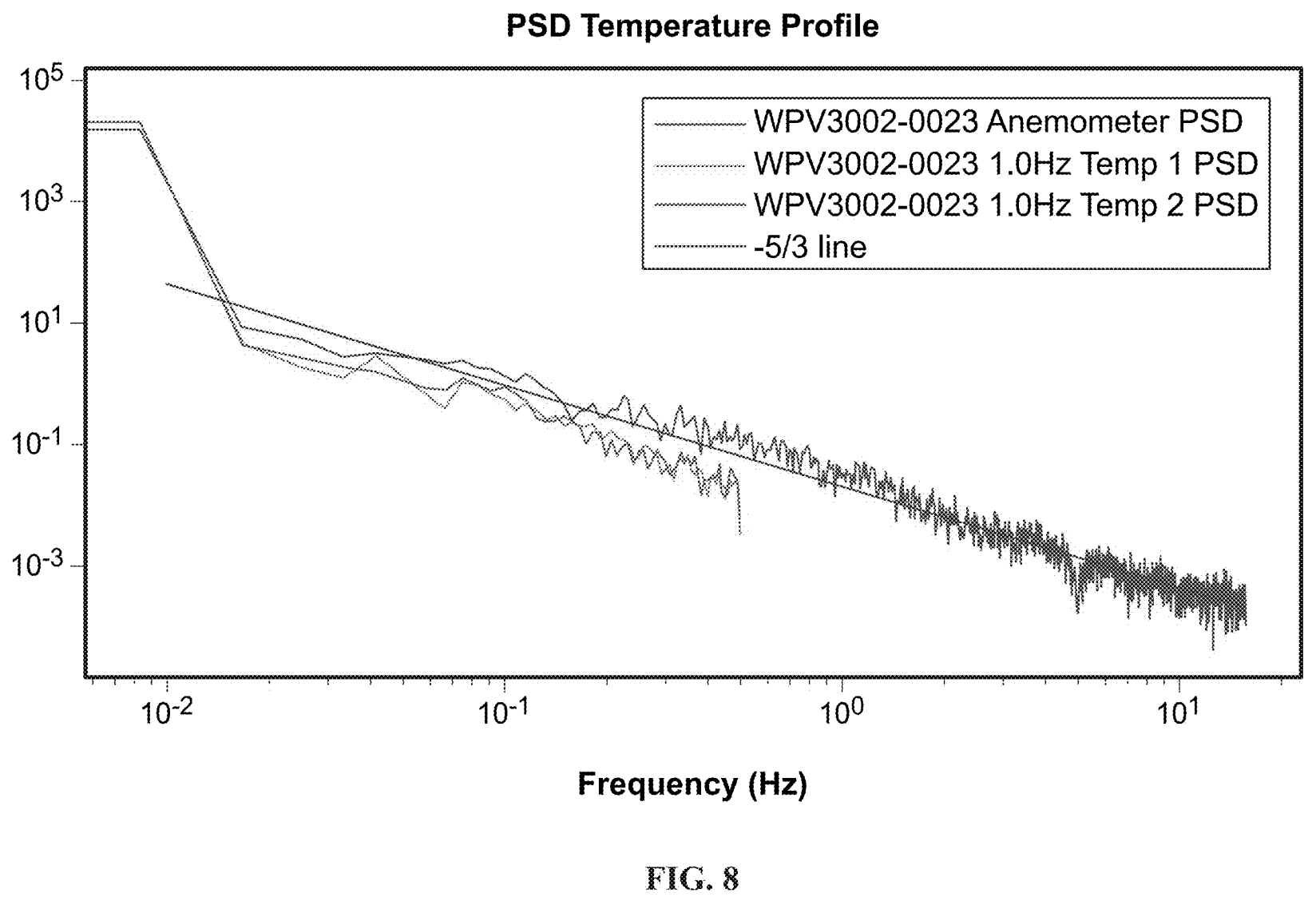

PSD Temperature Profile

Legend:
- WPV3002-0023 Anemometer PSD
- WPV3002-0023 1.0Hz Temp 1 PSD
- WPV3002-0023 1.0Hz Temp 2 PSD
- -5/3 line Frequency (Hz)

FIG. 8

S1002: generating, by a first temperature sensor, first temperature measurement information at a first sampling rate, the first temperature measurement information associated with a first temperature at the first temperature sensor during a first period of time defined by a first start time and a first end time

S1004: generating, by a first wind speed sensor, first wind speed measurement information at the first sampling rate associated with a first wind speed at the first wind speed sensor during the first period of time

S1006: generating, by a first barometric pressure sensor, first barometric pressure measurement information at the first sampling rate, associated with a first barometric pressure at the first barometric pressure sensor during the first period of time

S1008: transmitting, from the first temperature sensor to the central processing board, the first temperature measurement information generated during the first period of time

S1010: transmitting, from the first wind speed sensor to the central processing board, the first wind speed measurement information generated during the first period of time

S1012: transmitting, from the first barometric pressure sensor to the central processing board, the first barometric pressure measurement information generated during the first period of time

S1014: storing the first temperature measurement information, the first wind speed measurement information, and the first barometric pressure measurement information

S1016: obtaining, by a digital software system from the memory, the first temperature measurement information, the first wind speed measurement information, and the first barometric pressure measurement information

CONTINUED WITH FIG. 11B

FIG. 11A

CONTINUED FROM FIG. 11A

S1018A: determining first power spectral density information associated with a plurality of frequencies based at least on the first temperature measurement information

S1018B: determining second power spectral density information associated with the plurality of frequencies based at least on the first wind speed measurement information

S1020: determining, a first sensor cutoff frequency associated with at least one of the first temperature sensor and the first wind speed sensor S1022: decimating, by the digital software system, the first temperature measurement information, the first wind speed measurement information, and the first barometric pressure measurement information generated at the first sampling rate to a second sampling rate during the first period of time based at least on the first power spectral density information, the second power spectral density information, and the first sensor cutoff frequency

S1024: calculating, by the digital software system a first estimated sensor spacing value based at least on the first wind speed measurement information, and the first start time and the first end time associated with the first period of time

S1026: determining, by the digital software system, a first temperature structure coefficient based at least on the first estimated sensor spacing value and the first temperature measurement information during the first period of time

S1028: determining, by the digital software system, a first refractive-index structure coefficient indicative of optical turbulence during the first period of time based at least on the first temperature structure coefficient, the first temperature measurement information, and the first barometric pressure measurement information

S1030: transmitting, by the digital software system to an optical system, the first refractive-index structure coefficient

FIG. 11B

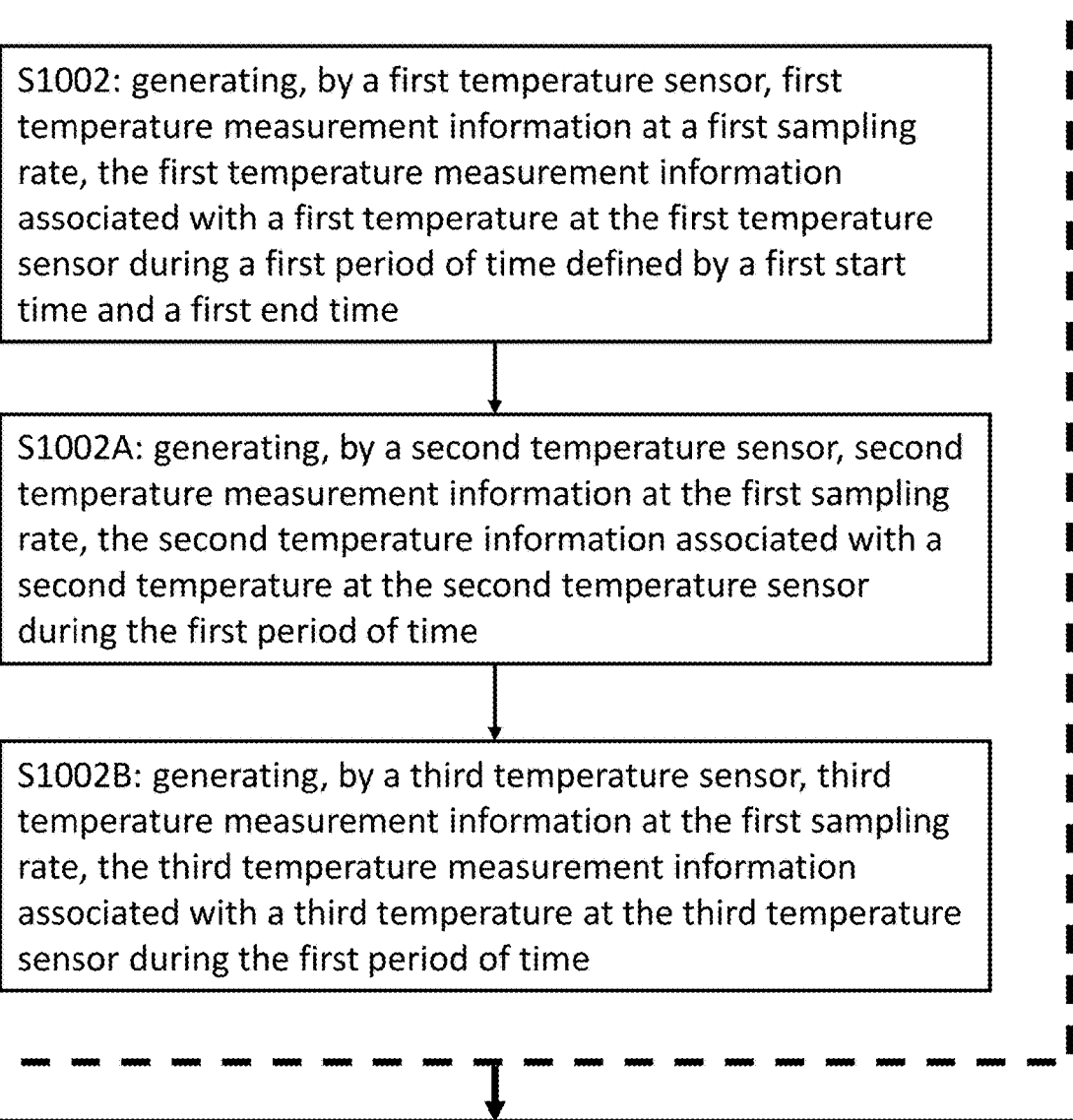

S1002: generating, by a first temperature sensor, first temperature measurement information at a first sampling rate, the first temperature measurement information associated with a first temperature at the first temperature sensor during a first period of time defined by a first start time and a first end time S1002A: generating, by a second temperature sensor, second temperature measurement information at the first sampling rate, the second temperature information associated with a second temperature at the second temperature sensor during the first period of time S1002B: generating, by a third temperature sensor, third temperature measurement information at the first sampling rate, the third temperature measurement information associated with a third temperature at the third temperature sensor during the first period of time CONTINUED WITH S1004 of FIG. 11A

FIG. 11A-1

CONTINUED FROM S1006 of FIG. 11A

S1008:  transmitting, from the first temperature sensor to the central processing board, the first temperature measurement information generated during the first period of time S1008A: transmitting, from the second temperature sensor to the central processing board, the second temperature measurement information generated during the first period of time S1008B: transmitting, from the third temperature sensor to the central processing board, the third temperature measurement information generated during the first period of time CONTINUED WITH S1010 of FIG. 11A

FIG. 11A-2

CONTINUED FROM S1012 of FIG. 11A

S1014: storing the first temperature measurement information, the first wind speed measurement information, and the first barometric pressure measurement information S1014A: storing the second temperature measurement information S1014B: storing the third temperature measurement information CONTINUED WITH S1016 of FIG. 11A CONTINUED FROM S1016 of FIG. 11A S1018A: determining, by the digital software system first power spectral density information associated with a plurality of frequencies based at least on the first temperature measurement information S1018B: determining, by the digital software system second power spectral density information associated with the plurality of frequencies based at least on the first wind speed measurement information S1018C: determining, by the digital software system, third power spectral density information associated with the plurality of frequencies based at least on the second temperature measurement information S1018D: determining, by the digital software system, fourth power spectral density information associated with the plurality of frequencies based at least on the third temperature measurement information CONTINUED WITH S1020 of FIG. 11B

FIG. 11A-5

CONTINUED FROM S1020 of FIG. 11B

S1022: decimating, by the digital software system, the first temperature measurement information, the first wind speed measurement information, and the first barometric pressure measurement information generated at the first sampling rate to a second sampling rate during the first period of time based at least on the first power spectral density information, the second power spectral density information, and the first sensor cutoff frequency S1022A: decimating, by the digital software system, the second temperature measurement information generated at the first sampling rate to the second sampling rate based at least on the third power spectral density information S1022B: decimating, by the digital software system, the third temperature measurement information generated at the first sampling rate to the second sampling rate based at least on the fourth power spectral density information CONTINUED WITH S1024 of FIG. 11B

FIG. 11A-6

CONTINUED FROM S1024 of FIG. 11B

S1026: determining, by the digital software system, a first temperature structure coefficient based at least on the first estimated sensor spacing value and the first temperature measurement information during the first period of time S1026A: determining a second temperature structure coefficient based at least on the first estimated sensor spacing value and the second temperature measurement information during the first period of time S1026B: determining a third temperature structure coefficient based at least on the predetermined sensor spacing value, the second temperature measurement information, and the third temperature measurement information S1026C: determining a fourth temperature structure coefficient based at least on the first estimated sensor spacing value and the third temperature measurement information during the first period of time

CONTINUED WITH S1028 of FIG. 11B

FIG. 11A-7

CONTINUED FROM S1020 of FIG. 11B

S1028: determining, by the digital software system, a first refractive-index structure coefficient indicative of optical turbulence during the first period of time based at least on the first temperature structure coefficient, the first temperature measurement information, and the first barometric pressure measurement information

OR

S1028-2: determining, by the digital software system, the first refractive-index structure coefficient indicative of optical turbulence during the first period of time based at least on the first temperature structure coefficient, the second temperature measurement information, and the first barometric pressure measurement information S1028A-1: determining, by the digital software system, a second refractive-index structure coefficient indicative of optical turbulence during the first period of time based at least on the second temperature structure coefficient, the second temperature measurement information, and the first barometric pressure measurement information

OR

S1028A-2: determining, by the digital software system, the second refractive-index structure coefficient indicative of optical turbulence during the first period of time based at least on the second temperature structure coefficient, the first temperature measurement information, and the first barometric pressure measurement information CONTINUED WITH S1028B-1 of FIG. 11A-9

FIG. 11A-8

CONTINUED FROM S1028A-2 of FIG. 11A-8

S1028B-1: determining, by the digital software system, a third refractive-index structure coefficient indicative of optical turbulence during the first period of time based at least on the third temperature structure coefficient, the first temperature measurement information, and the first barometric pressure measurement information

OR

S1028B-2: determining, by the digital software system, the third refractive-index structure coefficient indicative of optical turbulence during the first period of time based at least on the third temperature structure coefficient, the second temperature measurement information, and the first barometric pressure measurement information

OR

S1028B-3: determining, by the digital software system, the third refractive-index structure coefficient indicative of optical turbulence during the first period of time based at least on the third temperature structure coefficient, the third temperature measurement information, and the first barometric pressure measurement information

CONTINUED WITH S1028C-1 of FIG. 11A-10

FIG. 11A-9

CONTINUED FROM S1028B-3 of FIG. 11A-9

S1028C-1: determining, by the digital software system, a fourth refractive-index structure coefficient indicative of optical turbulence during the first period of time based at least on the fourth temperature structure coefficient, the third temperature measurement information, and the first barometric pressure measurement information

OR

S1028C-2: determining, by the digital software system, the fourth refractive-index structure coefficient indicative of optical turbulence during the first period of time based at least on the fourth temperature structure coefficient, the first temperature measurement information, and the first barometric pressure measurement information

OR

S1028C-3: determining, by the digital software system, the fourth refractive-index structure coefficient indicative of optical turbulence during the first period of time based at least on the fourth temperature structure coefficient, the second temperature measurement information, and the first barometric pressure measurement information

CONTINUED WITH S1030 of FIG. 11B

FIG. 11A-10

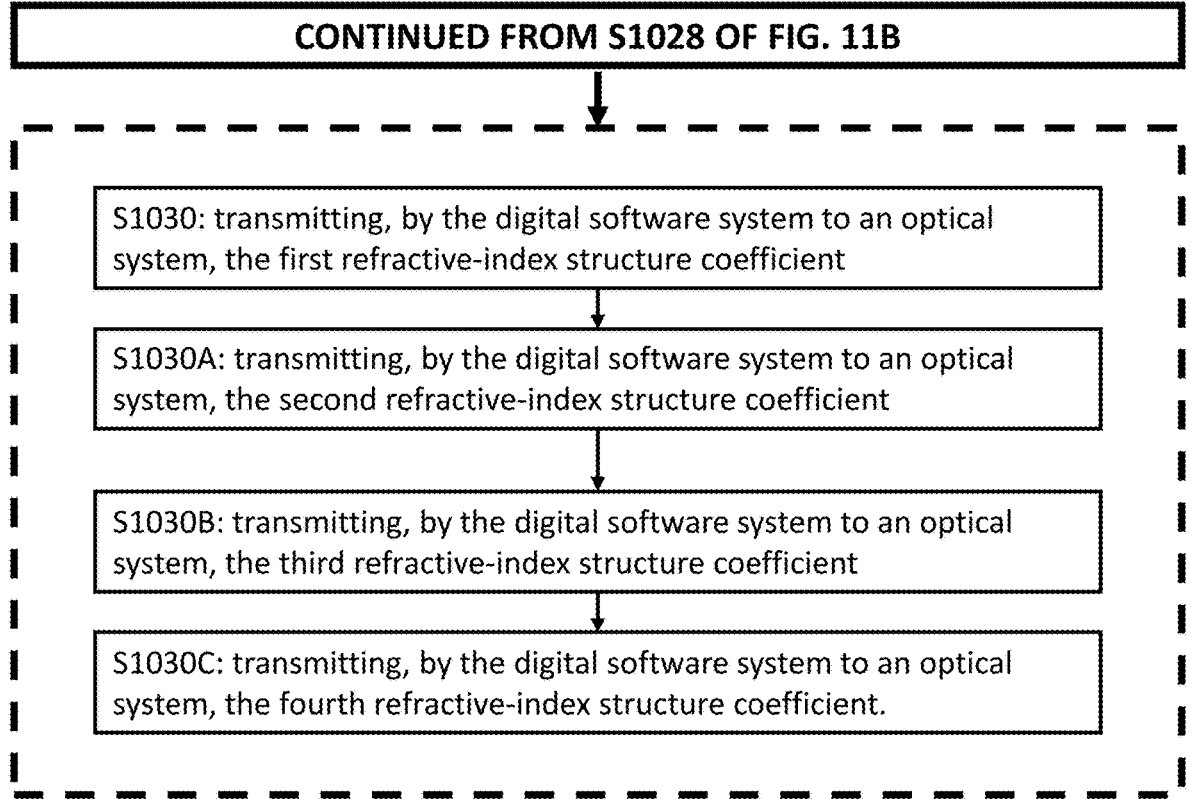

CONTINUED FROM S1028 OF FIG. 11B

S1030: transmitting, by the digital software system to an optical system, the first refractive-index structure coefficient S1030A: transmitting, by the digital software system to an optical system, the second refractive-index structure coefficient S1030B: transmitting, by the digital software system to an optical system, the third refractive-index structure coefficient S1030C: transmitting, by the digital software system to an optical system, the fourth refractive-index structure coefficient.

FIG. 11A-11

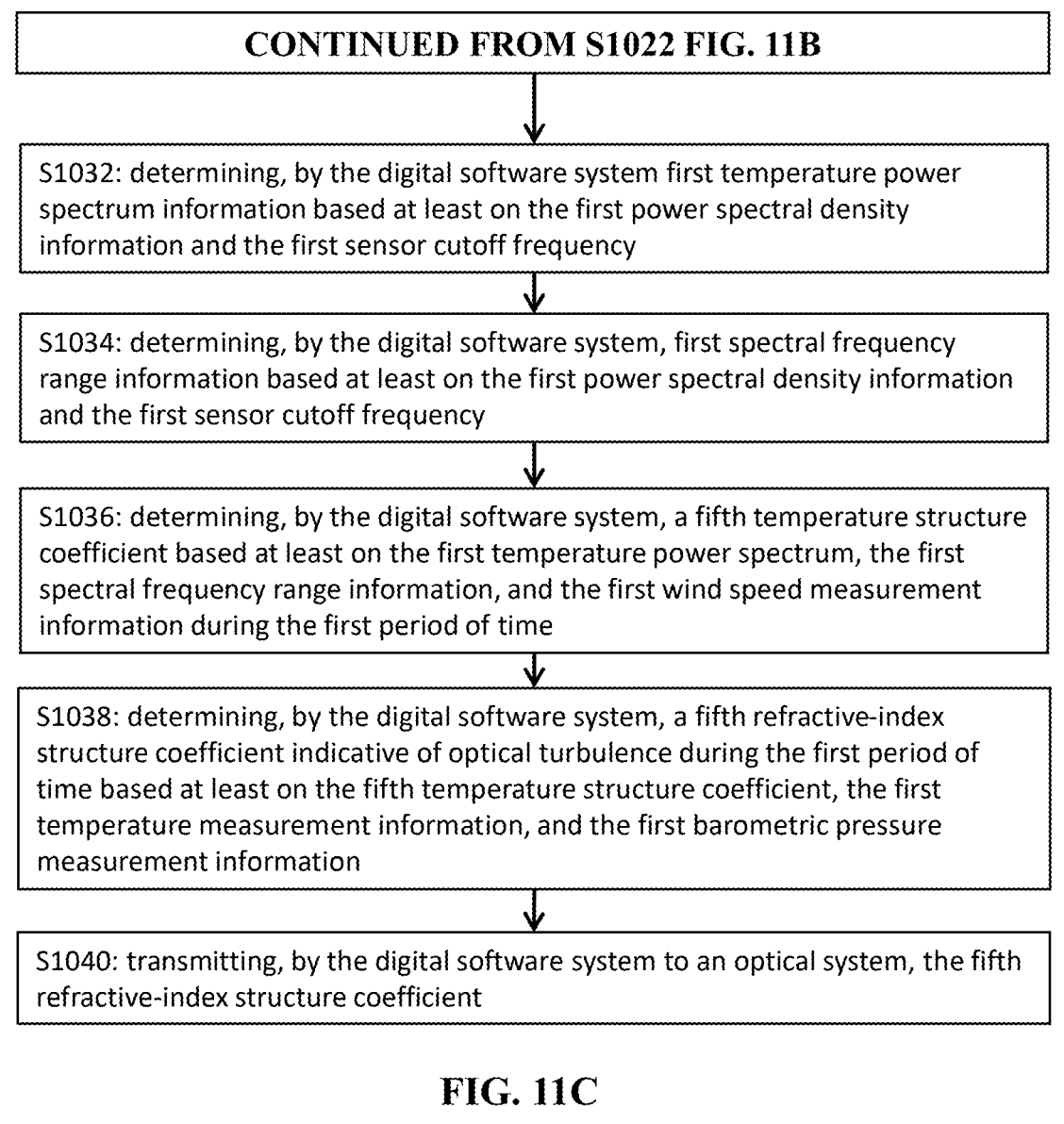

| CONTINUED FROM S1022 FIG. 11B |
| --- |

↓

| S1032: determining, by the digital software system first temperature power spectrum information based at least on the first power spectral density information and the first sensor cutoff frequency |
| --- |

↓

| S1034: determining, by the digital software system, first spectral frequency range information based at least on the first power spectral density information and the first sensor cutoff frequency |
| --- |

↓

| S1036: determining, by the digital software system, a fifth temperature structure coefficient based at least on the first temperature power spectrum, the first spectral frequency range information, and the first wind speed measurement information during the first period of time |
| --- |

↓

| S1038: determining, by the digital software system, a fifth refractive-index structure coefficient indicative of optical turbulence during the first period of time based at least on the fifth temperature structure coefficient, the first temperature measurement information, and the first barometric pressure measurement information |
| --- |

↓

| S1040: transmitting, by the digital software system to an optical system, the fifth refractive-index structure coefficient |
| --- |

FIG. 11C

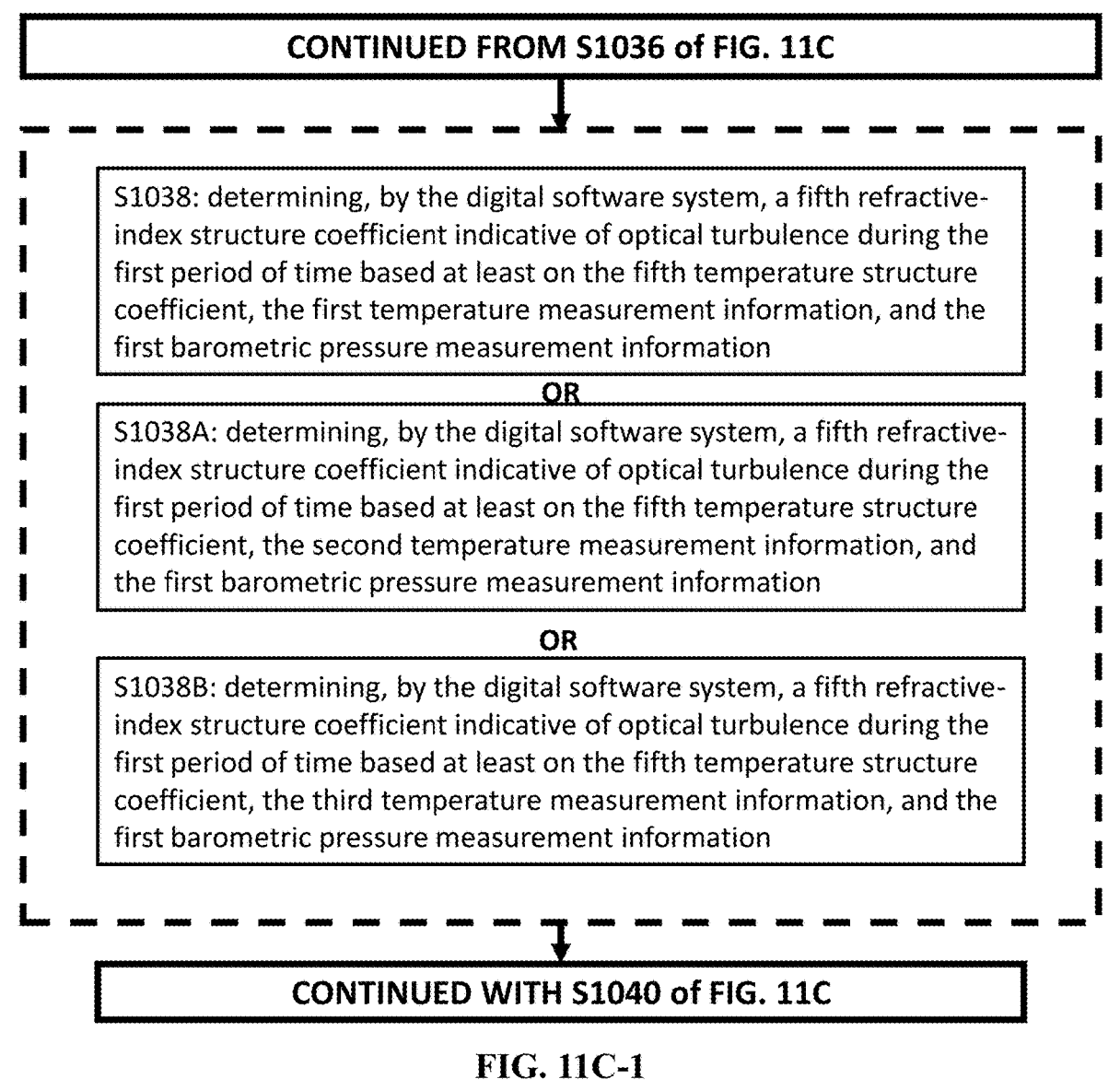

CONTINUED FROM S1036 of FIG. 11C

S1038: determining, by the digital software system, a fifth refractive-index structure coefficient indicative of optical turbulence during the first period of time based at least on the fifth temperature structure coefficient, the first temperature measurement information, and the first barometric pressure measurement information

OR

S1038A: determining, by the digital software system, a fifth refractive-index structure coefficient indicative of optical turbulence during the first period of time based at least on the fifth temperature structure coefficient, the second temperature measurement information, and the first barometric pressure measurement information

OR

S1038B: determining, by the digital software system, a fifth refractive-index structure coefficient indicative of optical turbulence during the first period of time based at least on the fifth temperature structure coefficient, the third temperature measurement information, and the first barometric pressure measurement information

CONTINUED WITH S1040 of FIG. 11C

FIG. 11C-1

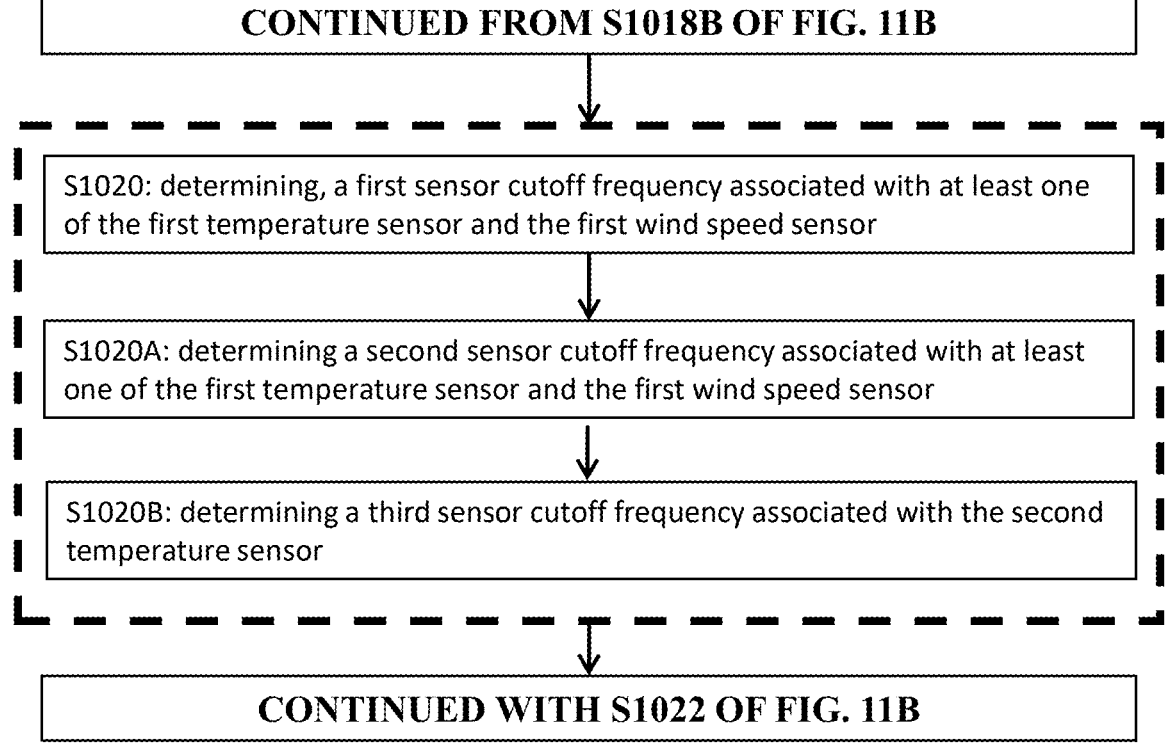

CONTINUED FROM S1018B OF FIG. 11B

S1020: determining, a first sensor cutoff frequency associated with at least one of the first temperature sensor and the first wind speed sensor S1020A: determining a second sensor cutoff frequency associated with at least one of the first temperature sensor and the first wind speed sensor S1020B: determining a third sensor cutoff frequency associated with the second temperature sensor

CONTINUED WITH S1022 OF FIG. 11B

FIG. 11D

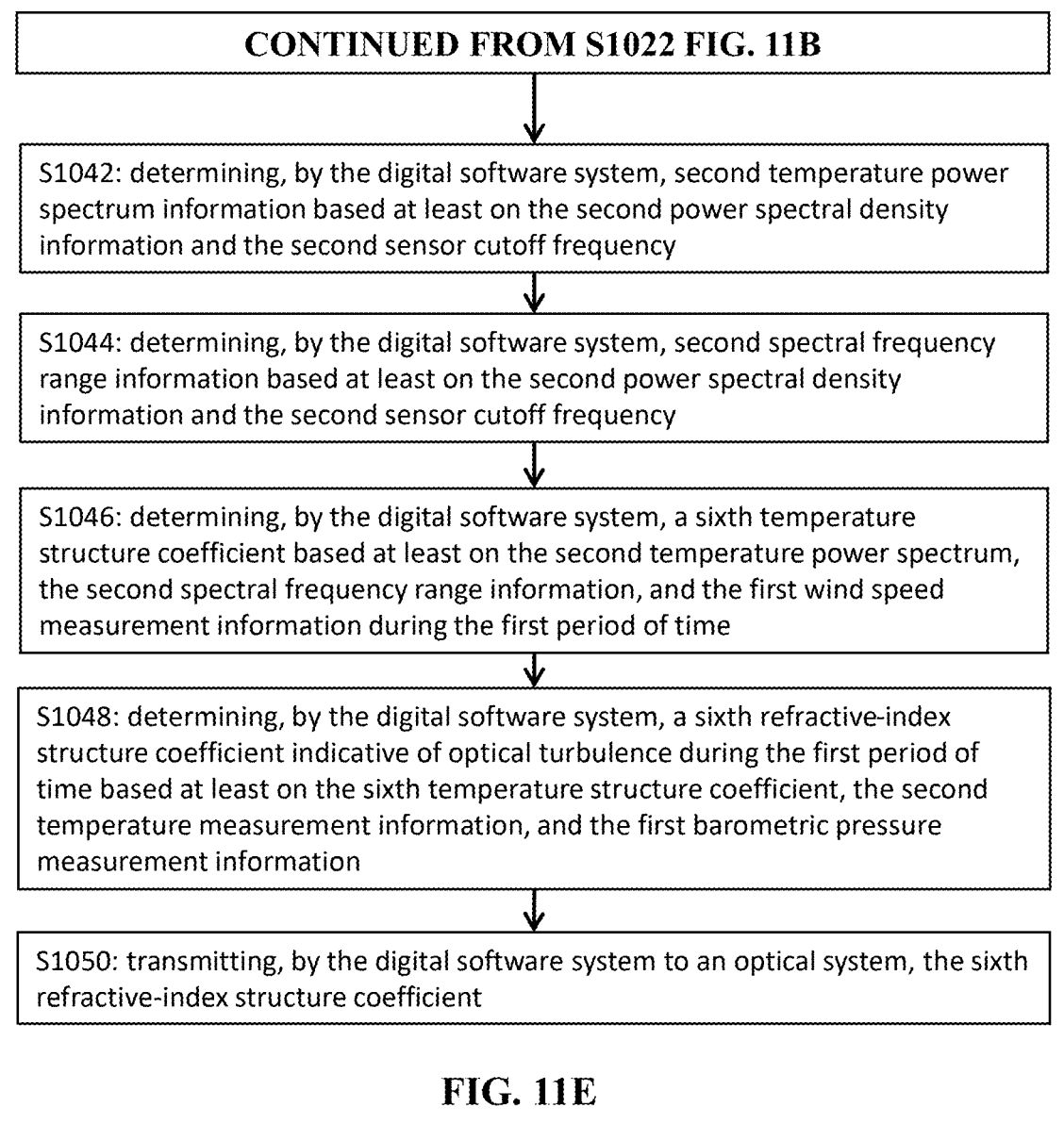

| CONTINUED FROM S1022 FIG. 11B |
|---|

↓

| S1042: determining, by the digital software system, second temperature power spectrum information based at least on the second power spectral density information and the second sensor cutoff frequency |
|---|

↓

| S1044: determining, by the digital software system, second spectral frequency range information based at least on the second power spectral density information and the second sensor cutoff frequency |
|---|

↓

| S1046: determining, by the digital software system, a sixth temperature structure coefficient based at least on the second temperature power spectrum, the second spectral frequency range information, and the first wind speed measurement information during the first period of time |
|---|

↓

| S1048: determining, by the digital software system, a sixth refractive-index structure coefficient indicative of optical turbulence during the first period of time based at least on the sixth temperature structure coefficient, the second temperature measurement information, and the first barometric pressure measurement information |
|---|

↓

| S1050: transmitting, by the digital software system to an optical system, the sixth refractive-index structure coefficient |
|---|

FIG. 11E

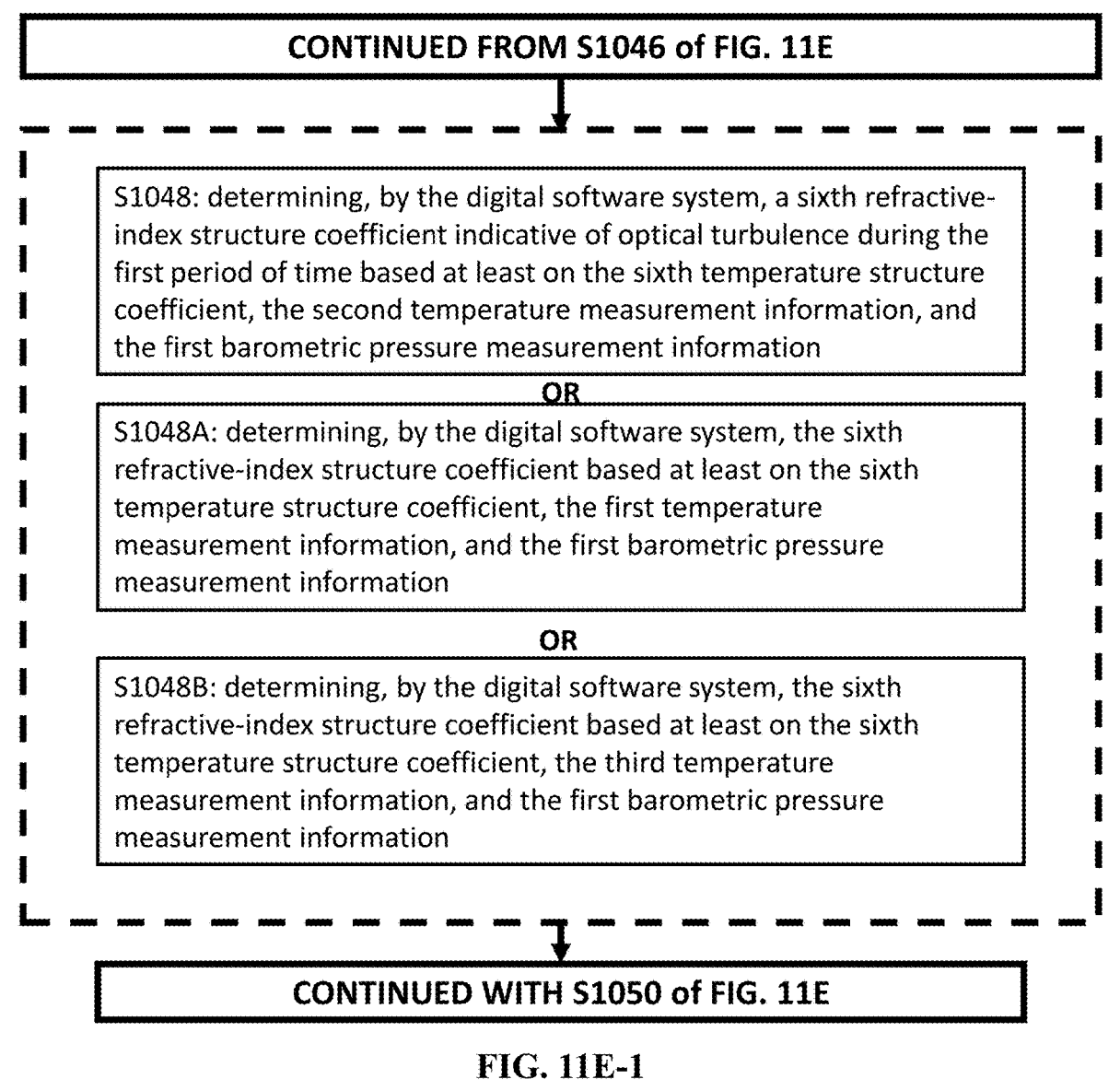

CONTINUED FROM S1046 of FIG. 11E

S1048: determining, by the digital software system, a sixth refractive-index structure coefficient indicative of optical turbulence during the first period of time based at least on the sixth temperature structure coefficient, the second temperature measurement information, and the first barometric pressure measurement information

OR

S1048A: determining, by the digital software system, the sixth refractive-index structure coefficient based at least on the sixth temperature structure coefficient, the first temperature measurement information, and the first barometric pressure measurement information

OR

S1048B: determining, by the digital software system, the sixth refractive-index structure coefficient based at least on the sixth temperature structure coefficient, the third temperature measurement information, and the first barometric pressure measurement information

CONTINUED WITH S1050 of FIG. 11E

FIG. 11E-1

CONTINUED FROM S1022 FIG. 11B $\downarrow$

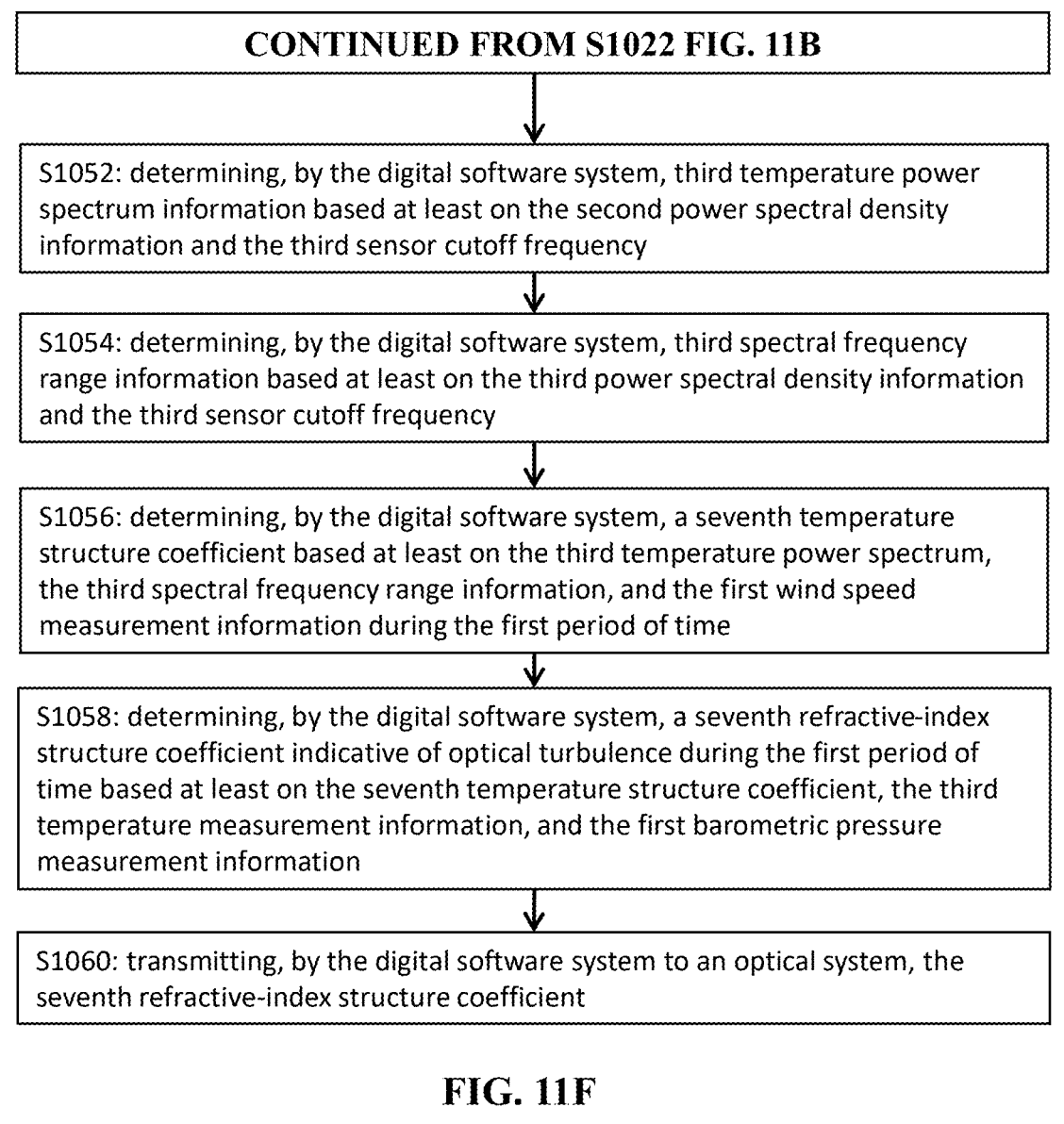

S1052: determining, by the digital software system, third temperature power spectrum information based at least on the second power spectral density information and the third sensor cutoff frequency $\downarrow$ S1054: determining, by the digital software system, third spectral frequency range information based at least on the third power spectral density information and the third sensor cutoff frequency $\downarrow$ S1056: determining, by the digital software system, a seventh temperature structure coefficient based at least on the third temperature power spectrum, the third spectral frequency range information, and the first wind speed measurement information during the first period of time $\downarrow$ S1058: determining, by the digital software system, a seventh refractive-index structure coefficient indicative of optical turbulence during the first period of time based at least on the seventh temperature structure coefficient, the third temperature measurement information, and the first barometric pressure measurement information $\downarrow$ S1060: transmitting, by the digital software system to an optical system, the seventh refractive-index structure coefficient

FIG. 11F

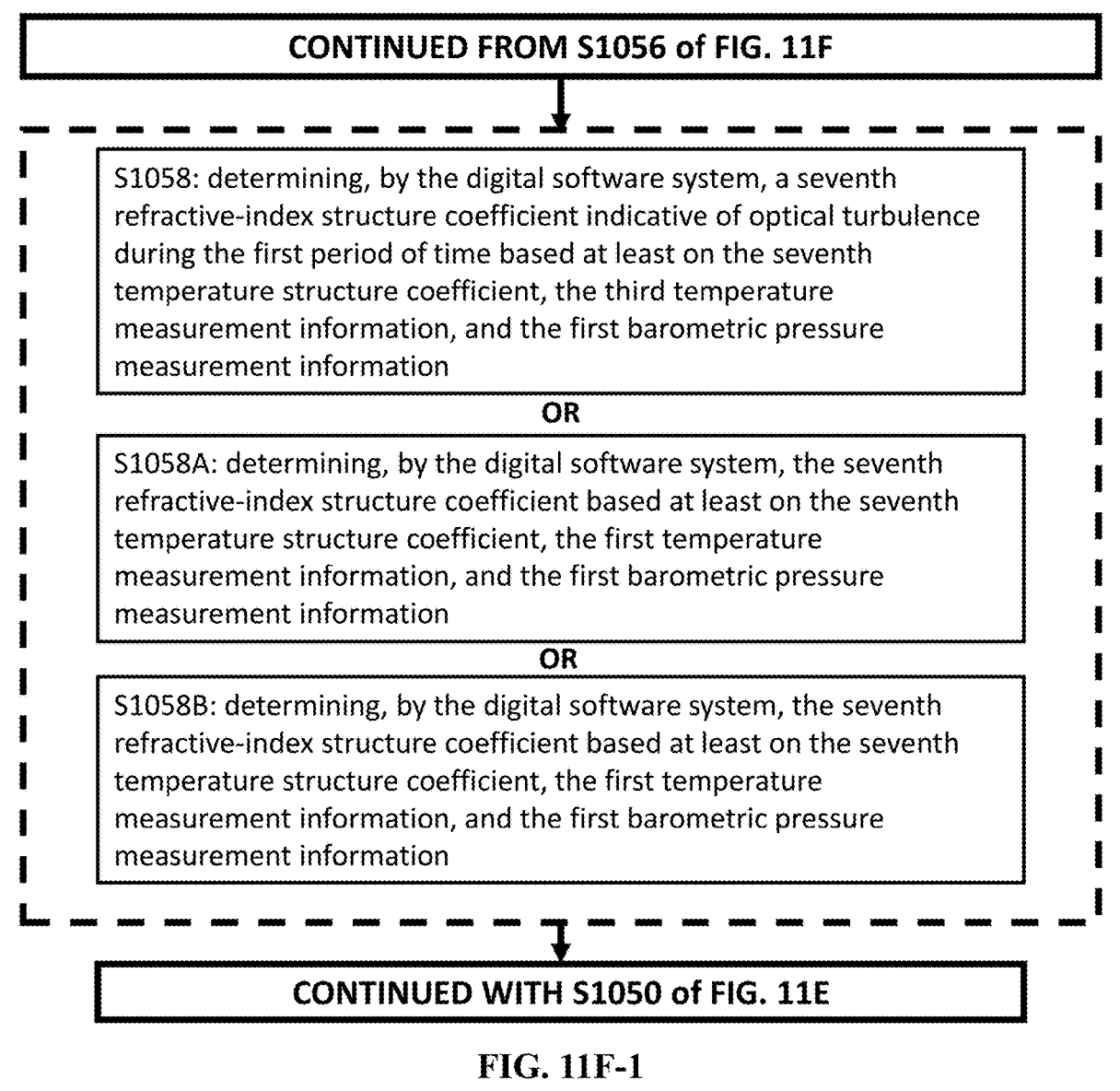

CONTINUED FROM S1056 of FIG. 11F

S1058: determining, by the digital software system, a seventh refractive-index structure coefficient indicative of optical turbulence during the first period of time based at least on the seventh temperature structure coefficient, the third temperature measurement information, and the first barometric pressure measurement information

OR

S1058A: determining, by the digital software system, the seventh refractive-index structure coefficient based at least on the seventh temperature structure coefficient, the first temperature measurement information, and the first barometric pressure measurement information

OR

S1058B: determining, by the digital software system, the seventh refractive-index structure coefficient based at least on the seventh temperature structure coefficient, the first temperature measurement information, and the first barometric pressure measurement information

CONTINUED WITH S1050 of FIG. 11E

FIG. 11F-1

Full Sample Rate Data

| | A | B | C | D | E | F | G | H | I | J | K | L | M | N | O | P | Q | R | S | T | U | V | W | X | Y | Z | AA | AB | AC |
|---|---|---|---|---|---|---|---|---|---|---|---|---|---|---|---|---|---|---|---|---|---|---|---|---|---|---|---|---|---|
| 13 | 0 | 0 | 0 | 0 | 0 | 0 | 0 | 0 | 0 | 0 | 0 | 40660 | 23.131 | 23.189 | 4.37 | 242 | 3.78 | 2.05 | 0.78 | 20.562 | 82.79 | 1001.11 | -4.5 | 3.3 | 14 | 190.25 | 1106.45 | 264.498 | 56700.1 |
| 14 | 0 | 0 | 0 | 2000 | 0 | 0 | 0 | 0 | 0 | 0 | 0 | 40690 | 23.136 | 23.191 | 3.72 | 244 | 3.28 | 1.63 | 0.65 | 20.543 | 84.81 | 1001.13 | -6.2 | 2.6 | 8 | 190.25 | 1107.95 | 264.52 | 48275.5 |
| 15 | 0 | 0 | 0 | 0 | 0 | 0 | 0 | 0 | 0 | 0 | 0 | 40722 | 23.123 | 23.168 | 4.69 | 242 | 4.07 | 2.18 | 0.83 | 20.774 | 83.61 | 1001.12 | -6.2 | 2.6 | 11 | 189.625 | 1108.4 | 264.31 | 60775.5 |
| 16 | 0 | 0 | 0 | 2000 | 0 | 0 | 0 | 0 | 0 | 0 | 0 | 40752 | 23.115 | 23.162 | 3.72 | 241 | 3.17 | 1.77 | 0.82 | 20.501 | 85.03 | 1001.11 | -6.2 | 2.6 | 11 | 189.625 | 1105.85 | 264.553 | 48284.7 |
| 17 | 0 | 0 | 0 | 0 | 0 | 0 | 0 | 0 | 0 | 0 | 0 | 40782 | 23.099 | 23.139 | 3.82 | 243 | 3.35 | 1.67 | 0.8 | 20.182 | 86.98 | 1001.11 | -6.5 | 2.2 | 9 | 189.625 | 1106.4 | 264.84 | 49677.2 |
| 18 | 0 | 0 | 0 | 2000 | 0 | 0 | 0 | 0 | 0 | 0 | 0 | 40812 | 23.084 | 23.134 | 4 | 243 | 3.39 | 1.75 | 1.18 | 20.786 | 83.63 | 1001.11 | -6.5 | 2.2 | 10 | 189.625 | 1108 | 264.296 | 51822.6 |
| 19 | 34.7952 | -86.376 | 212 | 12 | 2021 | 4 | 20 | 19 | 22 | 0 | 45 | 40844 | 23.063 | 23.11 | 3.91 | 241 | 3.33 | 1.88 | 0.83 | 20.642 | 84.37 | 1001.15 | -6.5 | 2.2 | 10 | 189.625 | 1108.6 | 264.436 | 50709.4 |
| 20 | 34.7952 | -86.376 | 212 | 12 | 2021 | 4 | 20 | 19 | 22 | 0 | 45 | 40874 | 23.063 | 23.089 | 3.59 | 246 | 3.23 | 1.46 | 0.55 | 20.515 | 85.03 | 1001.11 | -5.4 | 2.5 | 11 | 189.625 | 1108 | 264.54 | 46593.1 |
| 21 | 34.7952 | -86.376 | 212 | 12 | 2021 | 4 | 20 | 19 | 22 | 0 | 45 | 40905 | 23.026 | 23.031 | 4.62 | 238 | 3.84 | 2.43 | 0.81 | 20.496 | 85.14 | 1001.11 | -5.4 | 2.5 | 10 | 189.625 | 1107.45 | 264.557 | 59967.8 |
| 22 | 34.7952 | -86.376 | 212 | 12 | 2021 | 4 | 20 | 19 | 22 | 0 | 45 | 40937 | 23.021 | 23 | 4.17 | 242 | 3.66 | 1.91 | 0.62 | 20.411 | 85.68 | 1001.13 | -5.4 | 2.5 | 10 | 189.625 | 1108.2 | 264.634 | 54162.9 |
| 23 | 34.7952 | -86.376 | 212 | 12 | 2021 | 4 | 20 | 19 | 22 | 0 | 45 | 40967 | 23 | 22.976 | 3.86 | 247 | 3.51 | 1.51 | 0.58 | 20.732 | 83.91 | 1001.12 | -5.4 | 2.5 | 10 | 189.312 | 1107.9 | 264.35 | 50023.8 |
| 24 | 34.7952 | -86.376 | 212 | 12 | 2021 | 4 | 20 | 19 | 22 | 0 | 45 | 40997 | 22.989 | 22.963 | 4.08 | 246 | 3.68 | 1.62 | 0.71 | 20.641 | 84.3 | 1001.12 | -3.6 | 2.8 | 12 | 189.312 | 1109.3 | 264.429 | 52913.2 |
| 25 | 34.7952 | -86.376 | 212 | 12 | 2021 | 4 | 20 | 19 | 22 | 0 | 45 | 41030 | 22.979 | 22.968 | 4.56 | 243 | 4.02 | 2.06 | 0.57 | 20.459 | 85.42 | 1001.13 | -3.6 | 2.8 | 13 | 189.312 | 1110.1 | 264.596 | 59203 |
| 26 | 34.7952 | -86.376 | 212 | 12 | 2021 | 4 | 20 | 19 | 22 | 0 | 45 | 41060 | 22.947 | 22.942 | 4.11 | 239 | 3.51 | 2.07 | 0.56 | 20.539 | 84.91 | 1001.1 | -3.6 | 2.8 | 12 | 189.312 | 1110.15 | 264.516 | 53336.2 |

Data Decimated to 1Hz

| | A | B | C | D | E | F | G | H | I | J | K | L | M | N | O | P | Q | R | S | T | U | V | W | X | Y | Z | AA | AB | AC |
|---|---|---|---|---|---|---|---|---|---|---|---|---|---|---|---|---|---|---|---|---|---|---|---|---|---|---|---|---|---|
| 1 | 34.7952 | -86.376 | 211.9 | 12 | 2021 | 4 | 20 | 19 | 22 | 0 | 47 | 43465 | 23.425 | 23.393 | 2.79 | 222 | 1.87 | 2.0 | 0.13 | 21.545 | 79.75 | 1001.06 | -4.5 | 3.4 | 12 | 189.312 | 1117.4 | 263.602 | 35985.7 |
| 2 | 34.7952 | -86.376 | 212 | 12 | 2021 | 4 | 20 | 19 | 22 | 0 | 48 | 44452 | 23.648 | 23.68 | 3.07 | 207 | 1.4 | 2.73 | -0.15 | 21.428 | 80.24 | 1001.06 | -5.7 | 2.4 | 10 | 188.938 | 1120.55 | 263.707 | 39624.1 |
| 3 | 34.7952 | -86.376 | 212.1 | 12 | 2021 | 4 | 20 | 19 | 22 | 0 | 49 | 45434 | 24.244 | 24.375 | 2.92 | 242 | 2.58 | 1.38 | 0.04 | 21.667 | 79.08 | 1001.06 | -3.7 | 3.2 | 13 | 189.875 | 1122.05 | 263.493 | 37630.4 |
| 4 | 34.7952 | -86.376 | 212.1 | 12 | 2021 | 4 | 20 | 19 | 22 | 0 | 50 | 46395 | 24.546 | 24.454 | 3 | 233 | 2.38 | 1.8 | 0.29 | 22.427 | 75.43 | 1001.02 | -5.3 | 2.6 | 13 | 189.875 | 1121.65 | 262.805 | 38487.7 |
| 5 | 34.7952 | -86.376 | 212.2 | 12 | 2021 | 4 | 20 | 19 | 22 | 0 | 51 | 47396 | 24.793 | 24.958 | 2.79 | 264 | 2.59 | 0.27 | 1 | 22.223 | 76.28 | 1001.04 | -5 | 3.1 | 14 | 189.75 | 1123 | 262.992 | 35838.5 |
| 6 | 34.7952 | -86.376 | 212.2 | 12 | 2021 | 4 | 20 | 19 | 22 | 0 | 52 | 48380 | 24.375 | 24.538 | 1.39 | 261 | 1.38 | 0.22 | 0.33 | 22.123 | 76.75 | 1000.98 | -5.1 | 2.9 | 12 | 189.625 | 1121.95 | 263.065 | 17864.6 |
| 7 | 34.7952 | -86.376 | 212.1 | 12 | 2021 | 4 | 20 | 19 | 22 | 0 | 53 | 49368 | 24.955 | 25.205 | 2.97 | 251 | 2.81 | 0.96 | -0.02 | 22.21 | 76.27 | 1000.98 | -5.1 | 3.1 | 13 | 189.75 | 1117.35 | 262.988 | 38153.7 |
| 8 | 34.7952 | -86.376 | 212 | 12 | 2021 | 4 | 20 | 19 | 22 | 0 | 54 | 50356 | 24.861 | 25.236 | 1.16 | 216 | 0.67 | 0.91 | 0.25 | 22.727 | 73.91 | 1000.96 | -4.7 | 2.6 | 10 | 189.812 | 1117.1 | 262.523 | 14854.6 |
| 9 | 34.7952 | -86.376 | 212 | 12 | 2021 | 4 | 20 | 19 | 22 | 0 | 55 | 51341 | 23.821 | 24.464 | 4.29 | 216 | 2.54 | 3.45 | -0.15 | 20.901 | 82.55 | 1000.98 | -5 | 2.8 | 10 | 189.125 | 1114.15 | 264.158 | 55550.3 |
| 10 | 34.7952 | -86.376 | 211.9 | 12 | 2021 | 4 | 20 | 19 | 22 | 0 | 56 | 52328 | 23.194 | 23.462 | 3.48 | 206 | 1.52 | 3.13 | -0.17 | 21.705 | 78.66 | 1000.96 | -4.9 | 3.2 | 12 | 189.312 | 1117.3 | 263.43 | 44837.3 |
| 11 | 34.7952 | -86.376 | 211.8 | 12 | 2021 | 4 | 20 | 19 | 22 | 0 | 57 | 53322 | 23.446 | 23.165 | 3.61 | 204 | 1.48 | 3.29 | -0.11 | 20.742 | 83.19 | 1000.96 | -4.8 | 3.3 | 12 | 189.562 | 1117.95 | 264.296 | 46784.3 |
| 12 | 34.7952 | -86.376 | 211.7 | 12 | 2021 | 4 | 20 | 19 | 22 | 0 | 58 | 54307 | 23.968 | 24.031 | 2.82 | 201 | 1.01 | 2.63 | 0.1 | 21.684 | 78.52 | 1000.93 | -3.9 | 3.8 | 13 | 189.688 | 1121.65 | 263.444 | 36335.7 |
| 13 | 34.7952 | -86.376 | 211.6 | 12 | 2021 | 4 | 20 | 19 | 22 | 0 | 59 | 55295 | 24.698 | 24.328 | 3.23 | 200 | 1.07 | 3 | 0.54 | 19.868 | 87.89 | 1000.96 | -3.8 | 2.9 | 13 | 189.438 | 1126.6 | 265.084 | 42081 |
| 14 | 34.7952 | -86.376 | 211.6 | 12 | 2021 | 4 | 20 | 19 | 22 | 0 | 0 | 56282 | 24.798 | 24.228 | 1.75 | 196 | 0.49 | 1.68 | 0.09 | 22.35 | 75.4 | 1000.89 | -4.9 | 2.7 | 10 | 189.312 | 1126.55 | 262.839 | 22459.5 |
| 15 | 34.7952 | -86.376 | 211.6 | 12 | 2021 | 4 | 20 | 19 | 22 | 0 | 1 | 57267 | 22.144 | 22.036 | 2.8 | 187 | 0.36 | 2.77 | 0.28 | 19.705 | 88.69 | 1000.9 | -5.7 | 2.3 | 11 | 189.75 | 1128.85 | 265.216 | 36514 |

FIG. 13

METHOD AND APPARATUS FOR MEASURING OPTICAL TURBULENCE USING AN UNMANNED AERIAL VEHICLE

REFERENCE TO RELATED APPLICATIONS

The present application is a continuation of U.S. patent application Ser. No. 17/718,580, filed Apr. 12, 2022, and entitled "METHOD AND APPARATUS FOR MEASURING OPTICAL TURBULENCE USING AN UNMANNED AERIAL VEHICLE", which claims priority to and the benefit of U.S. Provisional Patent Application Ser. No. 63/260,042, filed Aug. 6, 2021 and entitled "METHOD AND APPARATUS FOR MEASURING OPTICAL TURBULENCE USING AN UNMANNED AERIAL VEHICLE", the entire contents of each of which is hereby incorporated by reference herein.

U.S. patent application Ser. No. 17/718,580, filed Apr. 12, 2022, and entitled "METHOD AND APPARATUS FOR MEASURING OPTICAL TURBULENCE USING AN UNMANNED AERIAL VEHICLE" also relates to U.S. patent application Ser. No. 15/997,304, filed on Jun. 4, 2018 and entitled "ATMOSPHERIC CHARACTERIZATION SYSTEMS AND METHODS", which claims priority to and the benefit of U.S. Provisional Patent Application Ser. No. 62/515,299, filed on Jun. 5, 2017 and entitled "ATMOSPHERIC CHARACTERIZATION SYSTEMS AND METHODS", the entire contents of each of which is hereby incorporated by reference herein.

STATEMENT OF GOVERNMENT SUPPORT

This invention was made with government support under FA9451-19-D-0033 (SC-19A01-1402) awarded by the Joint Directed Energy Transition Office of the Department of Defense. The government may have certain rights in this invention.

FIELD OF THE INVENTION

The present invention generally relates to methods and apparatus for measuring optical turbulence using an unmanned aerial vehicle.

BACKGROUND

As engineers and scientists work to refine free-space optical systems that operate over long terrestrial ranges, it is helpful to better understand, characterize, and quantify the atmospheric properties of the environment. One such atmospheric property of interest is the refractive-index structure coefficient, or $Cn^2$, which indicates changes of the base atmospheric refractive index. Over very short distances, small refractive index changes usually cause negligible problems to all but the most demanding optical systems, such as interferometric systems, however even small changes may have a large effect on Optical Path Length (OPL) as short as 1 km.

In general, refractive index fluctuations in the atmosphere originate with turbulent air motion. Atmospheric turbulence usually results from temperature gradients on the surface of the earth as solar radiation and daily weather patterns cause a heating and cooling cycle. Like the large-scale temperature gradient from the surface of the earth to the upper atmosphere that is both easily measured and causes atmospheric turbulence, very small temperature gradients that are not separated by such vast distances may also result in turbulence. These small temperature gradients may be considered randomly distributed throughout a larger temperature gradient. The refractive index of air is sensitive to fluctuations in temperature such that the refractive index of air varies along a slant or horizontal path of small temperature gradients, setting the groundwork for understanding the differential temperature impact on the refractive-index structure coefficient.

Systems like large terrestrial telescopes, free-space laser communication systems and High Energy Laser (HEL) free space systems require a stable index of refraction for optimum operation. It is understood that the effect of refractive index is the most disruptive close to ground level, so large telescope construction projects typically take ground level atmospheric properties into consideration and are consequently built in locations with higher altitude or, at a minimum, on the highest floor of buildings, further away from ground atmospheric turbulence. Conventional mobile HEL systems however, typically often located in challenging operating environments with poor optical atmospheric properties.

A resolved, or nodal, $C_{n2}$ measurement has emerging applications, such as in dynamic vertical and slant paths, where there is superior performance or no practical way to operate an integrated path atmospheric characterization system.

Conventional techniques for measuring atmospheric turbulence, each of which measure atmospheric turbulence along an integrated path, and not at nodal locations, include:

Scintillation Detection and Ranging (SCIDAR)—imaging the shadow patterns in the scintillation of starlight.

Low Layer Scidar (LOLAS)—small aperture version of SCIDAR designed for low altitude profiling.

Slope Detection and Ranging (SLODAR)—operated by detecting the backscatter from atmospheric conditions.

Multi-Aperture Scintillation Sensor (MASS)—optical sensor that creates two images of a single target on a focal plane array to estimate atmospheric scintillation.

Moon Scintillometer (MooSci)—uses multiple photoelectric diodes at various distances to monitor minor changes in light reflected from the Moon.

Radio Detection and Ranging (RADAR)—Radio Detection and Ranging mapping of atmospheric turbulence.

Differential Image Motion Monitor (DIMM)—optical sensor that creates two images of a single target on a focal plane array and uses statistical area of interest tracking to estimate atmospheric scintillation.

Atmospheric Characterization System (ACS—Shack-Hartmann Wavefront Sensor)—optical system that measures changes in wavefront from a source beacon.

Scintillometer (Popular name brands are Scintec and Kipp & Zonen)—commercially available scintillation measurement device.

The conventional atmospheric turbulence profiling systems above are optical systems that image a beacon or target from known distance and then compute an estimate of atmospheric turbulence based on the image data. Turbulence induced by micro-meteorology over various terrain is essentially path averaged and thus, cannot specifically determine the turbulence-generating at any a single point along the optical path. Optical atmospheric turbulence characterization devices are also designed for use along a minimum and maximum path, 250 m-6000 m. (BLS900, 2017). Since optical atmospheric turbulence characterization devices usually require a beacon, or light source, to image down range, they measure an integrated path of turbulence and not turbulence at a nodal location. Additionally, several of the atmospheric profiling systems are path weighted and require further analysis such that these systems do not provide sufficiently accurate results.

Prior efforts to measure at atmospheric turbulence at nodal locations include:

Balloon-Borne Thermometers—temperature sensing devices that estimate atmospheric characteristics.

Differential Temperature Sensor (DTS) Method of Measuring $Cn^2$—uses two differential temperature sensor measurements to measure $C_{n2}$ at nodal locations.

In U.S. patent application Ser. No. 15/997,304, published as U.S. Pub. No. 2018/0348375 A1, owned by applicant, and incorporated by reference herein, discloses a useful measurement of optical turbulence at nodal locations using the DTS Method. The DTS Method disclosed in this application has certain shortcomings in that it utilizes only temperature measurement information and a predetermined nodal length based on the predetermined spacing between the two differential sensors, such that this method cannot provide an exact measurement for optical turbulence at any given nodal location.

It would be beneficial to provide a method and apparatus to measure optical turbulence at nodal locations that allows for varying spacing between differential sensors in order to increase the accuracy of $C_{n2}$ measurements.

SUMMARY OF INVENTION

In view of the above, it is the object of the present disclosure to provide method and apparatus to overcome the technological challenges faced in conventional optical turbulence measurement systems. The present disclosure provides for methods and apparatuses for measuring optical turbulence using an unmanned aerial vehicle to determine a refractive-structure index coefficient $(Cn^2)$ at any nodal location using differential temperature measurements and wind speed measurements, thereby increasing overall accuracy and flexibility.

In embodiments, a method for measuring optical turbulence using an unmanned aerial vehicle includes: a) generating, by a first temperature sensor operatively connected to a central processing board, both of which are mounted on the unmanned aerial vehicle, first temperature measurement information at a first sampling rate, the first temperature measurement information associated with a first temperature at the first temperature sensor during a first period of time defined by a first start time and a first end time; b) generating, by a first wind speed sensor mounted on the unmanned aerial vehicle and operatively connected to the central processing board, first wind speed measurement information at the first sampling rate associated with a first wind speed at the first wind speed sensor during the first period of time; c) generating, by a first barometric pressure sensor mounted on the unmanned aerial vehicle operatively connected to the central processing board, first barometric pressure measurement information at the first sampling rate, associated with a first barometric pressure at the first barometric pressure sensor during the first period of time; d) transmitting, from the first temperature sensor to the central processing board, the first temperature measurement information generated during the first period of time; c) transmitting, from the first wind speed sensor to the central processing board, the first wind speed measurement information generated during the first period of time; f) transmitting, from the first barometric pressure sensor to the central processing board, the first barometric pressure measurement information generated during the first period of time; g) storing, in memory operatively connected to the central processing board, the first temperature measurement information, the first wind speed measurement information, and the first barometric pressure measurement information; h) obtaining, by a digital software system from the memory, the first temperature measurement information, the first wind speed measurement information, and the first barometric pressure measurement information; i) determining, by the digital software system: i. first power spectral density information associated with a plurality of frequencies based at least on the first temperature measurement information; ii. second power spectral density information associated with the plurality of frequencies based at least on the first wind speed measurement information; and iii. a first sensor cutoff frequency associated with at least one of the first temperature sensor and the first wind speed sensor; j) decimating, by the digital software system, the first temperature measurement information, the first wind speed measurement information, and the first barometric pressure measurement information generated at the first sampling rate to a second sampling rate during the first period of time based at least on the first power spectral density information, the second power spectral density information, and the first sensor cutoff frequency; k) calculating, by the digital software system, a first estimated sensor spacing value based at least on the first wind speed measurement information, and the first start time and the first end time associated with the first period of time; l) determining, by the digital software system, a first temperature structure coefficient based at least on the first estimated sensor spacing value and the first temperature measurement information during the first period of time; m) determining, by the digital software system, a first refractive-index structure coefficient indicative of optical turbulence during the first period of time based at least on the first temperature structure coefficient, the first temperature measurement information, and the first barometric pressure measurement information; and n) transmitting, by the digital software system to an optical system, the first refractive-index structure coefficient.

In embodiments, the unmanned aerial vehicle is configured to move between a plurality of positions in three-dimensional space.

In embodiments, the unmanned aerial vehicle is configured to move between the plurality of positions in three-dimensional space based on instructions provided via a remote control.

In embodiments, the unmanned aerial vehicle includes an accelerometer configured to generate pitch angle measurement information, roll angle measurement information, and heading angle information associated with a respective position of the unmanned aerial vehicle.

In embodiments, the unmanned aerial vehicle includes an altimeter configured to generate altitude measurement information associated with a respective position of the unmanned aerial vehicle.

In embodiments, the first temperature sensor is operatively connected to the central processing board via a first communication interface.

In embodiments, the first wind speed sensor is operatively connected to the central processing board via a second communication interface.

In embodiments, the first wind speed sensor is an anemometer.

In embodiments, the first wind speed sensor is a sonic anemometer.

In embodiments, the first wind speed sensor is a standing wave anemometer.

In embodiments, the memory is nonremovable memory.

In embodiments, the first temperature measurement information, the first wind speed measurement information, and the first barometric pressure measurement information is stored on the nonremovable memory.

In embodiments, the memory is a removable memory card.

In embodiments, the first temperature measurement information, the first wind speed measurement information, and the first barometric pressure measurement information is stored on the removeable memory card.

In embodiments, the first temperature measurement information, the first wind speed measurement information, and the first barometric pressure measurement information are obtained wirelessly.

In embodiments, the first temperature measurement information, the first wind speed measurement information, and the first barometric pressure measurement information are obtained periodically.

In embodiments, the first temperature measurement information, the first wind speed measurement information, and the first barometric pressure measurement information are obtained aperiodically.

In embodiments, the first temperature measurement information, the first wind speed measurement information, and the first barometric pressure measurement information are obtained in real time as part of a streaming data stream.

In embodiments, the digital software system is operatively connected to the central processing board via a wired connection.

In embodiments, the digital software system is located remotely from the unmanned aerial vehicle and is operatively connected to the central processing board via wireless connection.

In embodiments, the first power spectral density information is determined based on a Fourier transform of the first temperature information during the first period of time.

In embodiments, the second power spectral density information is determined based on a Fourier transform of the first wind speed measurement information during the first period of time.

In embodiments, the first sensor cutoff frequency is based at least on one or more of the first power spectral density information and the second power spectral density information.

In embodiments, the first sensor cutoff frequency is a predetermined frequency.

In embodiments, the first sensor cutoff frequency is a predetermined frequency selected from a group of predetermined frequencies.

In embodiments, the first sensor cutoff frequency is a predetermined frequency based at least on the first wind speed measurement information.

In embodiments, the first sensor cutoff frequency is determined based at least on a linear relationship between the first power spectral density information and the first plurality of frequencies.

In embodiments, the first sensor cutoff frequency is determined based at least on a linear relationship between the second power spectral density information and the first plurality of frequencies.

In embodiments, the first estimated sensor spacing value is calculated by the formula:

$$r = \frac{U}{(t_2 - t_1)}$$

wherein r is the first estimated sensor spacing value, U is a first wind speed value from the first wind speed measurement information, $t_1$ corresponds to the first start time associated with the first period of time, and $t_2$ corresponds to the first end time associated with the first period of time.

In embodiments, the first estimated sensor spacing value is a predetermined sensor spacing value.

In embodiments, the first temperature structure coefficient is determined by the formula:

$$C_{t1}^2 = \frac{(\Delta T_1)^2}{r^{\frac{2}{3}}}$$

wherein $C_{t1}^2$ is the first temperature structure coefficient, $\Delta T_1$ is a first temperature differential value based on the first temperature measurement information, and r is the first estimated sensor spacing value.

In embodiments, the first refractive-index structure coefficient is determined by the formula:

$$C_{n1}^2 = \left[79\frac{P}{T_1^2}\right]^2 \times 10^{-12} C_{T1}^2$$

wherein $C_{n1}^2$ is the first refractive-index structure coefficient, P is a first barometric pressure value based on the first measurement information, $T_1$ is a first temperature measurement value based on the first temperature measurement information, and $C_{t1}^2$ is the first temperature structure coefficient.

In embodiments, prior to step (b) the method further includes: o) generating, by a second temperature sensor mounted on the unmanned aerial vehicle and operatively connected to the central processing board, second temperature measurement information at the first sampling rate, the second temperature information associated with a second temperature at the second temperature sensor during the first period of time; p) transmitting, from the second temperature sensor to the central processing board, the second temperature measurement information generated during the first period of time; q) storing, in the memory operatively connected to the central processing board, the second temperature measurement information; r) obtaining, by the digital software system from the memory, the second temperature measurement information; s) determining, by the digital software system, third power spectral density information associated with the plurality of frequencies based at least on the second temperature measurement information; t) decimating, by the digital software system, the second temperature measurement information generated at the first sampling rate to the second sampling rate based at least on the third power spectral density information; u) determining, by the digital software system a second temperature structure coefficient based at least on the first estimated sensor spacing value and the second temperature measurement information during the first period of time; v) determining, by the digital software system, a second refractive-index structure coefficient indicative of optical turbulence during the first period of time based at least on the second temperature structure coefficient, the second temperature measurement information, and the first barometric pressure measurement information; w) transmitting, by the digital software system to the optical system, the second refractive-index structure coefficient.

In embodiments, the second temperature sensor is operatively connected to the central processing board via a second communication interface.

In embodiments, the second temperature measurement information is the same as the first temperature measurement information.

In embodiments, the second temperature measurement information is different from the first temperature measurement information.

In embodiments, the first temperature sensor is an anemometer temperature sensor.

In embodiments, the second temperature sensor is a first differential temperature sensor.

In embodiments, the first temperature sensor is a first differential temperature sensor.

In embodiments, the second temperature sensor is a second differential temperature sensor.

In embodiments, the second temperature sensor is an anemometer temperature sensor.

In embodiments, the second temperature measurement information is stored on the nonremovable memory.

In embodiments, the second temperature measurement information is stored on the removeable memory card.

In embodiments, the second temperature measurement information is obtained wirelessly.

In embodiments, the second temperature measurement information is obtained periodically.

In embodiments, the second temperature measurement information is obtained aperiodically.

In embodiments, the second temperature measurement information is obtained in real time as part of a streaming data stream.

In embodiments, the third power spectral density information is determined based on a Fourier transform of the second temperature measurement information.

In embodiments, the first sensor cutoff frequency is associated with the second temperature sensor.

In embodiments, the first sensor cutoff frequency is based at least on the third power 2 spectral density information.

In embodiments, the first sensor cutoff frequency is determined based at least on a linear relationship between the third power spectral density information and the first plurality of frequencies.

In embodiments, the second temperature structure coefficient is determined by the formula:

$$C_{t2}^2 = \frac{(\Delta T_2)^2}{r^{\frac{2}{3}}}$$

wherein $C_{t2}^2$ is the second temperature structure coefficient, $\Delta T_2$ is a second temperature differential value based on the second temperature measurement information, and r is the first estimated sensor spacing value.

In embodiments, the method further includes determining, by the digital software system, the first refractive-index structure coefficient indicative of optical turbulence during the first period of time based at least on the first temperature structure coefficient, the second temperature measurement information, and the first barometric pressure measurement information.

In embodiments, the first refractive-index structure coefficient is determined by the formula:

$$C_{n1}^2 = \left[79\frac{P}{T_2^2}\right]^2 \times 10^{-12} C_{T1}^2$$

wherein $C_{n1}^2$ is the first refractive-index structure coefficient, P is a first barometric pressure value based on the first barometric pressure measurement information, $T_2$ is a second temperature measurement value based on the second temperature measurement information, and $C_{t1}^2$ is the first temperature structure coefficient.

In embodiments, the second refractive-index structure coefficient is determined by the formula:

$$C_{n2}^2 = \left[79\frac{P}{T_2^2}\right]^2 \times 10^{-12} C_{T2}^2$$

wherein $C_{n2}^2$ is the second refractive-index structure coefficient, P is a first barometric pressure value based on the first barometric pressure measurement information, $T_2$ is the second temperature measurement value based on the second temperature measurement information, and $C_{t2}^2$ is the second temperature structure coefficient.

In embodiments, the method further includes determining, by the digital software system, the second refractive-index structure coefficient indicative of optical turbulence during the first period of time based at least on the second temperature structure coefficient, the first temperature measurement information, and the first barometric pressure measurement information.

In embodiments, the second refractive-index structure coefficient is determined by the formula:

$$C_{n2}^2 = \left[79\frac{P}{T_1^2}\right]^2 \times 10^{-12} C_{T2}^2$$

wherein $C_{n2}^2$ is the second refractive-index structure coefficient, P is the first barometric pressure value based on the first barometric pressure measurement information, $T_1$ is the first temperature measurement value based on the first measurement information, and $C_{t2}^2$ is the second temperature structure coefficient.

In embodiments, prior to step (b) the method further includes: o) generating, by a third temperature sensor mounted on the unmanned aerial vehicle and operatively connected to the central processing board, third temperature measurement information at the first sampling rate, the third temperature measurement information associated with a third temperature at the third temperature sensor during the first period of time; p) transmitting, from the third temperature sensor to the central processing board, the third temperature measurement information generated during the first period of time; q) storing, in the memory operatively connected to the central processing board, the third temperature measurement information; r) obtaining, by the digital software system from the memory, the third temperature measurement information; s) determining, by the digital software system, fourth power spectral density information associated with the plurality of frequencies based at least on the third temperature measurement information; t) decimating, by the digital software system, the third temperature measurement information generated at the first sampling rate to the second sampling rate based at least on the fourth power spectral density information; u) determining, by the digital software system, a third temperature structure coefficient based at least on the predetermined sensor spacing value, the second temperature measurement information, and the third temperature measurement information; v) determining, by the digital software system, a third refractive-index structure coefficient indicative of optical turbulence during the first period of time based at least on the third temperature structure coefficient, the second temperature measurement information, the third temperature measurement information, and the first barometric pressure measurement information; w) transmitting, by the digital software system to an optical system, the third refractive-index structure coefficient.

In embodiments, the third temperature sensor is operatively connected to the central processing board via the fourth communication interface.

In embodiments, the first temperature sensor is an anemometer temperature sensor, the second temperature sensor is a first differential temperature sensor, and the third temperature sensor is a second differential temperature sensor.

In embodiments, the first temperature sensor is a first differential temperature sensor, the second temperature sensor is an anemometer temperature sensor, and the third temperature sensor is a second differential temperature sensor.

In embodiments, the first temperature sensor is a first differential temperature sensor, the second temperature sensor is a second differential temperature sensor, and the third temperature sensor is an anemometer temperature sensor.

In embodiments, the third temperature measurement information is stored on the nonremovable memory.

In embodiments, the third temperature measurement information is stored on the removeable memory card.

In embodiments, the third temperature measurement information is obtained wirelessly.

In embodiments, the third temperature measurement information is obtained periodically.

In embodiments, the third temperature measurement information is obtained aperiodically.

In embodiments, the third temperature measurement information is obtained in real time as part of a streaming data stream.

In embodiments, the fourth power spectral density information is determined based on a Fourier transform of the third temperature measurement information.

In embodiments, the first sensor cutoff frequency is associated with the third temperature sensor.

In embodiments, the first sensor cutoff frequency is based at least on the fourth power spectral density information.

In embodiments, the third temperature structure coefficient is determined by the formula:

$$C_{t3}^2 = \frac{(\Delta T_2 - \Delta T_3)^2}{r_p^{\frac{2}{3}}}$$

wherein $C_{t3}^2$ is the second temperature structure coefficient, $\Delta T_2$ is a second temperature differential value based on the second temperature measurement information, $\Delta T_3$ is a third temperature differential value based on the third temperature measurement information, and $r_p$ is the predetermined sensor spacing value.

In embodiments, the method further includes determining a fourth temperature structure coefficient based at least on the first estimated sensor spacing value and the third temperature measurement information during the first period of time.

In embodiments, the fourth temperature structure coefficient is determined by the formula:

$$C_{t4}^2 = \frac{(\Delta T_3)^2}{r^{\frac{2}{3}}}$$

wherein $C_{t4}^2$ is the fourth temperature structure coefficient, $\Delta T_3$ is a third temperature differential value based on the third temperature measurement information, and r is the first estimated sensor spacing value.

In embodiments, the method further includes determining, by the digital software system, a third refractive-index structure coefficient indicative of optical turbulence during the first period of time based at least on the third temperature structure coefficient, the first temperature measurement information, and the first barometric pressure measurement information.

In embodiments, the third refractive-index structure coefficient is determined by the formula:

$$C_{n3}^2 = \left[79\frac{P}{T_1^2}\right]^2 \times 10^{-12} C_{T3}^2$$

wherein $C_{n3}^2$ is the third refractive-index structure coefficient, P is the first barometric pressure value based on the first barometric pressure measurement information, $T_1$ is the first temperature measurement value based on the first temperature measurement information, and $C_{t3}^2$ is the third temperature structure coefficient.

In embodiments, the method further includes determining, by the digital software system, the third refractive-index structure coefficient indicative of optical turbulence during the first period of time based at least on the third temperature structure coefficient, the second temperature measurement information, and the first barometric pressure measurement information.

In embodiments, the third refractive-index structure coefficient is determined by the formula:

$$C_{n3}^2 = \left[79\frac{P}{T_2^2}\right]^2 \times 10^{-12} C_{T3}^2$$

wherein $C_{n3}^2$ is the third refractive-index structure coefficient, P is the first barometric pressure value based on the first barometric pressure measurement information, $T_2$ is the second temperature measurement value based on the second temperature measurement information, and $C_{t3}^2$ is the third temperature structure coefficient.

In embodiments, the method further includes determining, by the digital software system, the third refractive-index structure coefficient indicative of optical turbulence during the first period of time based at least on the third temperature structure coefficient, the third temperature measurement information, and the first barometric pressure measurement information.

In embodiments, the third refractive-index structure coefficient is determined by the formula:

$$C_{n3}^2 = \left[79\frac{P}{T_3^2}\right]^2 \times 10^{-12} C_{T3}^2$$

wherein $C_{n3}^2$ is the third refractive-index structure coefficient, P is the first barometric pressure value based on the first barometric pressure measurement information, $T_3$ is the third temperature measurement value based on the third temperature measurement information, and $C_{t3}^2$ is the third temperature structure coefficient.

In embodiments, the method further includes determining, by the digital software system, a fourth refractive-index structure coefficient indicative of optical turbulence during the first period of time based at least on the fourth temperature structure coefficient, the third temperature measurement information, and the first barometric pressure measurement information.

In embodiments, the fourth refractive-index structure coefficient is determined by the formula:

$$C_{n4}^2 = \left[79\frac{P}{T_3^2}\right]^2 \times 10^{-12} C_{T4}^2$$

wherein $C_{n4}^2$ is the fourth refractive-index structure coefficient, P is the first barometric pressure value based on the first barometric pressure measurement information, $T_3$ is the third temperature measurement value based on the third temperature measurement information, and $C_{t4}^2$ is the fourth temperature structure coefficient.

In embodiments, the method further includes determining, by the digital software system, the fourth refractive-index structure coefficient indicative of optical turbulence during the first period of time based at least on the fourth temperature structure coefficient, the first temperature measurement information, and the first barometric pressure measurement information.

In embodiments, the fourth refractive-index structure coefficient is determined by the formula:

$$C_{n4}^2 = \left[79\frac{P}{T_1^2}\right]^2 \times 10^{-12} C_{T4}^2$$

wherein $C_{n4}^2$ is the fourth refractive-index structure coefficient, P is the first barometric pressure value based on the first barometric pressure measurement information, $T_1$ is the first temperature measurement value based on the first temperature measurement information, and $C_{t4}^2$ is the fourth temperature structure coefficient.

In embodiments, the method further includes determining, by the digital software system, the fourth refractive-index structure coefficient indicative of optical turbulence during the first period of time based at least on the fourth temperature structure coefficient, the second temperature measurement information, and the first barometric pressure measurement information.

In embodiments, the fourth refractive-index structure coefficient is determined by the formula:

$$C_{n4}^2 = \left[79\frac{P}{T_2^2}\right]^2 \times 10^{-12} C_{T4}^2$$

wherein $C_{n4}^2$ is the fourth refractive-index structure coefficient, P is the first barometric pressure value based on the first barometric pressure measurement information, $T_2$ is the second temperature measurement value based on the second temperature measurement information, and $C_{t4}^2$ is the fourth temperature structure coefficient.

In embodiments, the method further includes transmitting, by the digital software system to an optical system, the fourth refractive-index structure coefficient.

In embodiments, after step (j) the method further includes: o) determining, by the digital software system: i. first temperature power spectrum information based at least on the first power spectral density information and the first sensor cutoff frequency; and ii. first spectral frequency range information based at least on the first power spectral density information and the first sensor cutoff frequency; p) determining, by the digital software system, a fifth temperature structure coefficient based at least on the first temperature power spectrum, the first spectral frequency range information, and the first wind speed measurement information during the first period of time; q) determining, by the digital software system, a fifth refractive-index structure coefficient indicative of optical turbulence during the first period of time based at least on the fifth temperature structure coefficient, the first temperature measurement information, and the first barometric pressure measurement information; and r) transmitting, by the digital software system to an optical system, the fifth refractive-index structure coefficient.

In embodiments, the fifth temperature structure coefficient is determined by the formula:

$$C_{T5}^2 = \frac{-\frac{8}{3}\Phi_1\left(\frac{2\pi}{U_m}\right)}{f_1^{-\frac{2}{3}}}$$

wherein $C_{T5}^2$ is the fifth temperature structure coefficient, $\Phi_1$ is the first temperature power spectrum, $f_1$ is the first spectral frequency range information, and $U_m$ is the first wind speed value from the first wind speed measurement information.

In embodiments, the fifth refractive-index structure coefficient is determined by the formula:

$$C_{n5}^2 = \left[79\frac{P}{T_1^2}\right]^2 \times 10^{-12} C_{T5}^2$$

wherein $C_{n5}^2$ is the fifth refractive-index structure coefficient, P is the first barometric pressure value based on the first barometric pressure measurement information, $T_1$ is the first temperature measurement value based on the first temperature measurement information, and $C_{t5}^2$ is the fifth temperature structure coefficient.

In embodiments, the method further includes determining, by the digital software system, the fifth refractive-index structure coefficient based at least on the fifth temperature structure coefficient, the second temperature measurement information, and the first barometric pressure measurement information.

In embodiments, the fifth refractive-index structure coefficient is determined by the formula:

$$C_{n5}^2 = \left[79\frac{P}{T_{2^2}}\right]^2 \times 10^{-12} C_{T5}^2$$

wherein $C_{n5}^2$ is the fifth refractive-index structure coefficient, P is the first barometric pressure value based on the first barometric pressure measurement information, $T_2$ is the second temperature measurement value based on the second temperature measurement information, and $C_{t5}^2$ is the fifth temperature structure coefficient.

In embodiments, the method further includes determining, by the digital software system, the fifth refractive-index structure coefficient based at least on the fifth temperature structure coefficient, the third temperature measurement information, and the first barometric pressure measurement information.

In embodiments, the fifth refractive-index structure coefficient is determined by the formula:

$$C_{n5}^2 = \left[79\frac{P}{T_3^2}\right]^2 \times 10^{-12} C_{T5}^2$$

wherein $C_{n5}^2$ is the fifth refractive-index structure coefficient, P is the first barometric pressure value based on the first barometric pressure measurement information, $T_3$ is the third temperature measurement value based on the third temperature measurement information, and $C_{t5}^2$ is the fifth temperature structure coefficient.

In embodiments, the determining step (i) further includes determining a second sensor cutoff frequency associated with the first temperature sensor and the first wind speed sensor.

In embodiments, the second sensor cutoff frequency is based at least on at least one or more of the first power spectral density information and the second power spectral density information.

In embodiments, after step (j) the method further includes: o) determining, by the digital software system: i. second temperature power spectrum information based at least on the second power spectral density information and the second sensor cutoff frequency; and ii. second spectral frequency range information based at least on the second power spectral density information and the second sensor cutoff frequency; p) determining, by the digital software system, a sixth temperature structure coefficient based at least on the second temperature power spectrum, the second spectral frequency range information, and the first wind speed measurement information during the first period of time; q) determining, by the digital software system, a sixth refractive-index structure coefficient indicative of optical turbulence during the first period of time based at least on the sixth temperature structure coefficient, the second temperature measurement information, and the first barometric pressure measurement information; and r) transmitting, by the digital software system to an optical system, the sixth refractive-index structure coefficient.

In embodiments, the sixth temperature structure coefficient is determined by the formula:

$$C_{T6}^2 = \frac{-8/3\Phi_2(2\pi/U_m)}{f_2^{-2/3}}$$

wherein $C_{T6}^2$ is the sixth temperature structure coefficient, $\Phi_2$ is the second temperature power spectrum, $f_2$ is the second spectral frequency range information, and $U_m$ is the first wind speed value from the first wind speed measurement information.

In embodiments, the sixth refractive-index structure coefficient is determined by the formula:

$$C_{n6}^2 = \left[79\frac{P}{T_2^2}\right]^2 \times 10^{-12} C_{T6}^2$$

wherein $C_{n6}^2$ is the sixth refractive-index structure coefficient, P is the first barometric pressure value based on the first barometric pressure measurement information, $T_2$ is the second temperature measurement value based on the second temperature measurement information, and $C_{t6}^2$ is the sixth temperature structure coefficient.

In embodiments, the method further includes determining, by the digital software system, the sixth refractive-index structure coefficient based at least on the sixth temperature structure coefficient, the first temperature measurement information, and the first barometric pressure measurement information.

In embodiments, the sixth refractive-index structure coefficient is determined by the formula:

$$C_{n6}^2 = \left[79\frac{P}{T_1^2}\right]^2 \times 10^{-12} C_{T6}^2$$

wherein $C_{n6}^2$ is the sixth refractive-index structure coefficient, P is the first barometric pressure value based on the first barometric pressure measurement information, $T_1$ is the first temperature measurement value based on the first temperature measurement information, and $C_{t6}^2$ is the sixth temperature structure coefficient.

In embodiments, the method further includes determining, by the digital software system, the sixth refractive-index structure coefficient based at least on the sixth temperature structure coefficient, the third temperature measurement information, and the first barometric pressure measurement information.

In embodiments, the sixth refractive-index structure coefficient is determined by the formula:

$$C_{n6}^2 = \left[79\frac{P}{T_3^2}\right]^2 \times 10^{-12} C_{T6}^2$$

wherein $C_{n6}^2$ is the sixth refractive-index structure coefficient, P is the first barometric pressure value based on the first barometric pressure measurement information, $T_3$ is the third temperature measurement value based on the third temperature measurement information, and $C_{t6}^2$ is the sixth temperature structure coefficient.

In embodiments, the determining step (i) further includes determining a third sensor cutoff frequency associated with the second temperature sensor.

In embodiments, the third sensor cutoff frequency is determined based at least on the second power spectral density information.

In embodiments, after step (j) the method further includes: o) determining, by the digital software system: i. third temperature power spectrum information based at least on the third power spectral density information and the third sensor cutoff frequency; and ii. third spectral frequency range information based at least on the third power spectral density information and the third sensor cutoff frequency; p) determining, by the digital software system, a seventh temperature structure coefficient based at least on the third temperature power spectrum, the third spectral frequency range information, and the first wind speed measurement information during the first period of time; q) determining, by the digital software system, a seventh refractive-index structure coefficient indicative of optical turbulence during the first period of time based at least on the seventh temperature structure coefficient, the third temperature measurement information, and the first barometric pressure measurement information; and r) transmitting, by the digital software system to an optical system, the seventh refractive-index structure coefficient.

In embodiments, the seventh temperature structure coefficient is determined by the formula:

$$C_{T7}^2 = \frac{-8/3\Phi_3(2\pi/U_m)}{f_3^{-2/3}}$$

wherein $C_{T7}^2$ is the seventh temperature structure coefficient, $\Phi_3$ is the third temperature power spectrum, $f_2$ is the third spectral frequency range information, and $U_m$ is the first wind speed value from the first wind speed measurement information.

In embodiments, the seventh refractive-index structure coefficient is determined by the formula:

$$C_{n7}^2 = \left[79\frac{P}{T_3^2}\right]^2 \times 10^{-12}C_{T7}^2$$

wherein $C_{n7}^2$ is the seventh refractive-index structure coefficient, P is the first barometric pressure value based on the first barometric pressure measurement information, $T_3$ is the third temperature measurement value based on the third temperature measurement information, and $C_{r7}^2$ is the seventh temperature structure coefficient.

In embodiments, the method further includes determining, by the digital software system, the seventh refractive-index structure coefficient based at least on the seventh temperature structure coefficient, the first temperature measurement information, and the first barometric pressure measurement information.

In embodiments, the seventh refractive-index structure coefficient is determined by the formula:

$$C_{n7}^2 = \left[79\frac{P}{T_1^2}\right]^2 \times 10^{-12}C_{T7}^2$$

wherein $C_{n7}^2$ is the seventh refractive-index structure coefficient, P is the first barometric pressure value based on the first barometric pressure measurement information, $T_1$ is the first temperature measurement value based on the first temperature measurement information, and $C_{r7}^2$ is the seventh temperature structure coefficient.

In embodiments, the method further includes determining, by the digital software system, the seventh refractive-index structure coefficient based at least on the seventh temperature structure coefficient, the second temperature measurement information, and the first barometric pressure measurement information.

In embodiments, the seventh refractive-index structure coefficient is determined by the formula:

$$C_{n7}^2 = \left[79\frac{P}{T_3^2}\right]^2 \times 10^{-12}C_{T7}^2$$

wherein $C_{n7}^2$ is the seventh refractive-index structure coefficient, P is the first barometric pressure value based on the first barometric pressure measurement information, $T_2$ is the second temperature measurement value based on the second temperature measurement information, and $C_{r7}^2$ is the seventh temperature structure coefficient.

In embodiments, a method for measuring optical turbulence using an unmanned aerial vehicle includes: a) generating, by a first temperature sensor operatively connected to a central processing board, both of which are mounted on the unmanned aerial vehicle, first temperature measurement information at a first sampling rate, the first temperature measurement information associated with a first temperature at the first temperature sensor during a first period of time defined by a first start time and a first end time; b) generating, by a first wind speed sensor mounted on the unmanned aerial vehicle and operatively connected to the central processing board, first wind speed measurement information at the first sampling rate associated with a first wind speed at the first wind speed sensor during the first period of time; c) generating, by a first barometric pressure sensor mounted on the unmanned aerial vehicle operatively connected to the central processing board, first barometric pressure measurement information at the first sampling rate, associated with a first barometric pressure at the first barometric pressure sensor during the first period of time; d) transmitting, from the first temperature sensor to the central processing board, the first temperature measurement information generated during the first period of time; e) transmitting, from the first wind speed sensor to the central processing board, the first wind speed measurement information generated during the first period of time; f) transmitting, from the first barometric pressure sensor to the central processing board, the first barometric pressure measurement information generated during the first period of time; g) storing, in memory operatively connected to the central processing board, the first temperature measurement information, the first wind speed measurement information, and the first barometric pressure measurement information; h) obtaining, by a digital software system from the memory, the first temperature measurement information, the first wind speed measurement information, and the first barometric pressure measurement information; i) transmitting, from the digital software system to a remote control system, the first temperature measurement information decimated to the second sampling rate during the first period of time, the first wind speed information decimated to the second sampling rate during the first period of time, and the first barometric pressure measurement information decimated to the second sampling rate during the first period of time; j) determining, by the remote control system: i. first power spectral density information associated with a plurality of frequencies based at least on the first temperature measurement information; ii. second power spectral density information associated with the plurality of frequencies based at least on the first wind speed measurement information; and iii. a first sensor cutoff frequency associated with at least one of the first temperature sensor and the first wind speed sensor; k) decimating, by the remote control system, the first temperature measurement information, the first wind speed measurement information, and the first barometric pressure measurement information generated at the first sampling rate to a second sampling rate during the first period of time based at least on the first power spectral density information, the second power spectral density information, and the first sensor cutoff frequency; l) calculating, by the remote control system, a first estimated sensor spacing value based at least on the first wind speed measurement information, and the first start time and the first end time associated with the first period of time; m) determining, by the remote control system, a first temperature structure coefficient based at least on the first estimated sensor spacing value and the first temperature measurement information during the first period of time; n) determining, by the remote control system, a first refractive-index structure coefficient indicative of optical turbulence during the first period of time based at least on the first temperature structure coefficient, the first temperature measurement information, and the first barometric pressure measurement information; and o) transmitting, by the remote control system to an optical system, the first refractive-index structure coefficient.

In embodiments, the unmanned aerial vehicle is configured to move between a plurality of positions in three-dimensional space.

In embodiments, the unmanned aerial vehicle is configured to move between the plurality of positions in three-dimensional space based on instructions provided via a remote control.

In embodiments, the unmanned aerial vehicle includes an accelerometer configured to generate pitch angle measurement information, roll angle measurement information, and heading angle information associated with a respective position of the unmanned aerial vehicle.

In embodiments, the unmanned aerial vehicle includes an altimeter configured to generate altitude measurement information associated with a respective position of the unmanned aerial vehicle.

In embodiments, the first temperature sensor is operatively connected to the central processing board via a first communication interface.

In embodiments, the first wind speed sensor is operatively connected to the central processing board via a second communication interface.

In embodiments, the first wind speed sensor is an anemometer.

In embodiments, the first wind speed sensor is a sonic anemometer.

In embodiments, the first wind speed sensor is a standing wave anemometer.

In embodiments, the memory is nonremovable memory.

In embodiments, the first temperature measurement information, the first wind speed measurement information, and the first barometric pressure measurement information is stored on the nonremovable memory.

In embodiments, the memory is a removable memory card.

In embodiments, the first temperature measurement information, the first wind speed measurement information, and the first barometric pressure measurement information is stored on the removeable memory card.

In embodiments, the first temperature measurement information, the first wind speed measurement information, and the first barometric pressure measurement information are obtained wirelessly.

In embodiments, the first temperature measurement information, the first wind speed measurement information, and the first barometric pressure measurement information are obtained periodically.

In embodiments, the first temperature measurement information, the first wind speed measurement information, and the first barometric pressure measurement information are obtained aperiodically.

In embodiments, the first temperature measurement information, the first wind speed measurement information, and the first barometric pressure measurement information are obtained in real time as part of a streaming data stream.

In embodiments, the remote control system is operatively connected to the central processing board via a wired connection.

In embodiments, the remote control system is located remotely from the unmanned aerial vehicle and is operatively connected to the central processing board via wireless connection.

In embodiments, the first power spectral density information is determined based on a Fourier transform of the first temperature information during the first period of time.

In embodiments, the second power spectral density information is determined based on a Fourier transform of the first wind speed measurement information during the first period of time.

In embodiments, the first sensor cutoff frequency is based at least on one or more of the first power spectral density information and the second power spectral density information.

In embodiments, the first sensor cutoff frequency is a predetermined frequency.

In embodiments, the first sensor cutoff frequency is a predetermined frequency selected from a group of predetermined frequencies.

In embodiments, the first sensor cutoff frequency is a predetermined frequency based at least on the first wind speed measurement information.

In embodiments, the first sensor cutoff frequency is determined based at least on a linear relationship between the first power spectral density information and the first plurality of frequencies.

In embodiments, the first sensor cutoff frequency is determined based at least on a linear relationship between the second power spectral density information and the first plurality of frequencies.

In embodiments, the first estimated sensor spacing value is calculated by the formula:

$$r = \frac{\overline{U}}{(t_2 - t_1)}$$

wherein r is the first estimated sensor spacing value, $\overline{U}$ is a first wind speed value from the first wind speed measurement information, $t_1$ corresponds to the first start time associated with the first period of time, and $t_2$ corresponds to the first end time associated with the first period of time.

In embodiments, the first estimated sensor spacing value is a predetermined sensor spacing value.

In embodiments, the first temperature structure coefficient is determined by the formula:

$$C_{t1}^2 = \frac{(\Delta T_1)^2}{r^{2/3}}$$

wherein $C_{t1}^2$ is the first temperature structure coefficient, $\Delta T_1$ is a first temperature differential value based on the first temperature measurement information, and r is the first estimated sensor spacing value.

In embodiments, the first refractive-index structure coefficient is determined by the formula:

$$C_{n1}^2 = \left[79\frac{P}{T_1^2}\right]^2 \times 10^{-12} C_{T1}^2$$

wherein $C_{n1}^2$ is the first refractive-index structure coefficient, P is a first barometric pressure value based on the first measurement information, $T_1$ is a first temperature measurement value based on the first temperature measurement information, and $C_{t1}^2$ is the first temperature structure coefficient.

In embodiments, prior to step (b) the method further includes: p) generating, by a second temperature sensor mounted on the unmanned aerial vehicle and operatively connected to the central processing board, second temperature measurement information at the first sampling rate, the second temperature information associated with a second temperature at the second temperature sensor during the first period of time; q) transmitting, from the second temperature sensor to the central processing board, the second temperature measurement information generated during the first period of time; r) storing, in the memory operatively connected to the central processing board, the second temperature measurement information; s) obtaining, by the digital software system from the memory, the second temperature measurement information; t) transmitting, from the digital software system to a remote control system, the second temperature measurement information decimated to the second sampling rate during the first period of time; u) determining, by the remote control system, third power spectral density information associated with the plurality of frequencies based at least on the second temperature measurement information; v) decimating, by the remote control system, the second temperature measurement information generated at the first sampling rate to the second sampling rate based at least on the third power spectral density information; w) determining, by the remote control system, a second temperature structure coefficient based at least on the first estimated sensor spacing value and the second temperature measurement information during the first period of time; x) determining, by the remote control system, a second refractive-index structure coefficient indicative of optical turbulence during the first period of time based at least on the second temperature structure coefficient, the second temperature measurement information, and the first barometric pressure measurement information; y) transmitting, by the remote control system to the optical system, the second refractive-index structure coefficient.

In embodiments, the second temperature sensor is operatively connected to the central processing board via a second communication interface.

In embodiments, the second temperature measurement information is the same as the first temperature measurement information.

In embodiments, the second temperature measurement information is different from the first temperature measurement information.

In embodiments, the first temperature sensor is an anemometer temperature sensor.

In embodiments, the second temperature sensor is a first differential temperature sensor.

In embodiments, the first temperature sensor is a first differential temperature sensor.

In embodiments, the second temperature sensor is a second differential temperature sensor.

In embodiments, the second temperature sensor is an anemometer temperature sensor.

In embodiments, the second temperature measurement information is stored on the nonremovable memory.

In embodiments, the second temperature measurement information is stored on the removeable memory card.

In embodiments, the second temperature measurement information is obtained wirelessly.

In embodiments, the second temperature measurement information is obtained periodically.

In embodiments, the second temperature measurement information is obtained aperiodically.

In embodiments, the second temperature measurement information is obtained in real time as part of a streaming data stream.

In embodiments, the third power spectral density information is determined based on a Fourier transform of the second temperature measurement information.

In embodiments, the first sensor cutoff frequency is associated with the second temperature sensor.

In embodiments, the first sensor cutoff frequency is based at least on the third power spectral density information.

In embodiments, the first sensor cutoff frequency is determined based at least on a linear relationship between the third power spectral density information and the first plurality of frequencies.

In embodiments, the second temperature structure coefficient is determined by the formula:

$$C_{t2}^2 = \frac{(\Delta T_2)^2}{r^{2/3}}$$

wherein $C_{t2}^2$ is the second temperature structure coefficient, $\Delta T_2$ is a second temperature differential value based on the second temperature measurement information, and r is the first estimated sensor spacing value.

In embodiments, the method further includes determining, by the remote control system, the first refractive-index structure coefficient indicative of optical turbulence during the first period of time based at least on the first temperature structure coefficient, the second temperature measurement information, and the first barometric pressure measurement information.

In embodiments, the first refractive-index structure coefficient is determined by the formula:

$$C_{n1}^2 = \left[79\frac{P}{T_2^2}\right]^2 \times 10^{-12} C_{T1}^2$$

wherein $C_{n1}^2$ is the first refractive-index structure coefficient, P is a first barometric pressure value based on the first barometric pressure measurement information, $T_2$ is a second temperature measurement value based on the second temperature measurement information, and $C_{t1}^2$ is the first temperature structure coefficient.

In embodiments, the second refractive-index structure coefficient is determined by the formula:

$$C_{n2}^2 = \left[79\frac{P}{T_2^2}\right]^2 \times 10^{-12} C_{T2}^2$$

wherein $C_{n2}^2$ is the second refractive-index structure coefficient, P is a first barometric pressure value based on the first barometric pressure measurement information, $T_2$ is the second temperature measurement value based on the second temperature measurement information, and $C_{t2}{}^2$ is the second temperature structure coefficient.

In embodiments, the method further includes determining, by the remote control system, the second refractive-index structure coefficient indicative of optical turbulence during the first period of time based at least on the second temperature structure coefficient, the first temperature measurement information, and the first barometric pressure measurement information.

In embodiments, the second refractive-index structure coefficient is determined by the formula:

$$C_{n2}^2 = \left[79\frac{P}{T_1^2}\right]^2 \times 10^{-12} C_{T2}^2$$

wherein $C_{n2}{}^2$ is the second refractive-index structure coefficient, P is the first barometric pressure value based on the first barometric pressure measurement information, $T_1$ is the first temperature measurement value based on the first measurement information, and $C_{t2}{}^2$ is the second temperature structure coefficient.

In embodiments, prior to step (b) the method further includes: p) generating, by a third temperature sensor mounted on the unmanned aerial vehicle and operatively connected to the central processing board, third temperature measurement information at the first sampling rate, the third temperature measurement information associated with a third temperature at the third temperature sensor during the first period of time; q) transmitting, from the third temperature sensor to the central processing board, the third temperature measurement information generated during the first period of time; r) storing, in the memory operatively connected to the central processing board, the third temperature measurement information; s) obtaining, by the digital software system from the memory, the third temperature measurement information; t) transmitting, from the digital software system to a remote control system, the third temperature measurement information decimated to the second sampling rate during the first period of time; u) determining, by the remote control system, fourth power spectral density information associated with the plurality of frequencies based at least on the third temperature measurement information; v) decimating, by the remote control system, the third temperature measurement information generated at the first sampling rate to the second sampling rate based at least on the fourth power spectral density information; w) determining, by the remote control system, a third temperature structure coefficient based at least on the predetermined sensor spacing value, the second temperature measurement information, and the third temperature measurement information; x) determining, by the remote control system, a third refractive-index structure coefficient indicative of optical turbulence during the first period of time based at least on the third temperature structure coefficient, the second temperature measurement information, the third temperature measurement information, and the first barometric pressure measurement information; y) transmitting, by the remote control system to an optical system, the third refractive-index structure coefficient.

In embodiments, the third temperature sensor is operatively connected to the central processing board via the fourth communication interface.

In embodiments, the first temperature sensor is an anemometer temperature sensor, the second temperature sensor is a first differential temperature sensor, and the third temperature sensor is a second differential temperature sensor.

In embodiments, the first temperature sensor is a first differential temperature sensor, the second temperature sensor is an anemometer temperature sensor, and the third temperature sensor is a second differential temperature sensor.

In embodiments, the first temperature sensor is a first differential temperature sensor, the second temperature sensor is a second differential temperature sensor, and the third temperature sensor is an anemometer temperature sensor.

In embodiments, the third temperature measurement information is stored on the nonremovable memory.

In embodiments, the third temperature measurement information is stored on the removeable memory card.

In embodiments, the third temperature measurement information is obtained wirelessly.

In embodiments, the third temperature measurement information is obtained periodically.

In embodiments, the third temperature measurement information is obtained aperiodically.

In embodiments, the third temperature measurement information is obtained in real time as part of a streaming data stream.

In embodiments, the fourth power spectral density information is determined based on a Fourier transform of the third temperature measurement information.

In embodiments, the first sensor cutoff frequency is associated with the third temperature sensor.

In embodiments, the first sensor cutoff frequency is based at least on the fourth power spectral density information.

In embodiments, the third temperature structure coefficient is determined by the formula:

$$C_{t3}^2 = \frac{(\Delta T_2 - \Delta T_3)^2}{r_p^{\frac{2}{3}}}$$

wherein $C_{t3}{}^2$ is the second temperature structure coefficient, $\Delta T_2$ is a second temperature differential value based on the second temperature measurement information, $\Delta T_3$ is a third temperature differential value based on the third temperature measurement information, and $r_p$ is the predetermined sensor spacing value.

In embodiments, the method further includes determining a fourth temperature structure coefficient based at least on the first estimated sensor spacing value and the third temperature measurement information during the first period of time.

In embodiments, the fourth temperature structure coefficient is determined by the formula:

$$C_{t4}^2 = \frac{(\Delta T_3)^2}{r^{\frac{2}{3}}}$$

wherein $C_{t4}{}^2$ is the fourth temperature structure coefficient, $\Delta T_3$ is a third temperature differential value based on the third temperature measurement information, and r is the first estimated sensor spacing value.

In embodiments, the method further includes determining, by the remote control system, a third refractive-index structure coefficient indicative of optical turbulence during the first period of time based at least on the third temperature structure coefficient, the first temperature measurement information, and the first barometric pressure measurement information.

In embodiments, the third refractive-index structure coefficient is determined by the formula:

$$C_{n3}^2 = \left[ 79 \frac{P}{T_1^2} \right]^2 \times 10^{-12} C_{T3}^2$$

wherein $C_{n3}^2$ is the third refractive-index structure coefficient, P is the first barometric pressure value based on the first barometric pressure measurement information, $T_1$ is the first temperature measurement value based on the first temperature measurement information, and $C_{t3}^2$ is the third temperature structure coefficient.

In embodiments, the method further includes determining, by the remote control system, the third refractive-index structure coefficient indicative of optical turbulence during the first period of time based at least on the third temperature structure coefficient, the second temperature measurement information, and the first barometric pressure measurement information.

In embodiments, the third refractive-index structure coefficient is determined by the formula:

$$C_{n3}^2 = \left[ 79 \frac{P}{T_2^2} \right]^2 \times 10^{-12} C_{T3}^2$$

wherein $C_{n3}^2$ is the third refractive-index structure coefficient, P is the first barometric pressure value based on the first barometric pressure measurement information, $T_2$ is the second temperature measurement value based on the second temperature measurement information, and $C_{t3}^2$ is the third temperature structure coefficient.

In embodiments, the method further includes determining, by the remote control system, the third refractive-index structure coefficient indicative of optical turbulence during the first period of time based at least on the third temperature structure coefficient, the third temperature measurement information, and the first barometric pressure measurement information.

In embodiments, the third refractive-index structure coefficient is determined by the formula:

$$C_{n3}^2 = \left[ 79 \frac{P}{T_3^2} \right]^2 \times 10^{-12} C_{T3}^2$$

wherein $C_{n3}^2$ is the third refractive-index structure coefficient, P is the first barometric pressure value based on the first barometric pressure measurement information, $T_3$ is the third temperature measurement value based on the third temperature measurement information, and $C_{t3}^2$ is the third temperature structure coefficient.

In embodiments, the method further includes determining, by the remote control system, a fourth refractive-index structure coefficient indicative of optical turbulence during the first period of time based at least on the fourth temperature structure coefficient, the third temperature measurement information, and the first barometric pressure measurement information.

In embodiments, the fourth refractive-index structure coefficient is determined by the formula:

$$C_{n4}^2 = \left[ 79 \frac{P}{T_3^2} \right]^2 \times 10^{-12} C_{T4}^2$$

wherein $C_{n4}^2$ is the fourth refractive-index structure coefficient, P is the first barometric pressure value based on the first barometric pressure measurement information, $T_3$ is the third temperature measurement value based on the third temperature measurement information, and $C_{t4}^2$ is the fourth temperature structure coefficient.

In embodiments, the method further includes determining, by the remote control system, the fourth refractive-index structure coefficient indicative of optical turbulence during the first period of time based at least on the fourth temperature structure coefficient, the first temperature measurement information, and the first barometric pressure measurement information.

In embodiments, the fourth refractive-index structure coefficient is determined by the formula:

$$C_{n4}^2 = \left[ 79 \frac{P}{T_1^2} \right]^2 \times 10^{-12} C_{T4}^2$$

wherein $C_{n4}^2$ is the fourth refractive-index structure coefficient, P is the first barometric pressure value based on the first barometric pressure measurement information, $T_1$ is the first temperature measurement value based on the first temperature measurement information, and $C_{t4}^2$ is the fourth temperature structure coefficient.

In embodiments, the method further includes determining, by the remote control system, the fourth refractive-index structure coefficient indicative of optical turbulence during the first period of time based at least on the fourth temperature structure coefficient, the second temperature measurement information, and the first barometric pressure measurement information.

In embodiments, the fourth refractive-index structure coefficient is determined by the formula:

$$C_{n4}^2 = \left[ 79 \frac{P}{T_2^2} \right]^2 \times 10^{-12} C_{T4}^2$$

wherein $C_{n4}^2$ is the fourth refractive-index structure coefficient, P is the first barometric pressure value based on the first barometric pressure measurement information, $T_2$ is the second temperature measurement value based on the second temperature measurement information, and $C_{t4}^2$ is the fourth temperature structure coefficient.

In embodiments, the method further includes transmitting, by the remote control system to an optical system, the fourth refractive-index structure coefficient.

In embodiments, after step (k) the method further includes: p) determining, by the remote control system: i. first temperature power spectrum information based at least on the first power spectral density information and the first sensor cutoff frequency; and ii. first spectral frequency range information based at least on the first power spectral density information and the first sensor cutoff frequency; q) determining, by the remote control system, a fifth temperature structure coefficient based at least on the first temperature power spectrum, the first spectral frequency range information, and the first wind speed measurement information during the first period of time; r) determining, by the remote control system, a fifth refractive-index structure coefficient indicative of optical turbulence during the first period of time based at least on the fifth temperature structure coefficient, the first temperature measurement information, and the first barometric pressure measurement information; and s) transmitting, by the remote control system to an optical system, the fifth refractive-index structure coefficient.

In embodiments, the fifth temperature structure coefficient is determined by the formula:

$$C_{T5}^2 = \frac{-\frac{8}{3}\Phi_1\left(\frac{2\pi}{U_m}\right)}{f_1^{-\frac{2}{3}}}$$

wherein $C_{T5}^2$ is the fifth temperature structure coefficient, $\Phi_1$ is the first temperature power spectrum, $f_1$ is the first spectral frequency range information, and $U_m$ is the first wind speed value from the first wind speed measurement information.

In embodiments, the fifth refractive-index structure coefficient is determined by the formula:

$$C_{n5}^2 = \left[79\frac{P}{T_1^2}\right]^2 \times 10^{-12} C_{T5}^2$$

wherein $C_{n5}^2$ is the fifth refractive-index structure coefficient, P is the first barometric pressure value based on the first barometric pressure measurement information, $T_1$ is the first temperature measurement value based on the first temperature measurement information, and $C_{t5}^2$ is the fifth temperature structure coefficient.

In embodiments, the method further includes determining, by the remote control system, the fifth refractive-index structure coefficient based at least on the fifth temperature structure coefficient, the second temperature measurement information, and the first barometric pressure measurement information.

In embodiments, the fifth refractive-index structure coefficient is determined by the formula:

$$C_{n5}^2 = \left[79\frac{P}{T_2^2}\right]^2 \times 10^{-12} C_{T5}^2$$

wherein $C_{n5}^2$ is the fifth refractive-index structure coefficient, P is the first barometric pressure value based on the first barometric pressure measurement information, $T_2$ is the second temperature measurement value based on the second temperature measurement information, and $C_{t5}^2$ is the fifth temperature structure coefficient.

In embodiments, the method further includes determining, by the remote control system, the fifth refractive-index structure coefficient based at least on the fifth temperature structure coefficient, the third temperature measurement information, and the first barometric pressure measurement information.

In embodiments, the fifth refractive-index structure coefficient is determined by the formula:

$$C_{n5}^2 = \left[79\frac{P}{T_3^2}\right]^2 \times 10^{-12} C_{T5}^2$$

wherein $C_{n5}^2$ is the fifth refractive-index structure coefficient, P is the first barometric pressure value based on the first barometric pressure measurement information, $T_3$ is the third temperature measurement value based on the third temperature measurement information, and $C_{t5}^2$ is the fifth temperature structure coefficient.

In embodiments, the determining step (j) further includes determining a second sensor cutoff frequency associated with the first temperature sensor and the first wind speed sensor.

In embodiments, the second sensor cutoff frequency is based at least on at least one or more of the first power spectral density information and the second power spectral density information.

In embodiments, after step (k) the method further includes: p) determining, by the remote control system: i. second temperature power spectrum information based at least on the second power spectral density information and the second sensor cutoff frequency; and ii. second spectral frequency range information based at least on the second power spectral density information and the second sensor cutoff frequency; q) determining, by the remote control system, a sixth temperature structure coefficient based at least on the second temperature power spectrum, the second spectral frequency range information, and the first wind speed measurement information during the first period of time; r) determining, by the remote control system, a sixth refractive-index structure coefficient indicative of optical turbulence during the first period of time based at least on the sixth temperature structure coefficient, the second temperature measurement information, and the first barometric pressure measurement information; and s) transmitting, by the remote control system to an optical system, the sixth refractive-index structure coefficient.

In embodiments, the sixth temperature structure coefficient is determined by the formula:

$$C_{T6}^2 = \frac{-\frac{8}{3}\Phi_2\left(\frac{2\pi}{U_m}\right)}{f_2^{-\frac{2}{3}}}$$

wherein $C_{T6}^2$ is the sixth temperature structure coefficient, $\Phi_2$ is the second temperature power spectrum, $f_2$ is the second spectral frequency range information, and $U_m$ is the first wind speed value from the first wind speed measurement information.

In embodiments, the sixth refractive-index structure coefficient is determined by the formula:

$$C_{n6}^2 = \left[79\frac{P}{T_2^2}\right]^2 \times 10^{-12} C_{T6}^2$$

wherein $C_{n6}^2$ is the sixth refractive-index structure coefficient, P is the first barometric pressure value based on the first barometric pressure measurement information, $T_2$ is the second temperature measurement value based on the second temperature measurement information, and $C_{t6}^2$ is the sixth temperature structure coefficient.

In embodiments, the method further includes determining, by the remote control system, the sixth refractive-index structure coefficient based at least on the sixth temperature structure coefficient, the first temperature measurement information, and the first barometric pressure measurement information.

In embodiments, the sixth refractive-index structure coefficient is determined by the formula:

$$C_{n6}^2 = \left[79\frac{P}{T_1^2}\right]^2 \times 10^{-12} C_{T6}^2$$

wherein $C_{n6}^2$ is the sixth refractive-index structure coefficient, P is the first barometric pressure value based on the first barometric pressure measurement information, $T_1$ is the first temperature measurement value based on the first temperature measurement information, and $C_{T6}^2$ is the sixth temperature structure coefficient.

In embodiments, the method further includes determining, by the remote control system, the sixth refractive-index structure coefficient based at least on the sixth temperature structure coefficient, the third temperature measurement information, and the first barometric pressure measurement information.

In embodiments, the sixth refractive-index structure coefficient is determined by the formula:

$$C_{n6}^2 = \left[79\frac{P}{T_3^2}\right]^2 \times 10^{-12} C_{T6}^2$$

wherein $C_{n6}^2$ is the sixth refractive-index structure coefficient, P is the first barometric pressure value based on the first barometric pressure measurement information, $T_3$ is the third temperature measurement value based on the third temperature measurement information, and $C_{T6}^2$ is the sixth temperature structure coefficient.

In embodiments, the determining step (j) further includes determining a third sensor cutoff frequency associated with the second temperature sensor.

In embodiments, the third sensor cutoff frequency is determined based at least on the second power spectral density information.

In embodiments, after step (k) the method further includes: p) determining, by the remote control system: i. third temperature power spectrum information based at least on the third power spectral density information and the third sensor cutoff frequency; and ii. third spectral frequency range information based at least on the third power spectral density information and the third sensor cutoff frequency; q) determining, by the remote control system, a seventh temperature structure coefficient based at least on the third temperature power spectrum, the third spectral frequency range information, and the first wind speed measurement information during the first period of time; r) determining, by the remote control system, a seventh refractive-index structure coefficient indicative of optical turbulence during the first period of time based at least on the seventh temperature structure coefficient, the third temperature measurement information, and the first barometric pressure measurement information; and s) transmitting, by the remote control system to an optical system, the seventh refractive-index structure coefficient, In embodiments, the seventh temperature structure coefficient is determined by the formula:

$$C_{T7}^2 = \frac{-8/3 \ \Phi_3(2\pi/U_m)}{f_3^{-2/3}}$$

wherein $C_{T7}^2$ is the seventh temperature structure coefficient, $\Phi_3$ is the third temperature power spectrum, $f_2$ is the third spectral frequency range information, and $U_m$ is the first wind speed value from the first wind speed measurement information.

In embodiments, the seventh refractive-index structure coefficient is determined by the formula:

$$C_{n7}^2 = \left[79\frac{P}{T_3^2}\right]^2 \times 10^{-12} C_{T7}^2$$

wherein $C_{n7}^2$ is the seventh refractive-index structure coefficient, P is the first barometric pressure value based on the first barometric pressure measurement information, $T_3$ is the third temperature measurement value based on the third temperature measurement information, and $C_{T3}^2$ is the seventh temperature structure coefficient.

In embodiments, the method further includes determining, by the remote control system, the seventh refractive-index structure coefficient based at least on the seventh temperature structure coefficient, the first temperature measurement information, and the first barometric pressure measurement information.

In embodiments, the seventh refractive-index structure coefficient is determined by the formula:

$$C_{n7}^2 = \left[79\frac{P}{T_1^2}\right]^2 \times 10^{-12} C_{T7}^2$$

wherein $C_{n7}^2$ is the seventh refractive-index structure coefficient, P is the first barometric pressure value based on the first barometric pressure measurement information, $T_1$ is the first temperature measurement value based on the first temperature measurement information, and $C_{T7}^2$ is the seventh temperature structure coefficient.

In embodiments, the method further includes determining, by the remote control system, the seventh refractive-index structure coefficient based at least on the seventh temperature structure coefficient, the second temperature measurement information, and the first barometric pressure measurement information.

In embodiments, the seventh refractive-index structure coefficient is determined by the formula:

$$C_{n7}^2 = \left[79\frac{P}{T_3^2}\right]^2 \times 10^{-12} C_{T7}^2$$

wherein $C_{n7}^2$ is the seventh refractive-index structure coefficient, P is the first barometric pressure value based on the first barometric pressure measurement information, $T_2$ is the second temperature measurement value based on the second temperature measurement information, and $C_{T7}^2$ is the seventh temperature structure coefficient.

In embodiments, an unmanned aerial vehicle may include: a) a central body including a first enclosure housing: i. a flight controller configured to direct movement of the unmanned aerial vehicle; ii. a navigation system configured to generate three-dimensional position information of the unmanned aerial vehicle in three-dimensional space; and iii. a payload mounting interface; b) at least one motor operatively connected to the central body with at least one respective propeller, wherein each motor is operatively connected to the flight controller; c) a mounting element; d) a three-dimensional anemometer mounted on the mounting element and configured to generate first wind speed measurement information associated with a first wind speed at the three-dimensional anemometer, wherein the three-dimensional anemometer is further configured to generate first temperature measurement information associated with a first temperature at the three-dimensional anemometer; c) a first differential temperature sensor mounted on the mounting element and configured to generate second temperature measurement information associated with a second temperature at the first differential temperature sensor; f) a second differential temperature sensor mounted to the mounting element and configured to generate third temperature measurement information associated with a third temperature at the second differential temperature sensor; and g) a base mounted to the central body via the payload mounting interface, wherein the base includes a second enclosure housing: i. a first barometric pressure sensor configured to generate first barometric pressure measurement information associated with a first barometric pressure at the first barometric pressure sensor; ii. a central processing board configured to obtain during a first period of time: 1. the first temperature measurement information from the three-dimensional anemometer; 2. the second temperature measurement information from the first differential temperature sensor; 3. the third temperature measurement information from the second differential temperature sensor; 4. the first wind speed information from the three-dimensional anemometer; and 5. the first barometric pressure information from the first barometric pressure sensor; iii. memory operatively connected to the central processing board and configured to store the first temperature measurement information, the second temperature measurement information, the first wind speed measurement information, and the first barometric pressure measurement information with a respective associated time stamp; and iv. a processer operatively connected to the memory configured to generate first refractive-index structure coefficient information based at least on the first temperature measurement information, the second temperature measurement information, the first wind speed measurement information, and the first barometric pressure measurement information obtained during the first period of time.

In embodiments, the unmanned aerial vehicle further includes a first transceiver.

In embodiments, the unmanned aerial vehicle is operated by a remote control via the first transceiver.

In embodiments, the unmanned aerial vehicle is preprogrammed with second memory operatively connected to the flight controller.

In embodiments, the unmanned aerial vehicle is preprogrammed via a second wired connection.

In embodiments, the unmanned aerial vehicle is preprogrammed via second removeable memory.

In embodiments, the unmanned aerial vehicle is configured to receive instructions via the first transceiver.

In embodiments, the central body further includes a plurality of mounting rod interfaces.

In embodiments, the central body further includes a plurality of support rod interfaces.

In embodiments, the central body further includes a plurality of motor mounting rods, wherein each motor mounting rod of the plurality of motor mounting rods is operatively connected to the central body via a respective mounting rod interface of the plurality of mounting rod interfaces.

In embodiments, each propeller has two or more blades.

In embodiments, the at least one motor is mounted to a respective mounting rod of the plurality of mounting rods.

In embodiments, the at least one motor is a three-phase motor.

In embodiments, the unmanned aerial vehicle includes 2 motors and 2 corresponding propellers.

In embodiments, the unmanned aerial vehicle includes 4 motors and 4 corresponding propellers.

In embodiments, the unmanned aerial vehicle includes 6 motors and 6 corresponding propellers.

In embodiments, the unmanned aerial vehicle includes 8 motors and 8 corresponding propellers.

In embodiments, the unmanned aerial vehicle further includes at least one support rod, wherein each support rod is connected to the central body via a respective support rod interface of the plurality of support rod interfaces.

In embodiments, the mounting element is a mast.

In embodiments, the mounting element is a support rod.

In embodiments, the mounting element is mounted to the base using a masting mount.

In embodiments, the unmanned aerial vehicle further includes a pyranometer mounted to the mounting element and configured to generate solar irradiance measurement information associated with a solar irradiance at the pyranometer.

In embodiments, the base further includes a second transceiver.

In embodiments, the second transceiver is operatively connected to the processor.

In embodiments, the second transceiver is operatively connected to the memory.

In embodiments, the base further includes a data port.

In embodiments, the base further includes a removeable memory card port.

In embodiments, the base further includes an accelerometer configured to generate three-dimensional position measurement information associated with a three-dimensional position at the accelerometer.

In embodiments, the base further includes an altimeter configured to generate altitude measurement information associated with an altitude at the altimeter.

In embodiments, the base further includes a hydrometer configured to generate humidity measurement information associated with a humidity at the hydrometer.

In embodiments, the base further includes a cooling fan.

In embodiments, the base further includes a display screen configured to display in real time at least one or more of: i. the first temperature measurement information; ii. the second temperature measurement information; iii. the third temperature measurement information; iv. the first wind speed measurement information; v. the humidity measurement information; vi. the altitude measurement information; vii. the solar irradiance measurement information; and viii. turbulence measurement information.

In embodiments, the display screen is an LCD display screen.

In embodiments, the three-dimensional anemometer is configured to generate the first wind speed measurement information at a first sampling rate.

In embodiments, the three-dimensional anemometer is configured to generate the first temperature measurement information at the first sampling rate.

In embodiments, the three-dimensional anemometer is a sonic anemometer.

In embodiments, the three-dimensional anemometer is a standing wave anemometer.

In embodiments, the three-dimensional anemometer is configured to generate first wind direction information associated with a first wind direction at the three-dimensional anemometer.

In embodiments, the three-dimensional anemometer is configured to generate first three-dimensional wind speed information associated with a first three-dimensional wind speed at the three-dimensional anemometer.

In embodiments, the first differential temperature sensor is configured to generate the second temperature measurement information at the first sampling rate.

In embodiments, the second differential temperature sensor is configured to generate the third temperature measurement information at the first sampling rate.

In embodiments, the pyranometer is configured to generate the solar irradiance information at the first sampling rate.

In embodiments, the first barometric pressure sensor is configured to generate the first barometric pressure information at the first sampling rate.

In embodiments, the accelerometer is configured to generate the three-dimensional position measurement information at the first sampling rate.

In embodiments, the altimeter is configured to generate the altitude information at the first sampling rate.

In embodiments, the hydrometer is configured to generate the humidity information at the first sampling rate.

In embodiments, the central processing board is configured to obtain the first altitude measurement information from the altimeter.

In embodiments, the central processing board is configured to obtain the first three-dimensional position measurement information from the accelerometer.

In embodiments, the processor is configured to generate the first refractive index structure coefficient information by the steps of: 1. calculating, by the processor, a first estimated sensor spacing value based at least on the first wind speed measurement information, and a first start time and a first end time associated with the first period of time; 2. determining, by the processor, a first temperature structure coefficient based at least on the first estimated sensor spacing value and at least one of the first temperature measurement information, the second temperature measurement information, and the third temperature measurement information generated during the first period of time; 3. determining, by the processor, first refractive-index structure coefficient information indicative of optical turbulence during the first period of time based at least on the first temperature structure coefficient, the first barometric pressure measurement information, and at least one of the first temperature measurement information, the second temperature measurement information, and the third temperature measurement information; and 4. transmitting, by the processor to an optical system, the first refractive-index structure coefficient information.

In embodiments, the first estimated sensor spacing value is calculated by the formula:

$$r = \frac{\overline{U}}{(t_2 - t_1)}$$

wherein r is the first estimated sensor spacing value, $\overline{U}$ is a first wind speed value from the first wind speed measurement information, $t_1$ corresponds to the first start time associated with the first period of time, and $t_2$ corresponds to the first end time associated with the first period of time.

In embodiments, the first temperature structure coefficient is determined by the formula:

$$C_t^2 = \frac{(\Delta T)^2}{r^{2/3}}$$

wherein $$C_t^2$$

is the first temperature structure coefficient, $\Delta T$ is a first temperature differential value based on at least one of the first temperature measurement information, the second temperature measurement information, and the third temperature measurement information, and r is the first estimated sensor spacing value.

In embodiments, the first refractive-index structure coefficient information is determined by the formula:

$$C_{n1}^2 = \left[79\frac{P}{T^2}\right]^2 \times 10^{-12} C_T^2$$

wherein $C_{n1}^2$ is the first refractive-index structure coefficient, P is a first barometric pressure value based on the first measurement information, $$C_t^2$$

is the first temperature structure coefficient, and T is a first temperature measurement value based on at least one of the first temperature measurement information, the second temperature measurement information, and the third temperature measurement information.

In embodiments, the first differential temperature sensor is operatively connected to the central processing board via a first communication interface.

In embodiments, the second differential temperature sensor is operatively connected to the central processing board via a second communication interface.

In embodiments, the three-dimensional anemometer is operatively connected to the central processing board via a third communication interface.

In embodiments, the processor is configured to communicate with an optical system.

In embodiments, the refractive-index structure coefficient information is provided to the optical system via the second transceiver.

In embodiments, the second transceiver is the same as the first transceiver.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and related objects, features and advantages of the present disclosure will be more fully understood by reference to the following detailed description of the preferred, albeit illustrative, embodiments of the present invention when taken in conjunction with the accompanying figures, wherein:

FIG. 8 is a graph depicting the power spectral density temperature profile of a plurality of weather measurement sensors in accordance with embodiments of the present invention.

FIGS. 11A, 11B, and 11A-1-11A-11 are schematic diagrams of process flows for measuring optical turbulence using an unmanned aerial vehicle in accordance with embodiments of the present invention.

FIGS. 11C, 11C-1, 11D, 11E, 11E-1, 11F, and 11F-1 are schematic diagrams of process flows for measuring optical turbulence using an unmanned aerial vehicle in accordance with embodiments of the present invention.

FIG. 13 is a table depicting exemplary decimated sensor output information in accordance with embodiments of the present invention.

DETAILED DESCRIPTION OF THE EXEMPLARY EMBODIMENTS

Figure 1:
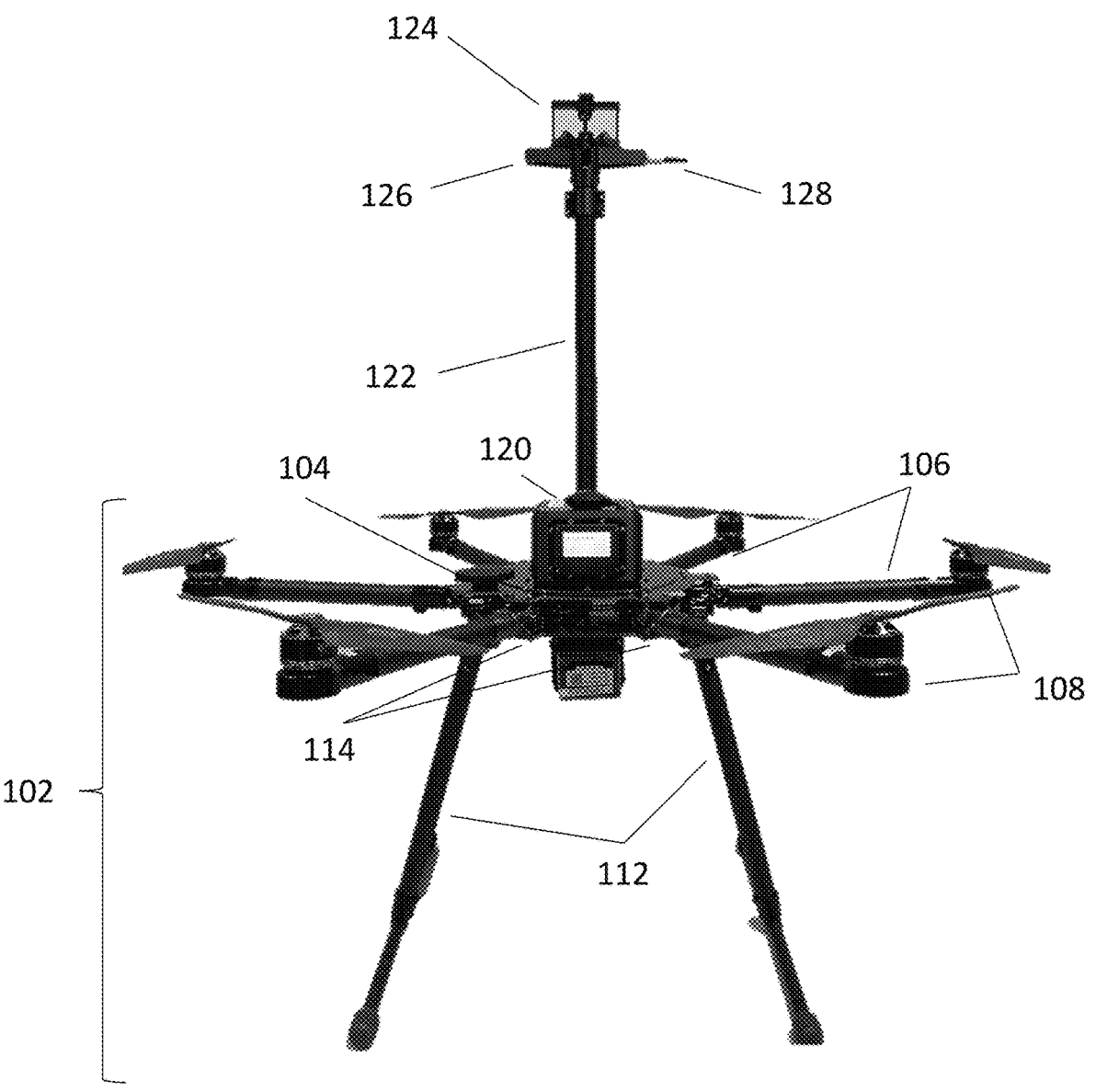
FIGS. 1, 1A, 1B, 1C, and 1D are schematic illustrations of conventional optical turbulence measurement apparatuses mounted on unmanned aerial vehicles.
Figure 1A:
Figure 1B:
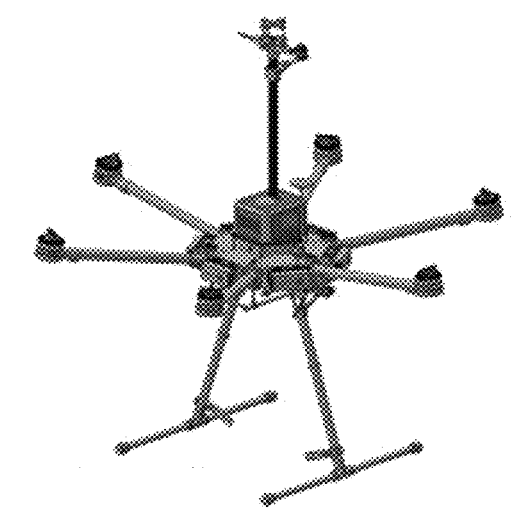
Figure 1C:
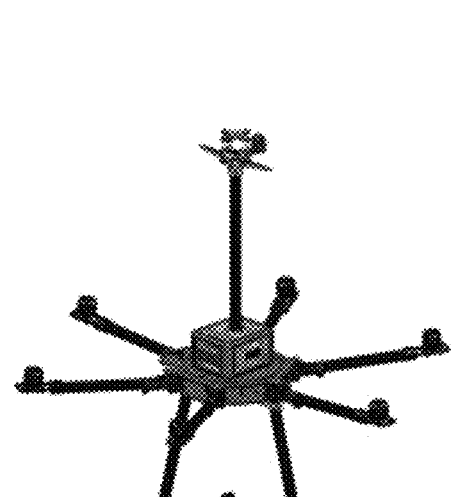
Figure 1D:
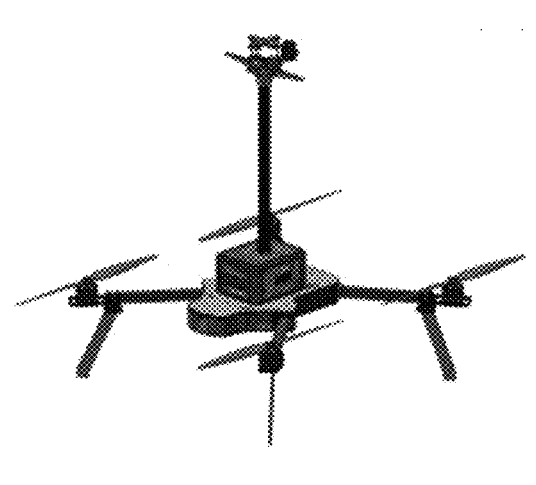

The present invention generally relates to methods and apparatuses for measuring optical turbulence using an unmanned aerial vehicle. In embodiments, the apparatus for measuring optical turbulence using an aerial vehicle may be used in conjunction with a remote control system.

In embodiments, the measurements of optical turbulence may be transmitted to optical systems, and used to design, modify, or calibrate the optical systems.

As noted above, current optical turbulence measurement systems using the DTS method to measure optical turbulence at nodal locations without the need for a minimum measurement path, beacon, system path averaging, or additional hardware to set up and align. While these DTS systems allowed for multiple DTS systems to be combined to measure an atmospheric turbulence 'area' that is not possible to measure with optical devices, they do not allow for accurate determination of nodal measurement values which are used to measure optical turbulence at different points in time based on various weather measurement factors, including at least temperature and wind speed. The DTS method used in these conventional apparatuses assigns a predetermined spacing value between two temperature measurement sensors in order to calculate a temperature structure coefficient, which would then be used to calculate a refractive-index structure coefficient (as a measurement for optical turbulence). In embodiments of the present invention, a wind speed sensor (e.g., a three-dimensional anemometer) may be used in conjunction with temperature sensors, with each sensor mounted on an unmanned aerial vehicle to more accurately measure optical turbulence over a period of time and through different nodal locations in three-dimensional space while allowing for varying of the spacing value used to calculate the temperature structure coefficient.

In embodiments, the measurement approach used for present disclosure uses an anemometer and differential temperature sensor system with high resolution, low cost, digital temperature sensors used in conjunction with a wind speed measurement sensor (such as a three-dimensional anemometer) to more accurately provide the refractive-index structure coefficient, $Cn^2$, of turbulent air at respective nodes. In one embodiment, a custom integrated set of digital differential temperature sensors, as well as a three-dimensional anemometer may be used for the data collection, and provide very fine temperature and wind speed resolution.

Without meaning to be bound by theory, atmospheric turbulence is commonly driven by temperature changes in the environment with a local background mean pressure and temperature, wind speed, and wind direction. Other experiments have considered the effects of humidity fluctuations and solar loading as additional sources of atmospheric turbulence. These changes generally result from the intensity of the vertical convection transfer of heat, moisture, and momentum during the day that is determined from the surface heat flux and thermal structure of the entire mixed turbulent layer.

A known parameter for measuring optical turbulence is the refractive-index structure coefficient, $Cn^2$, which is a function of local temperature, local pressure, and a temperature structure coefficient, $$C_t^2,$$

and may be calculated by the equation:

$$Cn^2 = \left[79\frac{P}{T^2}\right]^2 \times 10^{-12} C_t^2 \qquad \text{Equation 1}$$

where P is pressure in millibars and T is temperature in degrees Kelvin. In the conventional DTS method, the $$C_t^2$$

value can be measured experimentally using differential temperature sensors and then calculated using the Kolmogorov spectrum of turbulence by:

$$C_t^2 = \frac{\langle \Delta T^2 \rangle}{r_p^{2/3}} \qquad \text{Equation 2}$$

where $\Delta T$ is the temperature difference obtained from a pair of temperature sensors separated by a predetermined distance $r_p$. The angle brackets indicate an ensemble average.

Assuming a differential temperature sensor separation where r=1 m, then $\Delta T_2$ and $$C_t^2$$

are mathematically identical. In previously disclosed atmospheric characterization systems utilizing only two differential temperature sensors to measure the refractive index structure coefficient, it was assumed that $r_p$, in Equation 2, was a predetermined value indicating the spacing between the first differential temperature sensor and the second differential temperature. In embodiments of the present invention, the value r may be estimated by using the wind speed measurements generated by a three-dimensional wind speed sensor (such as an anemometer) to generate an estimated sensor spacing value based on the mean wind speed between two points in time. In embodiments, wind speed measurement information may be measured in meters per second, miles per hour, or feet per second, to name a few. Accordingly, based on varying the two points in time, the value of r may also be varied to simulate different spaces between the differential temperature sensors.

In conventional systems, the sensor separation distance was a fixed, predetermined value based on the separation between two differential temperature sensors. In embodiments of the present invention, varying estimated r values may be calculated by using varying the length of time between a first sampled temperature measurement and a second sampled measurement, as well as the average wind speed between the measurements. This means that in embodiments of the present invention, it is possible to evaluate multiple sensor spacing values with one sensor. In embodiments of the present invention therefore, the use of wind speed allows for more flexibility (by requiring only one sensor), as well as more accuracy (by calculating a variable r value between different measurements). In embodiments, the estimated sensor spacing value, r, may be evaluated by the formula:

$$r = \frac{\overline{U}}{(t_2 - t_1)} \qquad \text{Equation 3}$$

wherein r is the first estimated sensor spacing value, $\overline{U}$ is a first wind speed value from the first wind speed measurement information, $t_1$ corresponds to the first start time associated with the first period of time, and $t_2$ corresponds to the first end time associated with the first period of time. The use of the estimated sensor spacing value is discussed further with respect to the anemometer method of calculating a refractive index structure coefficient.

In embodiments of the present invention, the $$C_t^2$$

value can be measured using a differential temperature sensor and/or an anemometer temperature sensor in conjunction with a wind speed sensor (e.g., an anemometer) based on measurements taken by the temperature sensor and the wind speed between two points in time, and may be evaluated by the formula:

$$C_t^2 = \frac{(T_1(t1) - T_2(t2))^2}{r^{2/3}} \qquad \text{Equation 4}$$

where $$C_t^2$$

is the temperature structure coefficient, $T_1(t1)$ is a first temperature measurement value taken by the temperature sensor at the first start time, $T_2(t2)$ is a second temperature measurement value taken by the temperature sensor at the first end time, and r is the estimated sensor spacing value (determined by Equation 3).

In embodiments, the $$C_t^2$$

value can also be measured using the differential temperature sensor and/or the anemometer temperature sensor in conjunction with the wind speed sensor (e.g., an anemometer) based on measurements taken by the temperature sensor and the wind speed between two points in time, as well as a power spectral density temperature profile generated based on the power dissipated by the temperature sensor across a spectral frequency range over a period of time, and may be evaluated by the formula:

$$C_t^2 = \frac{-8/3 \ \Phi_3(2\pi/U_m)}{f^{-2/3}} \qquad \text{Equation 5}$$

wherein $$C_t^2$$

is the temperature structure coefficient, @ is the temperature power spectrum of the temperature sensor, f is the spectral frequency range information associated with the temperature sensor, and $U_m$ is the mean wind speed.

In embodiments, the temperature structure coefficient, $$C_t^2,$$

may then be used to determine the refractive-index structure coefficient indicative of optical turbulence (as indicated by Equation 1).

FIGS. 1, 1A, 1B, 1C, and 1D are schematic illustrations of conventional optical turbulence measurement apparatuses mounted on unmanned aerial vehicles. A conventional unmanned aerial vehicle 102 may include a central body 104, at least one motor 108, a mounting element 122, a plurality of mounting rods 106, a plurality of mounting rod interfaces 114, a plurality of support rods 112, a first differential temperature sensor 526, a second differential temperature sensor 528, and an anemometer 124.

Figure 2:
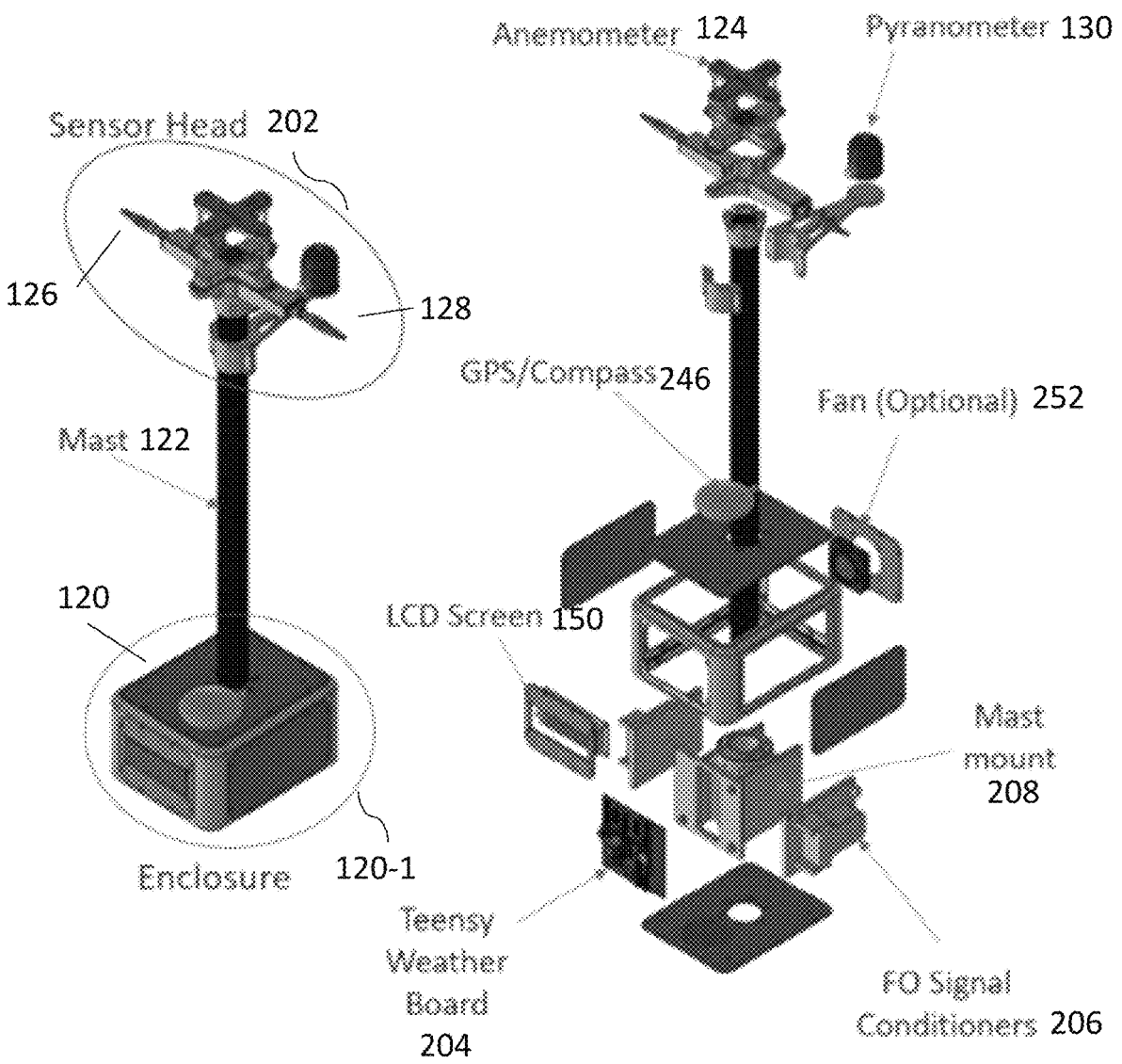
FIG. 2 is a schematic illustration of a conventional optical turbulence measurement apparatus.
Figure 3:
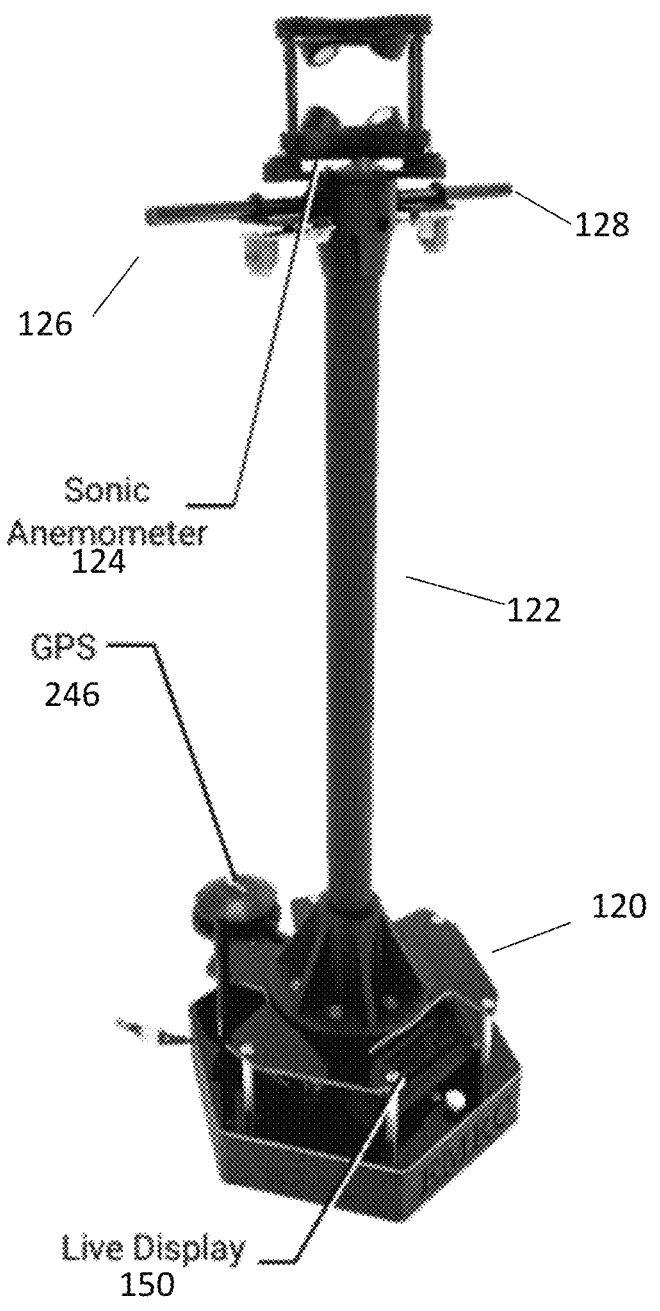
FIG. 3 is a schematic illustration of a conventional optical turbulence measurement apparatus.

FIG. 2 is a schematic illustration of a conventional optical turbulence measurement apparatus. A conventional optical turbulence measurement apparatus may include a base 120 including an enclosure 120-1, which may include a navigation system (e.g., GPS), a mast mount 208, a plurality of signal conditioners 206, a weather board 204, and an LCD screen 150; a mast 122; and a sensor head 202 which may include a first differential temperature sensor 126, a second differential temperature sensor 128, a conventional anemometer 124, and a pyranometer 130;

FIG. 3 is a schematic illustration of a conventional optical turbulence measurement apparatus. The conventional optical turbulence measurement apparatus may include a sonic anemometer 124, a first differential temperature sensor 126, a second differential temperature sensor 128, a mast 122, a base 120, and a live display 150.

Figure 4:
FIG. 4 is a graphical user interface depicting atmospheric characterization measurements taken by a conventional optical turbulence measurement apparatus.
Figure 4:
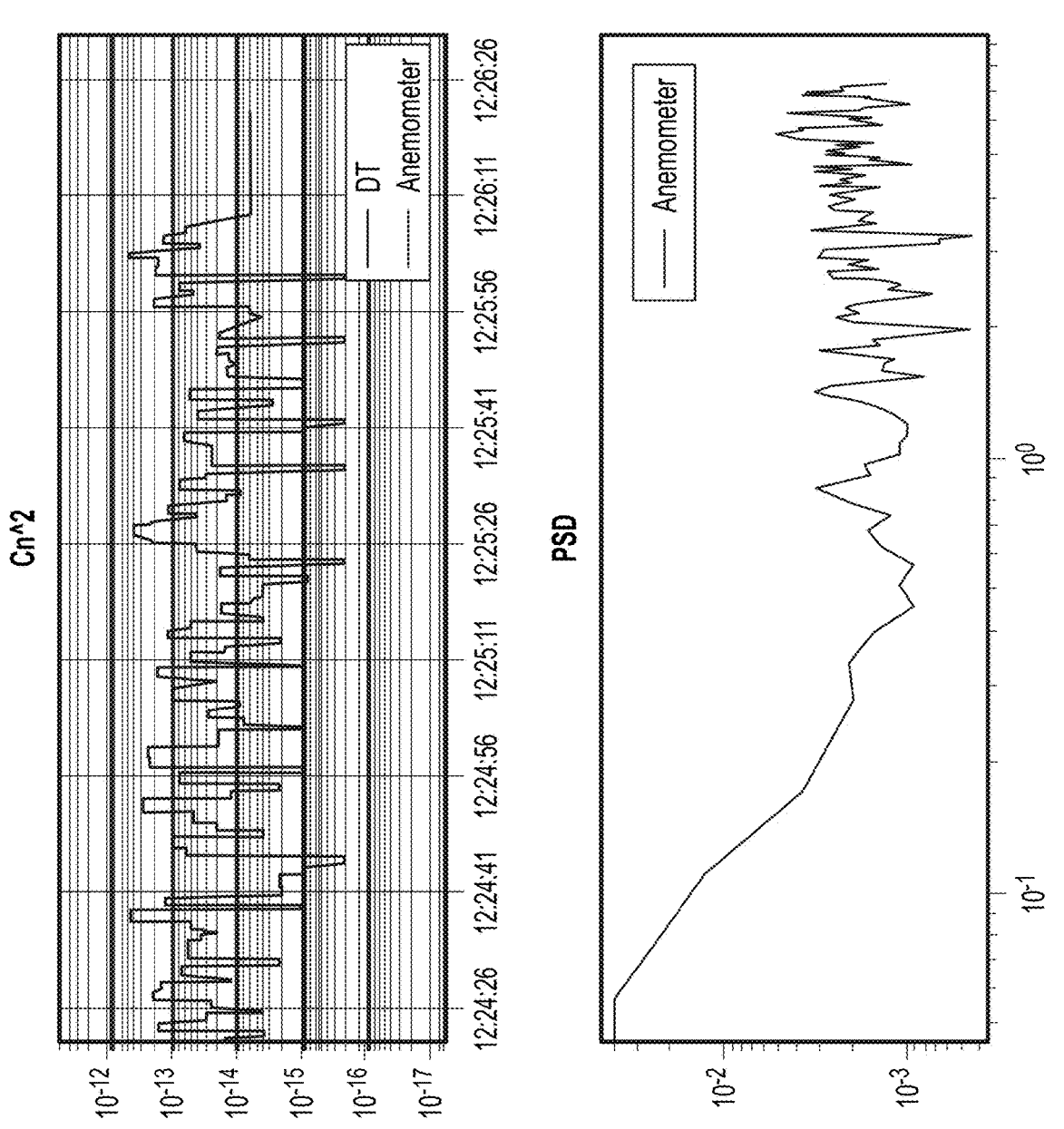

FIG. 4 is a graphical user interface 400 depicting atmospheric characterization measurements taken by a conventional optical turbulence measurement apparatus. The graphical user interface 400 may display temperature measurements generated by a plurality of temperature sensors, wind speed measurements taken by a conventional anemometer 124, refractive index structure coefficient measurements over a period of time generated by using the temperature sensors, and power spectral density measurements associated with the anemometer 124 over a frequency range.

Figure 5:
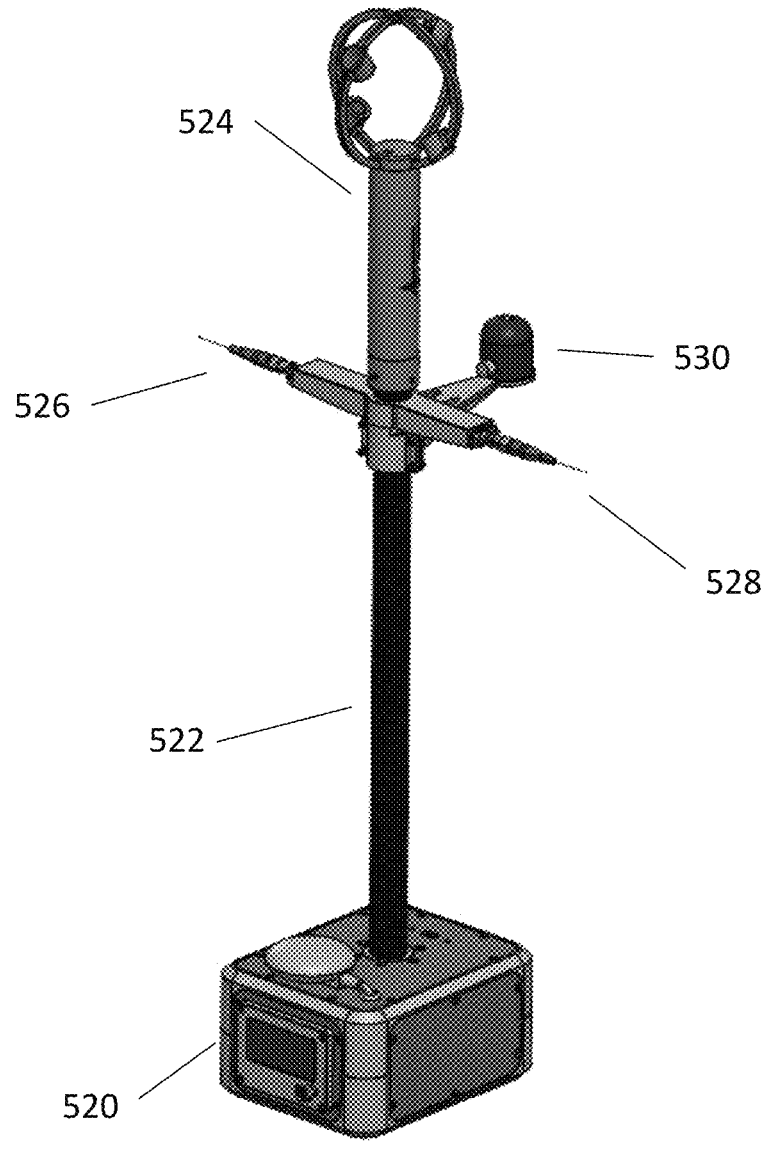
FIG. 5 is a schematic illustration of an apparatus for measuring optical turbulence in accordance with embodiments of the present invention.

FIG. 5 is a schematic illustration of an apparatus for measuring optical turbulence in accordance with embodiments of the present invention. In embodiments, the apparatus for measuring optical turbulence may include a base 520, a mounting element 522, a first differential temperature sensor 526, a second differential temperature sensor 528, and a three-dimensional anemometer 524.

Figure 5A:
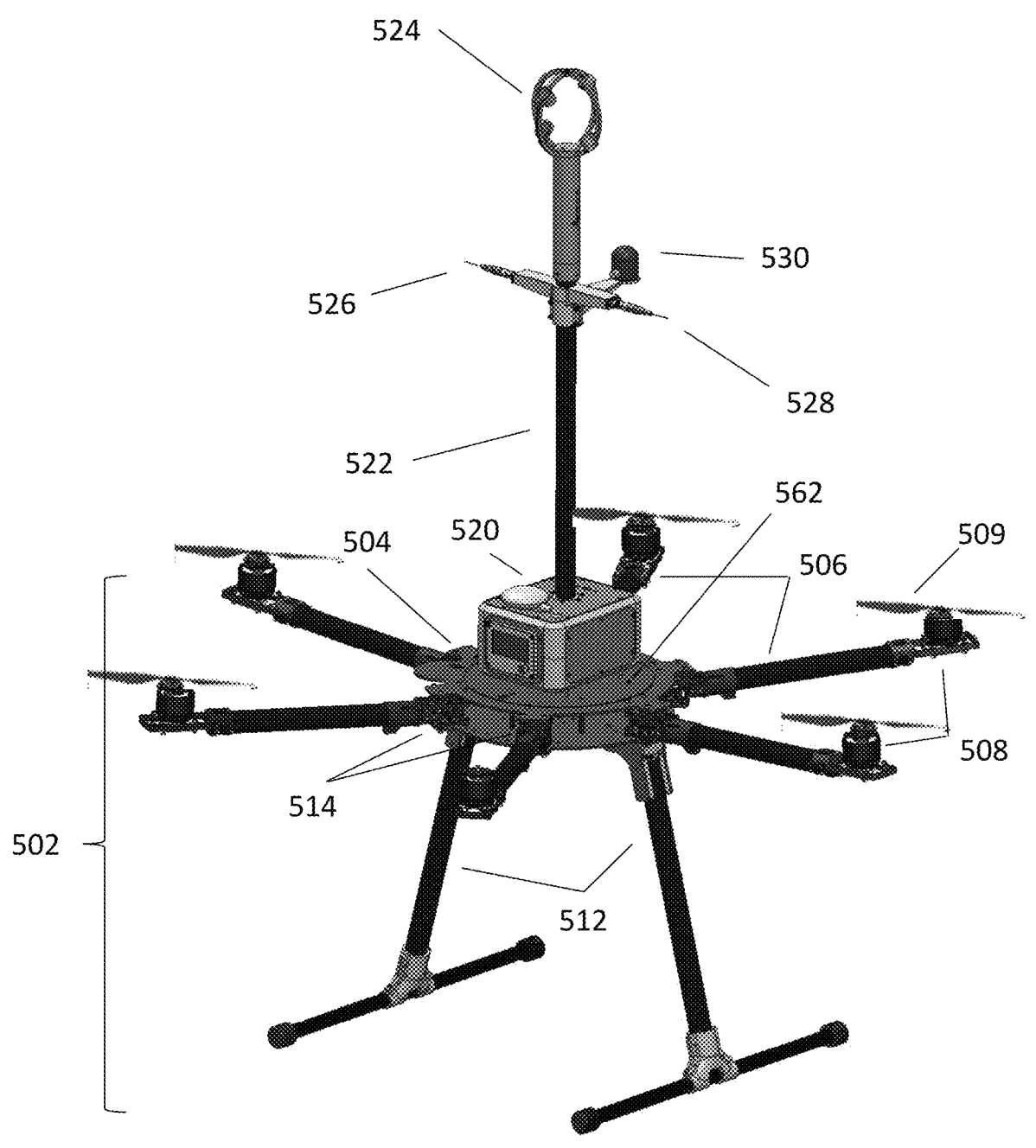
FIG. 5A is a schematic illustration of an apparatus for measuring optical turbulence in conjunction with an unmanned aerial vehicle in accordance with embodiments of the present invention.
Figure 5B:
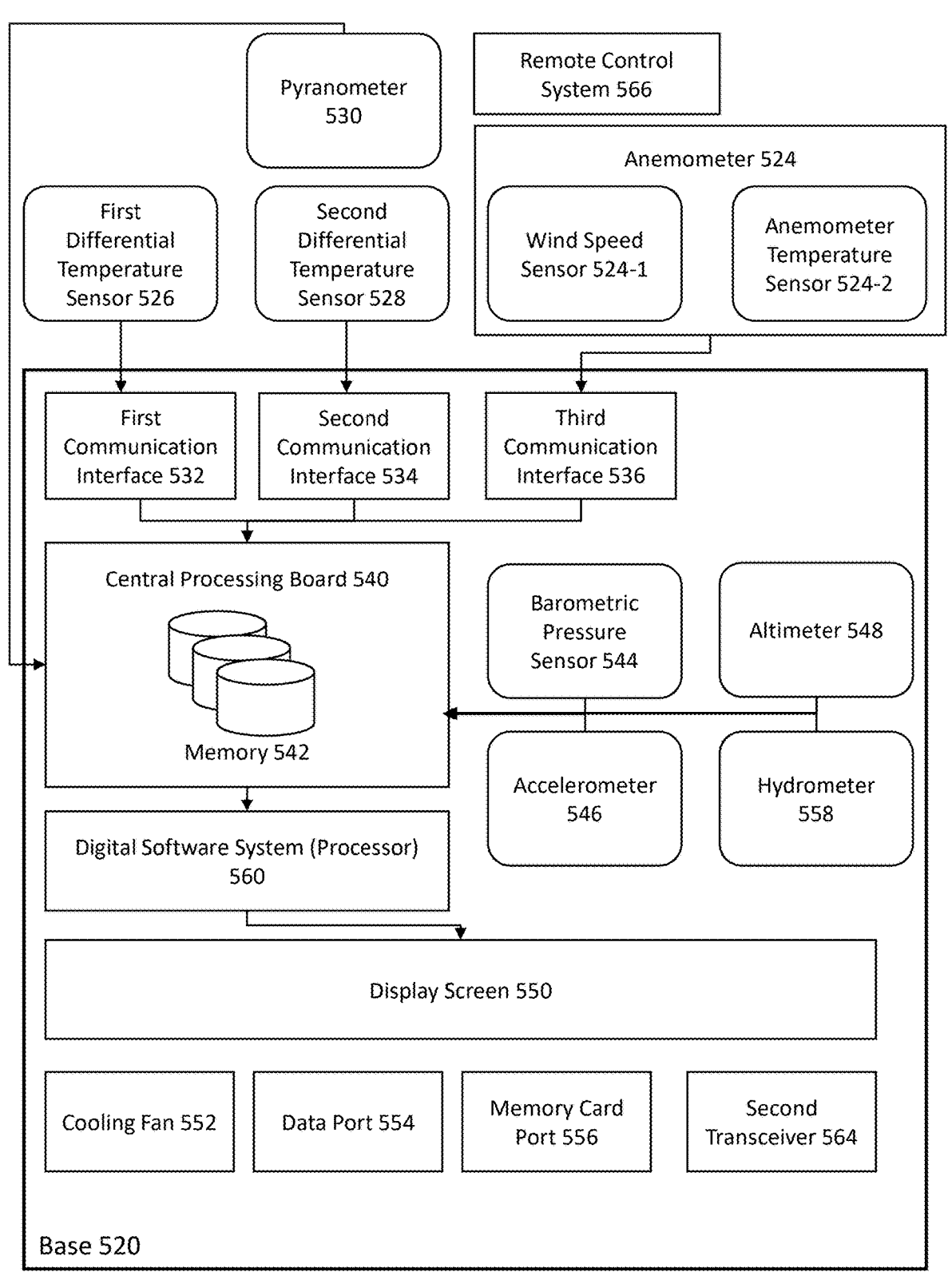
FIG. 5B is a schematic illustration of the base of an apparatus for measuring optical turbulence in conjunction with an unmanned aerial vehicle in accordance with embodiments of the present invention.
Figure 5C:
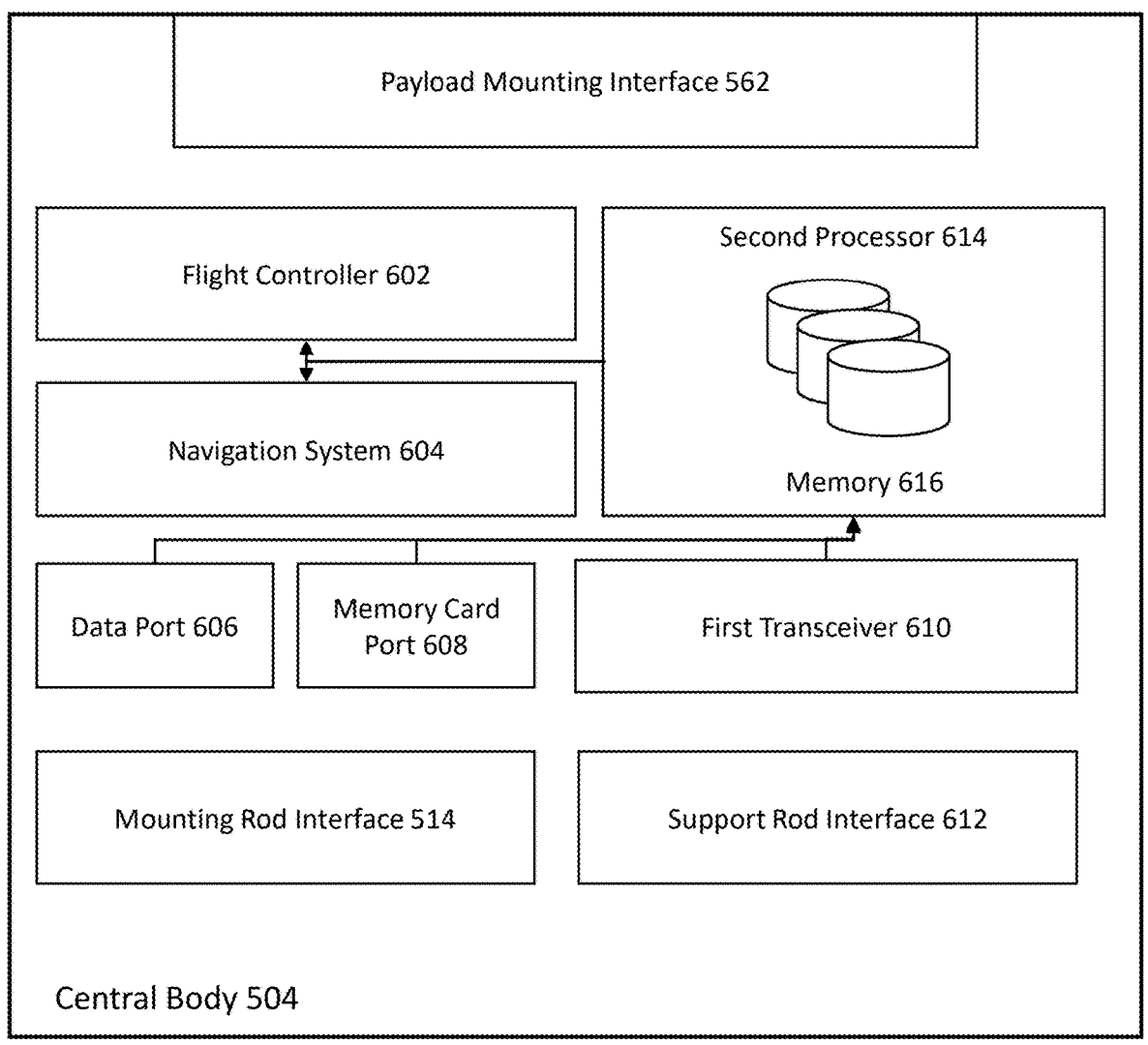
FIG. 5C is a schematic illustration of the central body of an apparatus for measuring optical turbulence in conjunction with an unmanned aerial vehicle in accordance with embodiments of the present invention.

FIG. 5A is a schematic illustration of an apparatus for measuring optical turbulence in conjunction with an unmanned aerial vehicle 502 in accordance with embodiments of the present invention. In embodiments, the unmanned aerial vehicle 502 may be a drone. In embodiments, the unmanned aerial vehicle 502 may include a central body 504, at least one motor 508, the mounting element 522, the first differential temperature sensor 526, the second differential temperature sensor 528, and the three-dimensional anemometer 524. FIG. 5C is a schematic illustration of the central body 504 of an apparatus for measuring optical turbulence in conjunction with an unmanned aerial vehicle 502 in accordance with embodiments of the present invention. In embodiments, the unmanned aerial vehicle 502 may further include a first transceiver 610. In embodiments, the unmanned aerial vehicle 502 may be operated by a remote control 618 via the first transceiver 610. In embodiments, the central body 504 may include a first enclosure housing a flight controller 602, a navigation system 604, and a payload mounting interface 562. In embodiments, the central body 504 may be completely enclosed. In embodiments, the central body 504 may be open on one or more sides. In embodiments, the flight controller 602 may be configured to direct the movement of the unmanned aerial vehicle 502. In embodiments, the unmanned aerial vehicle 502 may be preprogrammed with memory 616 operatively connected to the flight controller 602. In embodiments, the unmanned aerial vehicle 502 may be preprogrammed via a wired connection (e.g., data port 606). In embodiments, the unmanned aerial vehicle 502 may be preprogrammed via removeable memory (via e.g., memory card port 608). For example, in embodiments, the removeable memory 608 may be an SD Card, such as a Secure Digital Card, Secure Digital High Capacity Card, a Secure Digital Extended Capacity Card, or a Micro Secure Digital Card to name a few. In embodiments, the unmanned aerial vehicle 502 may be configured to receive instructions via the first transceiver 610. In embodiments, the navigation system 604 may be configured to generate three-dimensional position information associated with the unmanned aerial vehicle 502 in three-dimensional space. For example, in embodiments the navigation system 604 may be a GPS system. In embodiments, the central body 504 may further include a plurality of mounting rod interfaces 514. In embodiments, the central body 504 may further include a plurality of support rod interfaces. In embodiments, the central body may include a plurality of motor mounting rods 506 wherein each motor mounting rod of the plurality of motor mounting rods 506 is operatively connected to the central body 504 via a respective mounting rod interface of the plurality of mounting rod interfaces 514.

In embodiments, the unmanned aerial vehicle 502 may include at least one motor 508 operatively connected to the central body 504 with at least one respective propeller 509, wherein each motor 508 is operatively connected to the flight controller 602. In embodiments, each propeller 509 has two or more blades. In embodiments, the at least one motor 508 is mounted to a respective motor mounting rod of the plurality of motor mounting rods 506. In embodiments, the at least one motor 508 may be a three-phase motor. In embodiments, the unmanned aerial vehicle 502 may have any number of motors 508 and corresponding propellers 509. For example, in embodiments, the unmanned arial vehicle 502 may include 2 motors 508, along with 2 corresponding propellers 509. In embodiments, the unmanned arial vehicle 502 may include 4 motors 508, along with 4 corresponding propellers 509. In embodiments, the unmanned arial vehicle 502 may include 6 motors 508, along with 6 corresponding propellers 509. In embodiments, the unmanned arial vehicle 502 may include 8 motors 508, along with 8 corresponding propellers 509.

In embodiments, the unmanned arial vehicle 502 may include a mounting element 522. In embodiments, the mounting element 522 may be, for example, a rod, shaft, mast, or bracket to name a few. In embodiments the mounting element 522 may be a support rod. In embodiments, the mounting element 522 may be mounted to the base 520 using a masting mount.

In embodiments, the three-dimensional anemometer 524 may be mounted on the mounting element 522 and may be configured to generate first wind speed measurement information associated with a first wind speed at the three-dimensional anemometer 524. In embodiments, the three-dimensional anemometer 524 may be further configured to generate first temperature measurement information associated with a first temperature at the three-dimensional anemometer 524. In embodiments, the three-dimensional anemometer 524 may be configured to generate the first wind speed measurement information at a first sampling rate. In embodiments, the three-dimensional anemometer 524 may be configured to generate the first temperature measurement information at the first sampling rate. In embodiments, the three-dimensional anemometer 524 may be a sonic anemometer. In embodiments, the three-dimensional anemometer 524 may be a standing wave anemometer. In embodiments, the three-dimensional anemometer 524 may be configured to generate first wind direction information associated with a first wind direction at the three-dimensional anemometer 524. In embodiments, the three-dimensional anemometer 524 may be configured to generate first three-dimensional wind speed information associated with a first three-dimensional wind speed at the three-dimensional anemometer 524. In embodiments, the three-dimensional anemometer 524 may be configured to generate wind speed measurements between a range of 0-50 meters per second, with a resolution of at least 0.1 meters pers second. In embodiments, the three-dimensional anemometer 524 may include a magnetometer configured to measure magnetic field. In embodiments, the three-dimensional anemometer 524 may be configured to generate measurement information between a range sampling rates, up to a maximum of 100 Hz. In embodiments, the three-dimensional anemometer 524 may include an anemometer temperature sensor 524-2. In embodiments, the anemometer temperature sensor 524-2 may be operable to generate temperature measurement information between a range of temperatures (e.g., 40° C. to 80° C.). In embodiments, the three-dimensional anemometer 524 may include an accelerometer configured to generate pitch, yaw and roll axis rotation measurement information. In embodiments, the three-dimensional anemometer 524 may be spherically shaped so as to reduce shadow correction, which is a problem with conventional anemometers. Conventional anemometers may be shadowed by up to 30%, making wind speed measurements unsuitable for generating optical turbulence information accurately. In embodiments, the open spherical design of the three-dimensional anemometer 524 may increase the accuracy of vertical wind measurements, thereby increasing the accuracy of optical turbulence measurements by the system.

In embodiments, the first differential temperature sensor 526 may be mounted on the mounting element 522 and may be configured to generate second temperature measurement information associated with a second temperature at the first differential temperature sensor 526. In embodiments, the first differential temperature sensor may be configured to generate the second temperature measurement information at the first sampling rate.

In embodiments, the second differential temperature sensor 528 may be mounted to the mounting element 522 and may be configured to generate third temperature measurement information associated with a third temperature at the second differential temperature sensor 528. In embodiments, the second differential temperature sensor 528 may be configured to generate the third temperature measurement information at the first sampling rate. In embodiments, the unmanned aerial vehicle 502 may further include a pyranometer 530 mounted to the mounting element 522 and may be configured to generate solar irradiance measurement information associated with a solar irradiance at the pyranometer 530. In embodiments, the pyranometer 530 may be configured to generate the solar irradiance information at the first sampling rate.

In embodiments, the base 520 may be mounted to the central body 504 via the payload mounting interface 562. FIG. 5B is a schematic illustration of the base 520 of an apparatus for measuring optical turbulence in conjunction with an unmanned aerial vehicle 502 in accordance with embodiments of the present invention. In embodiments, referring to FIG. 5B, the base 520 may include a second enclosure housing a first barometric pressure sensor 544, a central processing board 540, memory 542 operatively connected to the central processing board 540, and a processor 560 operatively connected to the memory 542. In embodiments, the second enclosure may include one or more openings to allow for external connections. In embodiments, the base 520 may further include one or more of an accelerometer 546, an altimeter 548, a hydrometer 558, a cooling fan 552, a data port 554, a removeable memory card port 556, and/or a display screen 550.

In embodiments, the first barometric pressure sensor 544 may be configured to generate first barometric pressure measurement information associated with a first barometric pressure at the first barometric pressure sensor 544. In embodiments, the first barometric pressure sensor 544 may be configured to generate the first barometric pressure information at the first sampling rate. In embodiments, the accelerometer 546 may be configured to generate three-dimensional position measurement information associated with a three-dimensional position at the accelerometer 546. In embodiments, the accelerometer 546 may be configured to generate the three-dimensional position information at the first sampling rate. In embodiments, the altimeter 548 may be configured to generate altitude measurement information associated with an altitude at the altimeter 548. In embodiments, the altimeter 548 may be configured to generate the altitude information at the first sampling rate. In embodiments, the hydrometer 558 may be configured to generate humidity measurement information associated with a humidity at the hydrometer 558. In embodiments, the hydrometer 558 may be configured to generate the humidity measurement information at the first sampling rate.

In embodiments, the central processing board 540 may be configured to obtain during a first period of time: the first temperature measurement information from the three-dimensional anemometer 524; the second temperature measurement information from the first differential temperature sensor 526; the third temperature measurement information from the second differential temperature sensor 528; the first wind speed information from the three-dimensional anemometer 524; and the first barometric pressure information from the first barometric pressure sensor 544. In embodiments, the central processing board 540 may be further configured to obtain the first altitude measurement information from the altimeter 548. In embodiments, the central processing board may be configured to obtain the first three-dimensional position measurement information from the accelerometer 546. In embodiments, the central processing board may be configured to obtain the first humidity measurement information from the hydrometer 558.

In embodiments, the memory 542 operatively connected to the central processing board 540 may be configured to store the first temperature measurement information, the second temperature measurement information, the first wind speed measurement information, and the first barometric pressure measurement information with a respective associated time stamp associated with the first period of time.

In embodiments, the processor 560 operatively connected to the memory 542 may be configured to generate refractive-index structure coefficient information based at least on the first temperature measurement information, the second temperature measurement information, the first wind speed measurement information, and the first barometric pressure measurement information obtained during the first period of time. In embodiments, the processor 560 may be configured to generate the first refractive-index structure coefficient information by a first step of calculating, by the processor 560, a first estimated sensor spacing value based at least on the first wind speed measurement information, and a first start time and a first end time associated with the first period of time. In embodiments, the first sensor spacing value may be calculated by the formula:

$$r = \frac{U}{(t_2 - t_1)} \qquad \text{Equation 6}$$

wherein r is the first estimated sensor spacing value, $\overline{U}$ is a first wind speed value from the first wind speed measurement information, $t_1$ corresponds to the first start time associated with the first period of time, and $t_2$ corresponds to the first end time associated with the first period of time.

In embodiments, the processor 560 in a second step may determine a first temperature structure coefficient based at least on the first estimated sensor spacing value and at least one of the first temperature measurement information, the second temperature measurement information, and the third temperature measurement information generated during the first period of time. In embodiments, the first temperature structure coefficient may be determined by the formula:

$$C_t^2 = \frac{(\Delta T)^2}{r^{2/3}} \qquad \text{Equation 7}$$

wherein $$C_t^2$$

is the first temperature structure coefficient, $\Delta T$ is a first temperature differential value based on at least one of the first temperature measurement information, the second temperature measurement information, and the third temperature measurement information, and r is the first estimated sensor spacing value. In embodiments, the processer 560 may be configured to determine a second temperature structure coefficient based at least on the first estimated sensor spacing value and at least one of the first temperature measurement information, the second temperature measurement information, and the third temperature measurement information generated during the first period of time. In embodiments, the processer 560 may be configured to determine a third temperature structure coefficient based at least on the first estimated sensor spacing value and at least one of the first temperature measurement information, the second temperature measurement information, and the third temperature measurement information generated during the first period of time.

In embodiments, the processor 560 in a third step may determine first refractive-index structure coefficient information indicative of optical turbulence during the first period of time based at least on the first temperature structure coefficient, the first barometric pressure measurement information, and at least one of the first temperature measurement information, the second temperature measurement information, and the third temperature measurement information. In embodiments, the first refractive-index structure coefficient information may be determined by the formula:

$$C_{n1}^2 = \left[79\frac{P}{T^2}\right]^2 \times 10^{-12} C_T^2 \qquad \text{Equation 8}$$

wherein $C_{n1}{}^2$ is the first refractive-index structure coefficient, P is a first barometric pressure value based on the first measurement information, $C_t{}^2$ is the first temperature structure coefficient, and T is a first temperature measurement value based on at least one of the first temperature measurement information, the second temperature measurement information, and the third temperature measurement information. In embodiments, the processor 560 may determine second refractive-index structure coefficient information indicative of optical turbulence during the first period of time based at least on the second temperature structure coefficient, the first barometric pressure measurement information, and at least one of the first temperature measurement information, the second temperature measurement information, and the third temperature measurement information. In embodiments, the processor 560 may determine third refractive-index structure coefficient information indicative of optical turbulence during the first period of time based at least on the third temperature structure coefficient, the first barometric pressure measurement information, and at least one of the first temperature measurement information, the second temperature measurement information, and the third temperature measurement information.

In embodiments, the processor 560 in a fourth step may transmit the first refractive-index structure coefficient information to an optical system. In embodiments, the processor 560 may transmit the second refractive-index structure coefficient information to the optical system. In embodiments, the processor 560 may transmit the third refractive-index structure coefficient information to the optical system.

In embodiments, the first differential temperature sensor 526 may be operatively connected to the central processing board 540 via a first communication interface 532. In embodiments, the second differential temperature sensor 528 may be operatively connected to the central processing board 540 via a second communication interface 534. In embodiments, the three-dimensional anemometer 524 may be operatively connected to the central processing board 540 via a third communication interface 536.

In embodiments, the base 520 may further include a second transceiver 564. In embodiments, the second transceiver 564 may be operatively connected to the processer 540. In embodiments, the second transceiver 564 may be operatively connected to the memory 542. In embodiments, the processor 560 may be configured to communicate with an optical system. In embodiments, the refractive-index structure coefficient information may be provided to the optical system via the second transceiver. In embodiments, the second transceiver 564 may be the same as the first transceiver 610.

Figure 6:
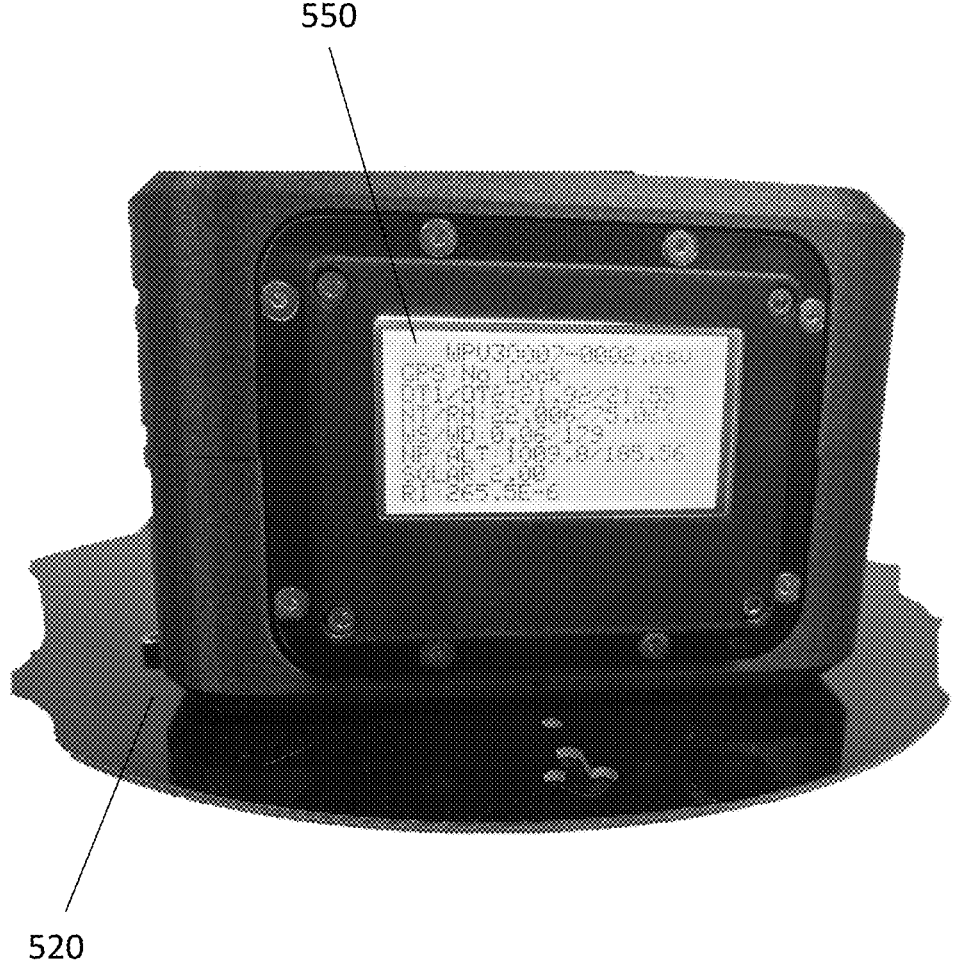
FIG. 6 is a schematic illustration of the base of an apparatus for measuring optical turbulence in accordance with embodiments of the present invention.

FIG. 6 is a schematic illustration of the base 520 of an apparatus for measuring optical turbulence in accordance with embodiments of the present invention. In embodiments, the display screen 550 may be operatively connected to the processor 560. In embodiments, the display screen 550 may be operatively connected to the memory 542. In embodiments, the display screen 550 may be configured to display in real time at least one or more of: the first temperature measurement information; the second temperature measurement information; the third temperature measurement information; the first wind speed measurement information; the humidity measurement information; the altitude measurement information; the solar irradiance measurement information; and/or turbulence measurement information. In embodiments, the display screen may be an LCD display screen.

FIGS. 11A, 11B, and 11A-1-11A-11 are schematic diagrams of process flows for measuring optical turbulence using an unmanned aerial vehicle 500 in accordance with embodiments of the present invention. In embodiments, the unmanned aerial vehicle 500 may be configured to move between a plurality of positions in three-dimensional space. For example, in embodiments, the unmanned aerial vehicle may be configured to move between the plurality of positions in three-dimensional space based on instructions provided via a remote control. In embodiments, the unmanned aerial vehicle 500 may include an accelerometer 546 configured to generate pitch angle measurement information, roll angle measurement information, and heading angle information associated with a respective position of the unmanned aerial vehicle 500. In embodiments, the accelerometer 546 may be located within the base 520 of the unmanned aerial vehicle 500. In embodiments, the unmanned aerial vehicle 500 may include an altimeter 548 configured to generate altitude measurement information associated with a respective position of the unmanned aerial vehicle 500. In embodiments, the accelerometer 548 may be located within the base 520 of the unmanned aerial vehicle 500.

Figures 3, 11A:
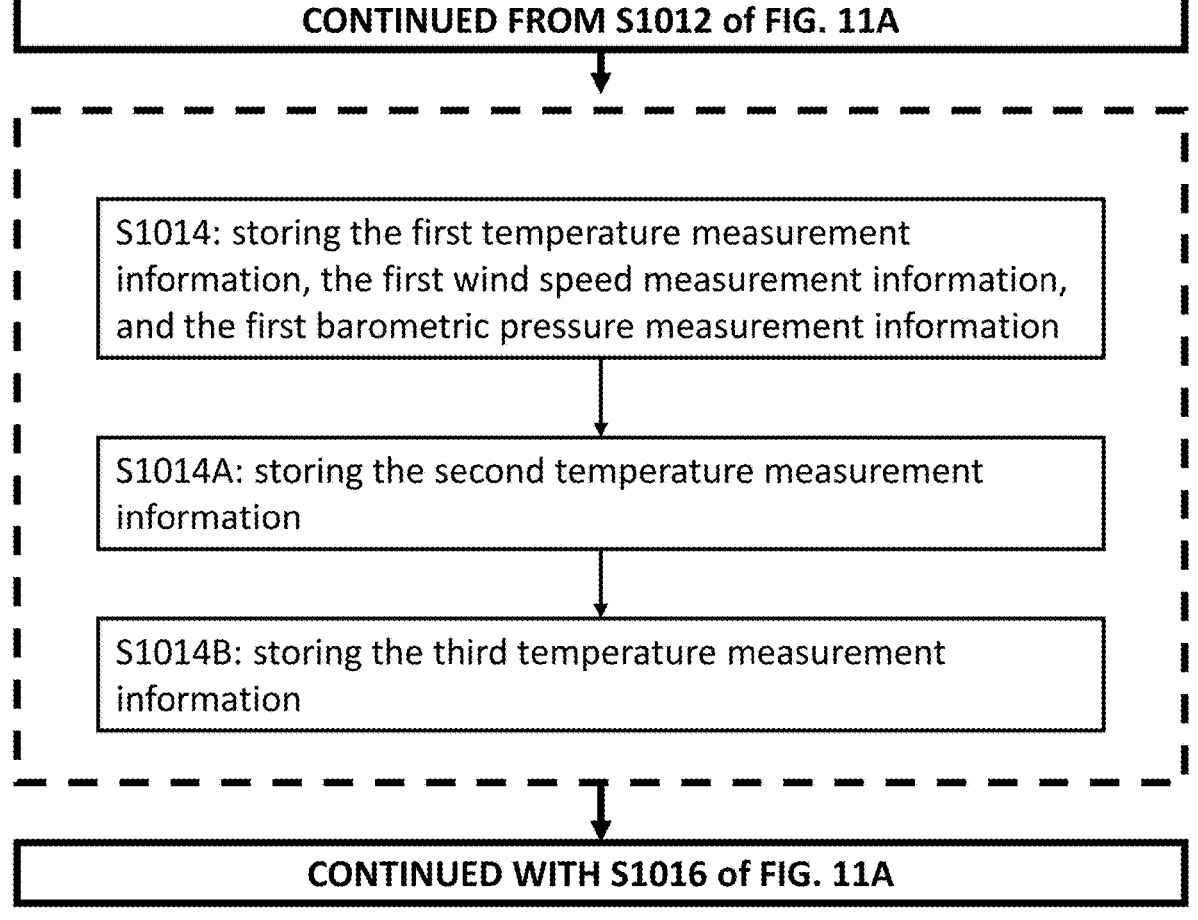

In embodiments, referring to FIG. 11A, an exemplary process for measuring optical turbulence using an unmanned aerial vehicle may begin with step S1002. At step S1002, in embodiments, a first temperature sensor operatively connected to a central processing board 540, both of which are mounted on the unmanned aerial vehicle 500, may generate first temperature measurement information at a first sampling rate (e.g., 50 Hz, 75 Hz, 100 Hz, to name a few), the first temperature measurement information associated with a first temperature at the first temperature sensor during a first period of time defined by a first start time and a first end time. In embodiments, the first temperature sensor may be operatively connected to the central processing board 540 via a first communication interface 532. In embodiments, temperature measurement information may be measure in degrees Celsius, Fahrenheit, or Kelvin, to name a few. In embodiments, referring to FIG. 11A-1, the process may continue with step S1002A. However, in embodiments, the process may instead skip step S1002A, and proceed directly to step S1004. At S1002A, in embodiments, a second temperature sensor mounted on the unmanned aerial vehicle 500 and operatively connected to the central processing board 540 may generate second temperature measurement information at the first sampling rate, the second temperature information associated with a second temperature at the second temperature sensor during the first period of time. In embodiments, the second temperature sensor may be operatively connected to the central processing board 540 via a second communication interface 534. In embodiments, the second temperature measurement information may be the same as the first temperature measurement information. In embodiments, the second temperature measurement information may be different from the first temperature measurement information. In embodiments, the first temperature sensor may be an anemometer temperature sensor 524-2. In embodiments, the second temperature sensor may be a first differential temperature sensor 526. In embodiments, the first temperature sensor may be a first differential temperature sensor 526. In embodiments, the second temperature sensor may be a second differential temperature sensor 528. In embodiments, the second temperature sensor may be anemometer temperature sensor 524-2.

In embodiments, referring to FIG. 11A-1, the process may continue with step S1002B. However, in embodiments, the process may instead skip step S1002A, and proceed directly to step S1004. At step S1002B, a third temperature sensor mounted on the unmanned aerial vehicle 500 and operatively connected to the central processing board 540 may generate third temperature measurement information at the first sampling rate, the third temperature measurement information associated with a third temperature at the third temperature sensor during the first period of time. In embodiments, the third temperature sensor may be operatively connected to the central processing board 540 via the fourth communication interface 538. In embodiments, the first temperature sensor may be an anemometer temperature sensor 524-2, the second temperature sensor may be a first differential temperature sensor 526, and the third temperature sensor may be a second differential temperature sensor 528. In embodiments, the first temperature sensor may be a first differential temperature sensor 526, the second temperature sensor may be an anemometer temperature sensor 524-2, and the third temperature sensor is a second differential temperature sensor 528. In embodiments, the first temperature sensor may be a first differential temperature sensor 526, the second temperature sensor may be a second differential temperature sensor 528, and the third temperature sensor may be an anemometer temperature sensor 524-2.

In embodiments, referring to FIG. 11A, the process may continue with step S1004. In embodiments, at step S1004, a first wind speed sensor 524-1 mounted on the unmanned aerial vehicle 500 and operatively connected to the central processing board 540 may generate first wind speed measurement information at the first sampling rate associated with a first wind speed at the first wind speed sensor 524-1 during the first period of time. In embodiments, the first wind speed sensor 524-1 may be a three-dimensional anemometer 524. In embodiments, the anemometer 524 may include a wind speed sensor 524-1 and an anemometer temperature sensor 524-2. In embodiments, the first wind speed sensor 524-1 may be a sonic anemometer. In embodiments, the first wind speed sensor 524-1 may be a standing wave anemometer.

In embodiments, referring to FIG. 11A, the process may continue with step S1006. At step S1006, a first barometric pressure sensor 544 mounted on the unmanned aerial vehicle 500 and operatively connected to the central processing board 540 may generate first wind speed measurement information at the first sampling rate associated with a first wind speed at the first wind speed sensor 544 during the first period of time. In embodiments, the first barometric pressure sensor 544 may be located within the base 520 of the unmanned aerial vehicle 500. In embodiments, the first barometric pressure sensor 544 may be a barometer. In embodiments, steps S1002, S1004, and S1006 and their respective sub-steps may be rearranged or omitted.

In embodiments, referring to FIG. 11A, the process may continue with step S1008. At step S1008, the first temperature measurement information generated during the first period of time may be transmitted from the first temperature sensor to the central processing board 540. In embodiments, referring to FIG. 11A-2, the process may continue with step S1008A. However, in embodiments, the process may instead skip step S1008A, and proceed directly to step S1010. At step S1008A, the second temperature measurement information generated during the first period of time may be transmitted from the second temperature sensor to the central processing board 540. In embodiments, referring to FIG. 11A-2, the process may continue with step S1008B. However, in embodiments, the process may instead skip step S1008B, and proceed directly to step S1010. At step S1008B, the third temperature measurement information generated during the first period of time may be transmitted from the third temperature sensor to the central processing board 540.

In embodiments, referring to FIG. 11A, the process may continue with step S1010. At step S1010, the first wind speed measurement information may be transmitted from the first wind speed sensor to the central processing board 540. In embodiments, the process may continue with step S1012. At step S1012, the first barometric pressure measurement information generated during the first period of time may be transmitted from the first barometric pressure sensor to the central processing board 540. In embodiments, barometric pressure measurement information may be measured in bars, millibars, Pascals, or Kilopascals to name a few. In embodiments, steps S1008, S1010, and S1012 may be rearranged or omitted.

Figure 12:
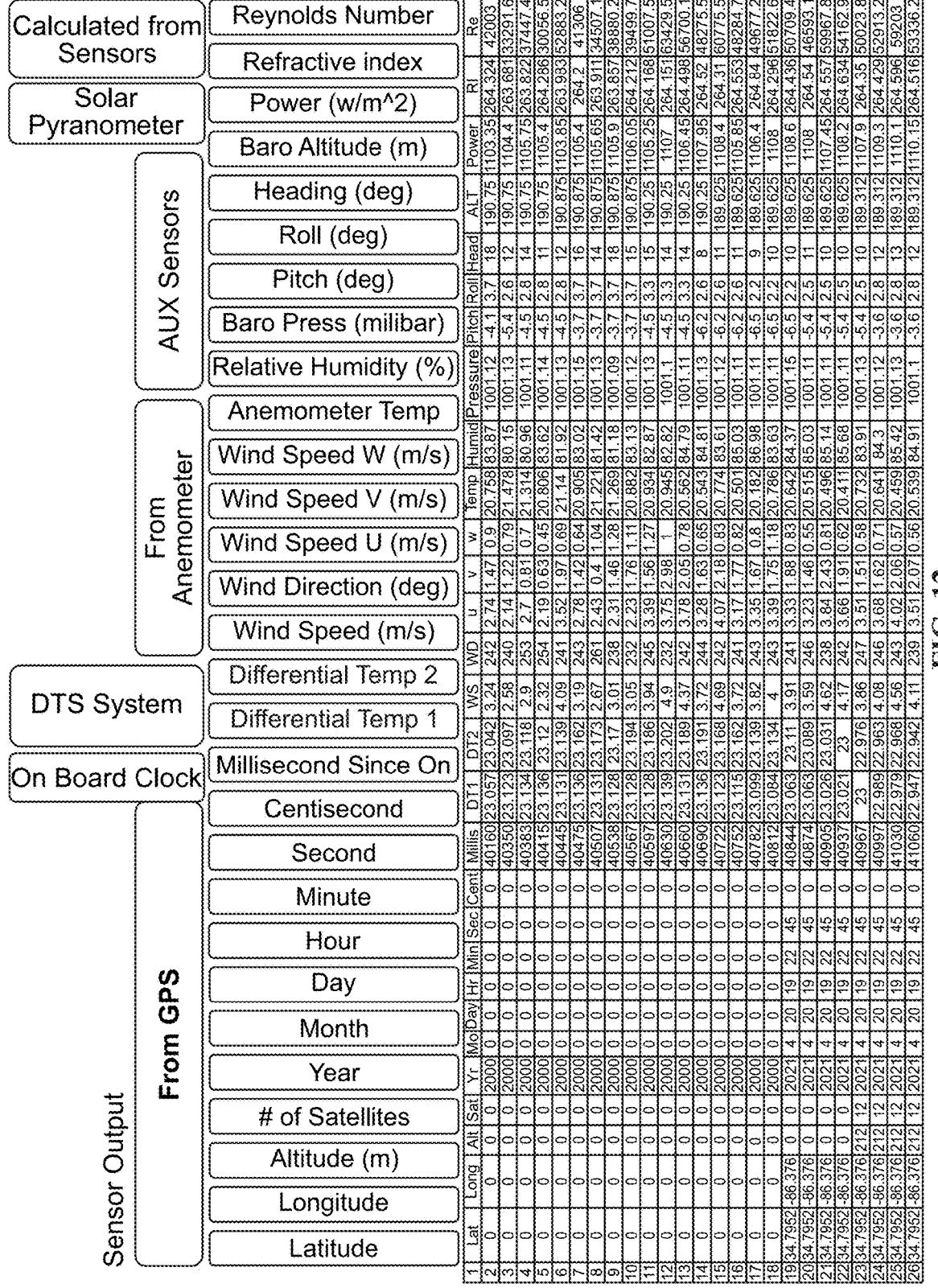
FIG. 12 is a table depicting exemplary sensor output information in accordance with embodiments of the present invention.

FIG. 12 is a table depicting exemplary sensor output information in accordance with embodiments of the present invention. In embodiments, the information depicted in the table of FIG. 12 may be similar to the data generated by each sensor in the previous steps of the process.

In embodiments, referring to FIG. 11A, the process may continue with step S1014. In embodiments, at step S1014, the first temperature measurement information, the first wind speed measurement information, and the first barometric pressure measurement information may be stored in memory 542 operatively connected to the central processing board 540. In embodiments, the memory 542 may be nonremovable memory. In embodiments, the first temperature measurement information, the first wind speed measurement information, and the first barometric pressure measurement information may be stored on the nonremovable memory. In embodiments, the memory 542 may be a removable memory card. For example, in embodiments, the memory may be an SD card, such as a Secure Digital Card, Secure Digital High Capacity Card, a Secure Digital Extended Capacity Card, or a Micro Secure Digital Card, to name a few. In embodiments, the first temperature measurement information, the first wind speed measurement information, and the first barometric pressure measurement information may be stored on the removeable memory card. In embodiments, the removeable memory card may be held in memory card port 556 of the base 520 while the unmanned aerial vehicle 500 is being used, and may be removed for data processing.

In embodiments, referring to FIG. 11A-3, the process may continue with step S1014A. However, in embodiments, the process may instead skip step S1014A, and proceed directly to step S1016. In embodiments, at step S1014A, the second temperature measurement information may be stored in the memory 542 operatively connected to the central processing board 540. In embodiments, the second temperature measurement information may be stored on the nonremovable memory. In embodiments, the second temperature measurement information may be stored on the removable memory card. In embodiments, referring to FIG. 11A-3, the process may continue with step S1014B. However, in embodiments, the process may instead skip step S1014B, and proceed directly to step S1016. At step S1014B, the third temperature measurement information may be stored in the memory 542 operatively connected to the central processing board 540. In embodiments, the third temperature measurement information may be stored on the nonremovable memory. In embodiments, the third temperature measurement information may be stored on the removeable memory card. In embodiments, steps S1014, 1014A, and 1014B may be rearranged or omitted.

In embodiments, referring to FIG. 11A, the process may continue with step S1016. In embodiments, at step S1016, the first temperature measurement information, the first wind speed measurement information, and the first barometric pressure measurement information may be obtained from the memory by a digital software system (e.g., a processor 560). In embodiments, the digital software system 560 may be any data processing system or file. In embodiments, the first temperature measurement information, the first wind speed measurement information, and the first barometric pressure measurement information may be transmitted to the digital software system 560 via a communication system. In embodiments, the digital software system 560 may be operatively connected to the central processing board 540. In embodiments, the digital software system 560 may be located remotely from the unmanned aerial vehicle 540 and may be operatively connected to the central processing board 540 via a wireless connection. In embodiments, the digital software system 560 may be operatively connected to the central processing board 540 via a wired connection. For example, the digital software system 560 may obtain information by wired connection via USB port 554. In embodiments, the first temperature measurement information, the first wind speed measurement information, and the first barometric pressure measurement information may be obtained wirelessly. In embodiments, the first temperature measurement information, the first wind speed measurement information, and the first barometric pressure measurement information may be obtained periodically. In embodiments, the first temperature measurement information, the first wind speed measurement information, and the first barometric pressure measurement information may be obtained aperiodically. In embodiments, the first temperature measurement information, the first wind speed measurement information, and the first barometric pressure measurement information may be obtained in real time as part of a streaming data stream.

In embodiments, referring to step S11A-4, the process may continue step S1016A. However, in embodiments, the process may instead skip step S1016A, and proceed directly to step S1018A. In embodiments, at step S1016A, the second temperature measurement information may be obtained by the digital software system 560 from the memory 542. In embodiments, the second temperature measurement information may be obtained wirelessly. In embodiments, the second temperature measurement information may be obtained periodically. In embodiments, the second temperature measurement information may be obtained aperiodically. In embodiments, the second temperature measurement information may be obtained in real time as part of a streaming data stream. In embodiments, referring to step S11A-4, the process may continue step S1016B. However, in embodiments, the process may instead skip step S1016B, and proceed directly to step S1018A. In embodiments, at step S1018A, the third temperature measurement information may be obtained by the digital software system 560 from the memory 542. In embodiments, the third temperature measurement information may be obtained wirelessly. In embodiments, the third temperature measurement information may be obtained periodically. In embodiments, the third temperature measurement information may be obtained aperiodically. In embodiments, the third temperature measurement information may be obtained in real time as part of a streaming data stream. In embodiments, steps S1016, S1016A, and S1016B may be rearranged or omitted.

In embodiments, referring to FIG. 11B, the process may continue with step S1018A. At step S1018A, the digital software system 560 may determine first power spectral density information associated with a plurality of frequencies based at least on the first temperature measurement information. In embodiments, the first power spectral density information may include a power spectral density temperature profile over a range of the plurality of frequencies.

Figure 7:
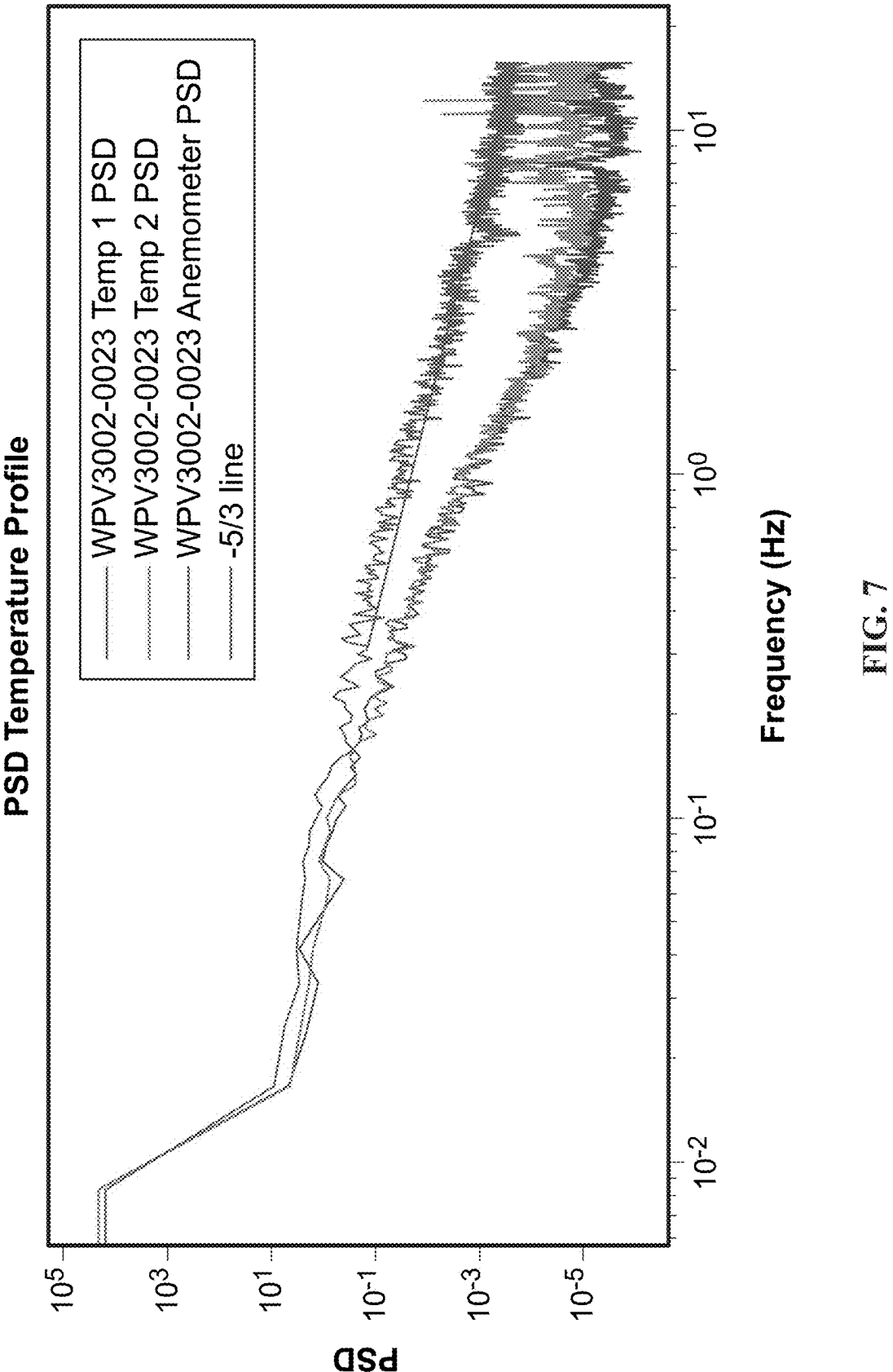
FIG. 7 is a graph depicting the power spectral density temperature profile of a plurality of weather measurement sensors in accordance with embodiments of the present invention.

In embodiments, the first power spectral density information may be determined based on a Fourier transform of the first temperature information during the first period of time. In embodiments, the power spectral density information may be determined by integrating the Fourier transform of the first temperature measurement information across the first period of time to get a power profile over a range of frequencies. In embodiments, the Fourier transform may be a Walsh transform. A Walsh transform is analogous to a Fourier transform, but instead uses rectangular waves, rather than sine and/or cosine waves. Walsh functions form an orthogonal set of functions that be used to represent a discrete function, and thus can be viewed as discrete, digital counterparts of the continuous analog system of trigonometric functions associated with a Fourier transform. In embodiments, power spectral density information determined by a Walsh transform may be generated in MATLAB®. In embodiments, the first power spectral density information determined by the Walsh transform may be determined by taking a "pWalsh( )" function of the first temperature measurement information. FIG. 7 is a graph depicting the power spectral density temperature profile of a plurality of weather measurement sensors in accordance with embodiments of the present invention. Referring to FIG. 7, in embodiments, the power spectral density temperature profile of a first differential temperature sensor, a second differential temperature sensor, and an anemometer temperature sensor are shown. In embodiments, the power spectral density profile may be taken over a range of frequencies, or example from $10^{-2}$ Hz to 10 Hz.

In embodiments, the process may continue with step S1018B. At step S1018B, the digital software system 560 may determine second power spectral density information associated with the plurality of frequencies based at least on the first wind speed measurement information. In embodiments, as described above, the second power spectral density information may be determined based on a Fourier transform and/or Walsh transform of the first wind speed measurement information during the first period of time. In embodiments, the second power spectral density information may then be determined by integrating the Fourier and/or Walsh transform function over the first period of time to get the power spectral density temperature profile.

In embodiments, referring to FIG. 11A-5, the process may continue with step S1018C. However, in embodiments, the process may instead skip step S1018C, and proceed directly to step S1020. At step S1018C, the digital software system 560 may determine third power spectral density information associated with the plurality of frequencies based at least on the second temperature measurement information. In embodiments, as described above, the third power spectral density information may be determined based on a Fourier transform and/or Walsh transform of the second temperature measurement information. In embodiments, the third power spectral density information may then be determined by integrating the Fourier and/or Walsh transform function over the first period of time to get the power spectral density temperature profile. In embodiments, referring to FIG. 11A-5, the process may continue with step S1018D. However, in embodiments, the process may instead skip step S1018D, and proceed directly to step S1020. At step S1018C, the digital software system 560 may determine fourth power spectral density information associated with the plurality of frequencies based at least on the third temperature measurement information. In embodiments, the fourth power spectral density information may be determined based on a Fourier and/or Walsh transform of the third temperature measurement information. In embodiments, the fourth power spectral density information may then be determined by integrating the Fourier and/or Walsh transform function over the first period of time to get the power spectral density temperature profile. In embodiments, steps 1018A, 1018B, 1018C, and 1018D may be rearranged or omitted.

In embodiments, referring to FIG. 11B the process may continue with step S1020. At step S1020, the digital software system 560 may determine a first sensor cutoff frequency associated at least one of the first temperature sensor and the first wind speed sensor. In embodiments, the first sensor cutoff frequency may be based on at least one or more of the first power spectral density information and the second power spectral density information. In embodiments, the first sensor cutoff frequency may be a predetermined frequency. In embodiments, the first sensor frequency may be a predetermined frequency selected from a group of predetermined frequencies. In embodiments, the first sensor cutoff frequency may be a predetermined frequency based at least on the first wind speed measurement information. In embodiments, the first sensor cutoff frequency may be associated with the second temperature sensor. In embodiments, the first sensor cutoff frequency may be based at least on the third power spectral density information. In embodiments, the first sensor cutoff frequency may be associated with the third temperature sensor. In embodiments, the first sensor cutoff frequency may be based at least on the fourth power spectral density information.

In embodiments, the first sensor cutoff frequency may be determined based at least on a linear relationship between the first power spectral density information and the first plurality of frequencies. In embodiments, the first sensor cutoff frequency may be determined based at least on a linear relationship between the second power spectral density information and the first plurality of frequencies. In embodiments, the first sensor cutoff frequency may be determined based at least on a linear relationship between the third power spectral density information and the first plurality of frequencies. In embodiments, the first sensor cutoff frequency may indicate a point on the frequency spectrum frequency where a sensor (e.g., a differential temperature sensor, or a three-dimensional anemometer, to name a few) will no longer be able to discern changes in power dissipation at the sensor. The Kolmogorov −5/3 spectrum is generally observed in turbulent flow, which is characterized by a hierarchy of cascading energy (e.g., power dissipation by a sensor over a spectrum frequency range). In embodiments, based on Kolmogorov's theory of turbulence, the slope of the power spectral density temperature profile over a spectrum frequency range should be approximately −5/3. For example, referring to FIG. 7 in embodiments, the power spectral density temperature profile of a three-dimensional anemometer over a full spectrum frequency range from $10^{-2}$ Hz to 10 Hz has an approximate slope of −5/3. However, in embodiments, the power spectral density temperature profile of a first differential temperature sensor and a second differential temperature sensor does not match the approximate −5/3, indicating that each differential temperature sensor has a cutoff frequency less than 10 Hz. In embodiments, the differential temperature sensor may not be able to discern changes in power dissipation at frequencies above the sensor cutoff frequency. Therefore, in embodiments, the first sampling rate may need to be decreased, so that the approximate slope of the power spectral density temperature profile of the first differential temperature sensor and/or the second differential temperature sensor matches the −5/3 line.

In embodiments, referring to FIG. 11B, the process may continue with step S1022. At step S1022, the digital system may decimate the first temperature measurement information, the first wind speed measurement information, and the first barometric pressure measurement information generated at the first sampling rate to a second sampling rate during the first period of time based at least on the first power spectral density information, the second power spectral density information, and the first sensor cutoff frequency. In embodiments, decimating the data may include discarding data points generated by the sensors from the data stream such that the sampling frequency is reduced from the first sampling rate (e.g., 50 Hz, 75 Hz, 100 Hz, to name a few) to the second sampling rate (e.g., 1 Hz, 2 Hz, 5 Hz, to name a few). FIG. 8 is a graph depicting the power spectral density temperature profile of a plurality of weather measurement sensors in accordance with embodiments of the present invention. In embodiments, referring to FIG. 8, decimating the temperature sensor data and/or the wind speed data to the determined first sensor cutoff frequency may correct the power spectral density temperature profile such that slope of each temperature profile matches −5/3. In embodiments, for example, by reducing the sampling rate to 1 Hz by discarding a plurality of data points generated in the above steps at the first sampling rate, the first power spectral density information and the second power spectral density information match the approximate −5/3 slope. In embodiments, this will allow for more accurate data processing. In embodiments, the process for reducing the sampling rate by decimating data may be repeated until the power spectral density temperature profile of each sensor reaches a slope of −5/3.

In embodiments, referring to step 11A-6, the process may continue with step S1022A. However, in embodiments, the process may instead skip step S1022A, and proceed directly to step S1024. At step S1022A, the digital software system 560 may decimate the second temperature measurement information generated at the first sampling rate to the second sampling rate based at least on the third power spectral density information. In embodiments, referring to step 11A-6, the process may continue with step S1022B. However, in embodiments, the process may instead skip step S1022B, and proceed directly to step S1024. At step S1022B, the digital software system 560 may the decimate the third temperature measurement information generated at the first sampling rate to the second sampling rate based at least on the fourth power spectral density information.

Figure 10:
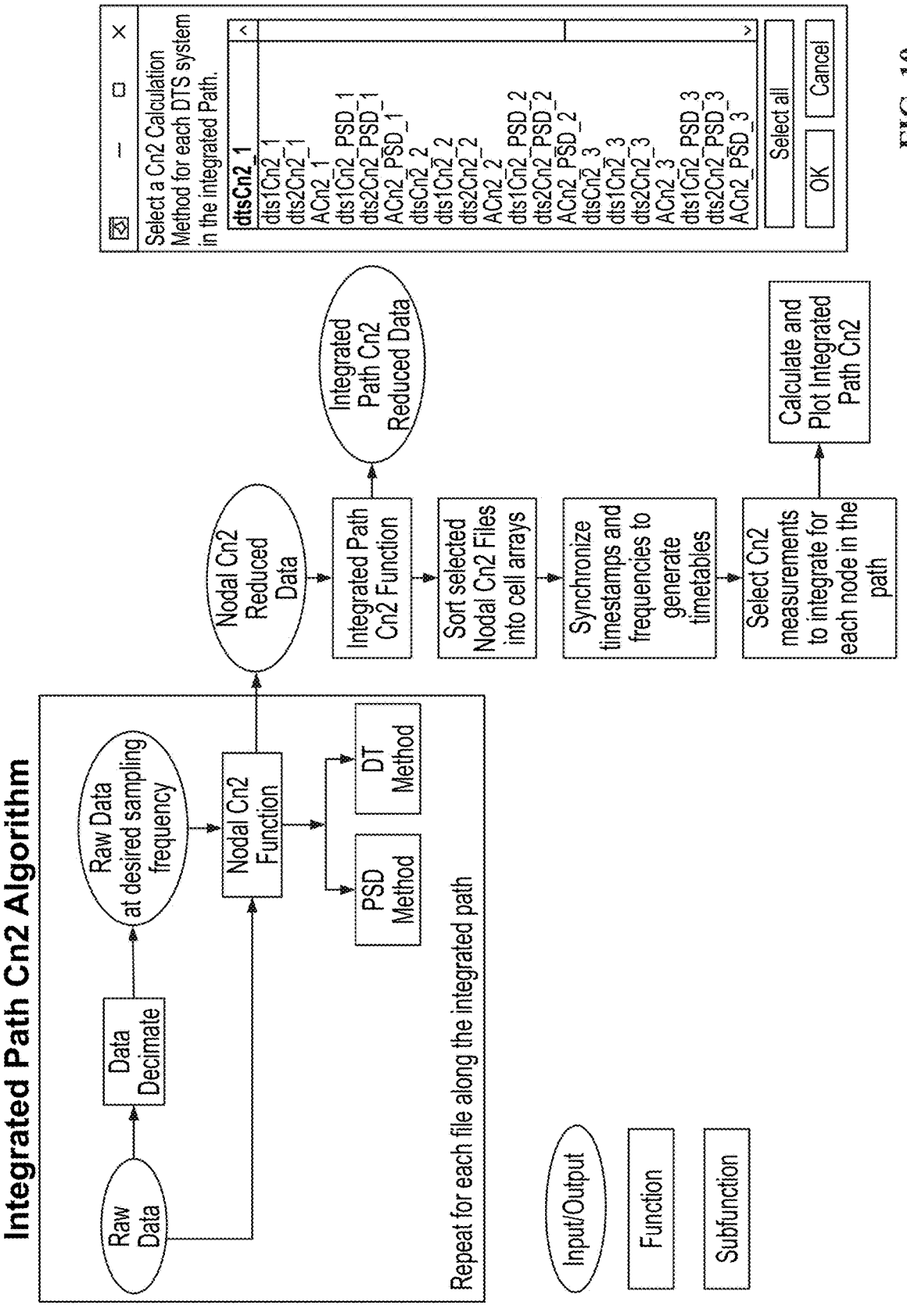
FIG. 10 is a schematic diagram of a process flow for measuring optical turbulence using an unmanned aerial vehicle in accordance with embodiments of the present invention.

FIG. 10 is a schematic diagram of a process flow for measuring optical turbulence using an unmanned aerial vehicle in accordance with embodiments of the present invention. In embodiments, FIG. 10 depicts a process flow for the raw data collection described above and the process for decimating data described in step S1022 and its substeps.

FIG. 13 is a table depicting exemplary decimated sensor output information in accordance with embodiments of the present invention. In embodiments, for example the first sampling rate may be 100 Hz, and the second sampling rate may be 1 Hz. In embodiments, the tables in FIG. 13 depict an exemplary data decimation in accordance with embodiments of the present invention.

In embodiments, after steps S1022, S1022A, and/or S1022B, digital software system 560 may transmit the first temperature measurement information decimated to the second sampling rate during the first period of time, the first wind speed information decimated to the second sampling rate during the first period of time, and the first barometric pressure measurement information decimated to the second sampling rate during the first period of time to a remote control system 566, where the decimated data will be used to measure optical turbulence using one of the below methods. In embodiments, the digital software system 560 may complete the process without transmitting the decimated data to the remote control system 566. In embodiments, the data may be transmitted to the remote control system 566 from the digital software system 560 before it is decimated from the first sampling rate to the second sampling rate. In embodiments, the second temperature measurement information decimated to the second sampling rate during the first period of time may be transmitted from the digital software system 560 to the remote control system 566. In embodiments, the third temperature measurement information decimated to the second sampling rate during the first period of time may be transmitted from the digital software system 560 to the remote control system 566.

In embodiments, the conventional process for measuring optical turbulence may continue with the conventional DTS method, wherein the refractive-index structure coefficient is determined without using wind speed measurement information. In embodiments, the process for measuring optical turbulence using an unmanned aerial vehicle 502 may continue with calculating one or more refractive-index structure coefficients using an anemometer method and/or using a power spectrum method. In embodiments, the refractive-index structure coefficients determined by the anemometer method may be based on a combination of measurements taken by the first wind speed sensor, the first temperature sensor, the second temperature sensor and/or the third temperature sensor. In embodiments, the refractive-index structure coefficients determined by the power spectrum method may be based on power spectral density temperature profile information associated with the first temperature sensor, the second temperature sensor and/or the third temperature sensor as well as the wind speed measurement information generated by the first wind speed sensor.

51

Conventional DTS Method

In embodiments, referring to FIG. 11A-7 after step S1022, S1022A, or S1022B, the process for measuring optical turbulence using an unmanned aerial vehicle 502 may skip step 1024, and continue with a conventional differential temperature sensor (DTS) method starting at step S1026B. In embodiments, this method may not use wind speed to calculate a refractive-index structure coefficient, and may therefore be less accurate than the anemometer method and power spectrum method presented in accordance with embodiments of the present invention. At step S1026B, the digital software system 560 may determine a third temperature structure coefficient based at least on the predetermined sensor spacing value, the second temperature measurement information, and the third temperature measurement information. In embodiments, the step may be performed by the remote control system 566. In embodiments, the third temperature structure coefficient may be determined by the formula:

$$C_{t3}^2 = \frac{(\Delta T_2 - \Delta T_3)^2}{r_p^{2/3}}$$

Equation 9 wherein $$C_{t3}^2$$

is the second temperature structure coefficient, $\Delta T_2$ is a second temperature differential value based on the second temperature measurement information, $\Delta T_3$ is a third temperature differential value based on the third temperature measurement information, and $r_p$ is the predetermined sensor spacing value. In embodiments, the second temperature differential value may be the difference between a first temperature measurement generated at the start time by a second temperature sensor and a second temperature measurement generated at the end time by the second temperature sensor. In embodiments, the second temperature differential value may be calculated by performing a statistical mean subtraction. In embodiments, the third temperature differential value may be the difference between a first temperature measurement generated at the start time by a third temperature sensor and a second temperature measurement generated at the end time by the third temperature sensor. In embodiments, the third temperature differential value may be calculated by performing a statistical mean subtraction. In embodiments, the predetermined sensor spacing value may be, for example, the distance between two temperatures sensor.

Figure 9:
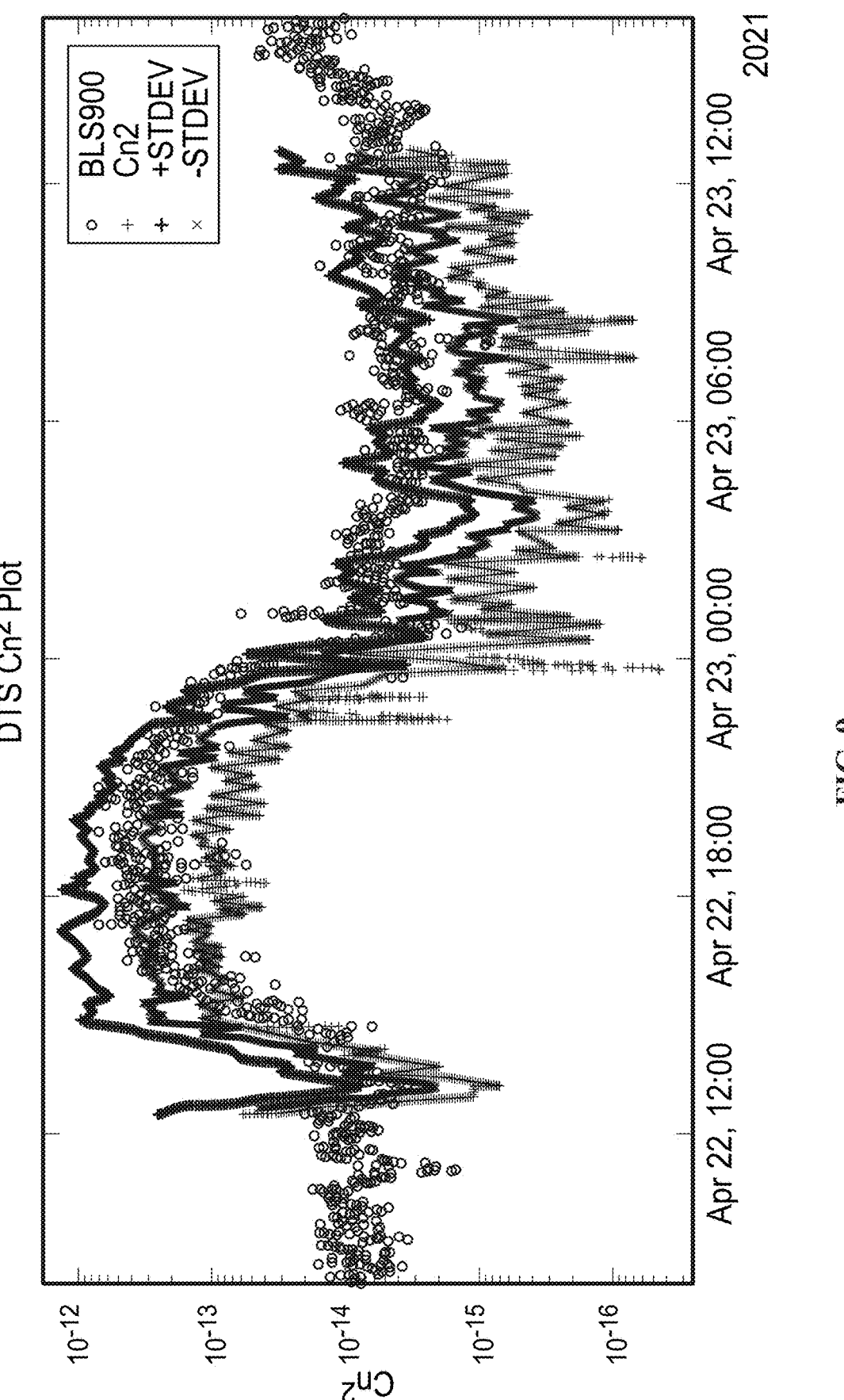
FIG. 9 is a graph depicting the refractive index structure coefficient measured by an unmanned aerial vehicle in accordance with embodiments of the present invention.

In embodiments, referring to FIG. 11A-9, the process may continue from step S1028A-1 or step S1028A-2 with step S1028B-1. However, in embodiments, the process may continue from step S1028A-1 or step S1028A-2, and instead proceed to step S1028B-2. In embodiments, the process may continue from step S1028A-1 or step S1028A-2, and instead proceed to step S1028B-3. Additionally, in embodiments, the process may instead skip step S1028B-1 and proceed directly to step S1030. In embodiments, the digital software system 560 may determine a third refractive-index structure coefficient indicative of optical turbulence during the first period of time based at least on the third temperature structure coefficient, the first temperature measurement information, and the first barometric pressure measurement information. In embodiments, the step may be performed by the remote control system 566. In embodiments, the third refractive-index structure coefficient may be determined by the formula:

$$C_{n3}^2 = \left[79\frac{P}{T_1^2}\right]^2 \times 10^{-12} C_{T3}^2$$

Equation 10 wherein $C_{n3}^2$ is the third refractive-index structure coefficient, P is the first barometric pressure value based on the first barometric pressure measurement information, $T_1$ is the first temperature measurement value based on the first temperature measurement information, and $C_{t3}^2$ is the third temperature structure coefficient. In embodiments, the first temperature measurement value may be a local temperature measurement value. In embodiments, the first barometric pressure value may be a local pressure measurement value.

In embodiments, referring to FIG. 11A-9, the process may skip step S1028B-1, and continue from step S1028A-1 or step S1028A-2 with step S1028B-2. In embodiments, the process may instead skip step S1028B-2, and proceed directly to step S1030. In embodiments, at step S1028B-2, the digital software system 560 may determine the third refractive-index structure coefficient indicative of optical turbulence during the first period of time based at least on the third temperature structure coefficient, the second temperature measurement information, and the first barometric pressure measurement information. In embodiments, the step may be performed by the remote control system 566. In embodiments, the third refractive-index structure coefficient may be determined by the formula:

$$C_{n3}^2 = \left[79\frac{P}{T_2^2}\right]^2 \times 10^{-12} C_{T3}^2$$

Equation 11 wherein $C_{n3}^2$ is the third refractive-index structure coefficient, P is the first barometric pressure value based on the first barometric pressure measurement information, $T_2$ is the second temperature measurement value based on the second temperature measurement information, and $C_{t3}^2$ is the third temperature structure coefficient. In embodiments, the second temperature measurement value may be a local temperature measurement value. In embodiments, the first barometric pressure value may be a local pressure measurement value.

In embodiments, referring to FIG. 11A-9, the process may skip step S1028B-2, and continue from step S1028A-1 or step S1028A-2 with step S1028B-3. In embodiments, the process may instead skip step S1028B-2, and proceed directly to step S1030. In embodiments, at step S1028B-2, the digital software system 560 may determine the third refractive-index structure coefficient indicative of optical turbulence during the first period of time based at least on the third temperature structure coefficient, the third temperature measurement information, and the first barometric pressure measurement information. In embodiments, the step may be performed by the remote control system 566. In embodiments, the third refractive-index structure coefficient may be determined by the formula:

$$C_{n3}^2 = \left[79\frac{P}{T_3^2}\right]^2 \times 10^{-12} C_{T3}^2$$

Equation 12 wherein $C_{n3}{}^2$ is the third refractive-index structure coefficient, P is the first barometric pressure value based on the first barometric pressure measurement information, $T_3$ is the third temperature measurement value based on the third temperature measurement information, and $C_{t3}{}^2$ is the third temperature structure coefficient. In embodiments, the third temperature measurement value may be a local temperature measurement value. In embodiments, the first barometric pressure value may be a local pressure measurement value.

Figures 4, 11A:
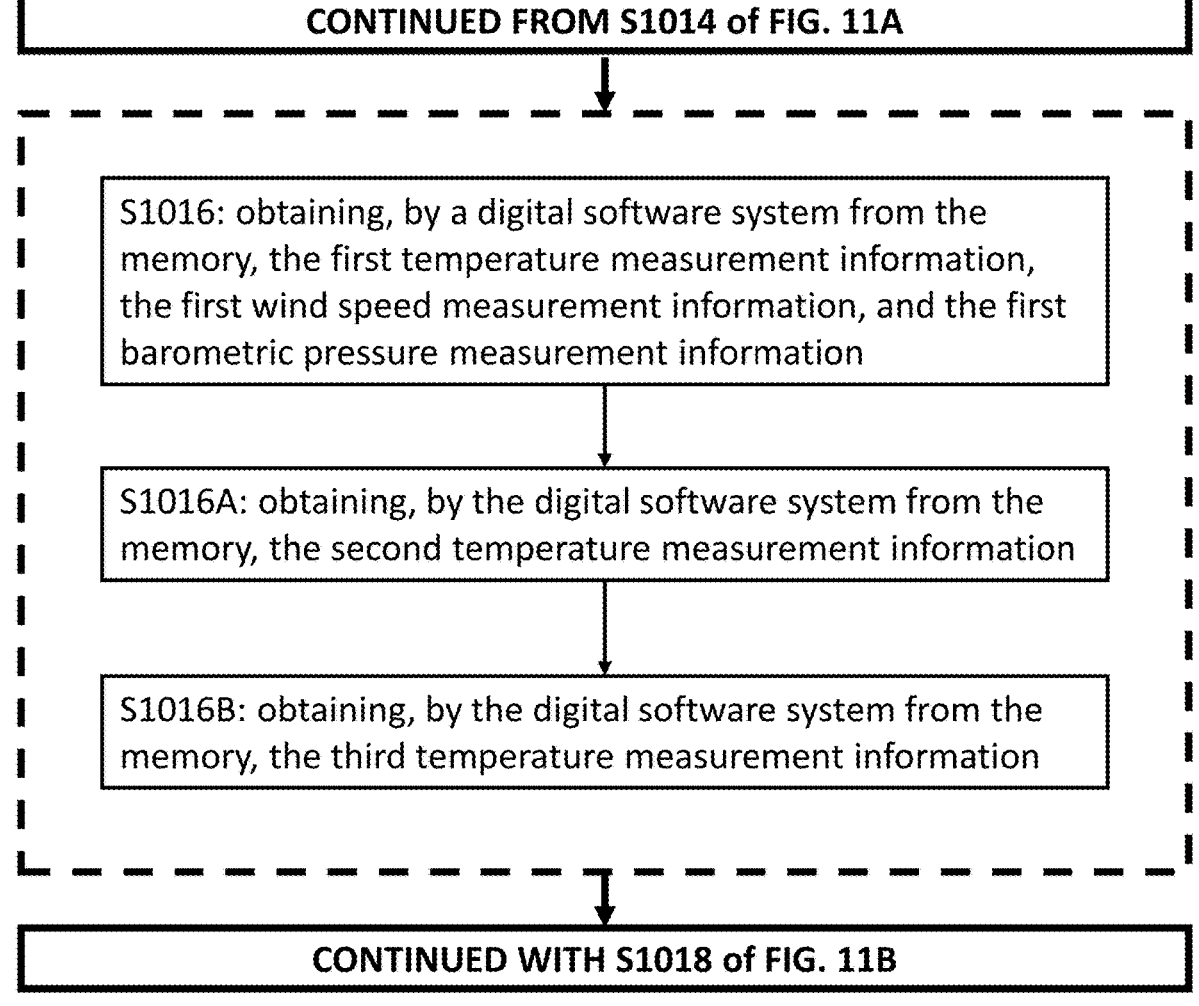

In embodiments, referring to FIG. 11A-11, the process may continue with step S1030B. At step S1030B, the digital software system 560 may transmit the third refractive-index structure coefficient to an optical system (described in greater detail with respect to the anemometer method and the power spectrum method of measuring optical turbulence). In embodiments, the step may be performed by the remote control system 566.

Anemometer Method

In embodiments, referring to FIG. 11B after step S1022, S1022A, or S1022B, the process for measuring optical turbulence using an unmanned aerial vehicle 502 may continue with the anemometer method starting at step S1024. At step S1024, the digital software system 560 may calculate a first estimated sensor spacing value based at least on the first wind speed measurement information, and the first start time and the first end time associated with the first period of time. In embodiments, the step may be performed by the remote control system 566. In embodiments, the first estimated sensor spacing value may be the value r. It has been previously disclosed (as in the Smolin et al. published patent referenced above) that in methods using only two differential temperature sensors to calculate optical turbulence (e.g., refractive-index structure coefficient), the sensor spacing value, r, was a fixed value based on the distance between the two differential temperature sensors. In embodiments, when using a wind speed sensor (e.g., a three-dimensional anemometer) in conjunction with a temperature sensor to determine optical turbulence, the estimated sensor spacing value r may actually vary based on the average wind speed between two points in time. In embodiments, the first estimated sensor spacing value may be calculated by the formula:

$$r = \frac{\overline{U}}{(t_2 - t_1)} \qquad \text{Equation 13}$$

wherein r is the first estimated sensor spacing value, $\overline{U}$ is a first wind speed value from the first wind speed measurement information, $t_1$ corresponds to the first start time associated with the first period of time, and $t_2$ corresponds to the first end time associated with the first period of time. In embodiments, the first time period $(t_2 - t_1)$ may be, for example, 30 seconds, 60 seconds, or 90 seconds, to name a few. In embodiments, the first wind speed value may be an average wind speed of the first wind speed measurement information generated at the first sample rate or the second sample rate (after data decimation). In embodiments, the estimated sensor spacing value may vary between different periods of time where optical turbulence (e.g., refractive-index structure coefficient) is being measured by a sensor due to the changes in wind speed. In embodiments, the first estimated sensor spacing value may be a predetermined sensor spacing value. For example, in embodiments, the predetermined sensor spacing value used in a differential temperature sensor method for calculating refracture index structure coefficient may be the distance between two differential temperature sensors. In embodiments, a plurality of refractive-index coefficients may be determined and transmitted using any combination of a first differential temperature sensor 526, a second differential temperature sensor 528, a three-dimensional wind speed sensor 524-1, and/or an anemometer temperature sensor 524-2. In embodiments, calculating a plurality of refractive-index structure coefficients may increase the accuracy of the measurements taken.

In embodiments, referring to FIG. 11B, the process may continue with step S1026. At step S1026, in embodiments, the digital software system 560 may determine a first temperature structure coefficient based at least on the first estimated sensor spacing value and the first temperature measurement information during the first period of time. In embodiments, the step may be performed by the remote control system 566. In embodiments, the first temperature structure coefficient may be determined by the formula:

$$C_{t1}^2 = \frac{(\Delta T_1)^2}{r^{2/3}} \qquad \text{Equation 14}$$

wherein $C_{t1}{}^2$ is the first temperature structure coefficient, $\Delta T_1$ is a first temperature differential value based on the first temperature measurement information, and r is the first estimated sensor spacing value. In embodiments, the first temperature differential value may be the difference between a first temperature measurement generated at the start time by a first temperature sensor and a second temperature measurement generated at the end time by the first temperature sensor.

In embodiments, referring to FIG. 11A-7, the process may continue with step S1026A. However, in embodiments, the process may instead skip step 1026A, and proceed directly to step S1028. In embodiments, at step S1026B, the digital software system 560 may determine a second temperature structure coefficient based at least on the first estimated sensor spacing value and the second temperature measurement information during the first period of time. In embodiments, this step may be performed by the remote control system 566. In embodiments, the second temperature structure coefficient may be determined by the formula:

$$C_{t2}^2 = \frac{(\Delta T_2)^2}{r^{2/3}} \qquad \text{Equation 15}$$

wherein $C_{t2}{}^2$ is the second temperature structure coefficient, $\Delta T_2$ is a second temperature differential value based on the second temperature measurement information, and r is the first estimated sensor spacing value. In embodiments, second differential temperature value may be the difference between a first temperature measurement generated at the start time by a second temperature sensor and a second temperature measurement generated at the end time by the second temperature sensor.

In embodiments, referring to FIG. 11A-7, the process may continue with step S1026C. However, in embodiments, the process may instead skip step 1026C, and proceed directly to step S1028. At step S1028C, the digital software system 560 may determine a fourth temperature structure coefficient based at least on the first estimated sensor spacing value and the third temperature measurement information during the first period of time. In embodiments, this step may be performed by the remote control system 566. In embodiments, the fourth temperature structure coefficient may be determined by the formula:

$$C_{t4}^2 = \frac{(\Delta T_3)^2}{r^{2/3}} \qquad \text{Equation 16}$$

wherein $C_{t4}^2$ is the fourth temperature structure coefficient, $\Delta T_3$ is a third temperature differential value based on the third temperature measurement information, and r is the first estimated sensor spacing value. In embodiments, the third temperature differential value may be the difference between a first temperature measurement generated at the start time by a third temperature sensor and a second temperature measurement generated at the end time by the third temperature sensor. In embodiments, steps S1026, S1026A, S1026B, and S1026C may be rearranged or omitted.

In embodiments, referring to FIG. 11B, the process may continue from step S1026 with step S1028. At step S1028, the digital software system 560 may determine a first refractive-index structure coefficient indicative of optical turbulence during the first period of time based at least on the first temperature structure coefficient, the first temperature measurement information, and the first barometric pressure measurement information. In embodiments, this step may be performed by the remote control system 566. In embodiments, the first refractive-index structure coefficient may be determined by the formula:

$$C_{n1}^2 = \left[79\frac{P}{T_1^2}\right]^2 \times 10^{-12} C_{T1}^2 \qquad \text{Equation 17}$$

wherein $C_{n1}^2$ is the first refractive-index structure coefficient, P is a first barometric pressure value based on the first measurement information, $T_1$ is a first temperature measurement value based on the first temperature measurement information, and $C_{t1}^2$ is the first temperature structure coefficient. In embodiments, the first temperature measurement value may be a local temperature measurement value. In embodiments, the first barometric pressure value may be a local pressure measurement value.

In embodiments, referring to FIG. 11A-8, the process may instead continue from step S1026 with step S1028-2 and skip step S1028. In embodiments, at step S1028-2, the digital software system 560 may determine the first refractive-index structure coefficient indicative of optical turbulence during the first period of time based at least on the first temperature structure coefficient, the second temperature measurement information, and the first barometric pressure measurement information. In embodiments, this step may be performed by the remote control system 566. In embodiments, the first refractive-index structure coefficient is determined by the formula:

$$C_{n1}^2 = \left[79\frac{P}{T_2^2}\right]^2 \times 10^{-12} C_{T1}^2 \qquad \text{Equation 18}$$

wherein $C_{n1}^2$ is the first refractive-index structure coefficient, P is a first barometric pressure value based on the first barometric pressure measurement information, $T_2$ is a second temperature measurement value based on the second temperature measurement information, and $C_{t1}^2$ is the first temperature structure coefficient. In embodiments, the first temperature measurement value may be a local temperature measurement value. In embodiments, the first barometric pressure value may be a local pressure measurement value.

In embodiments, referring to FIG. 11A-8, the process may continue from step S1028 or step S1028-2 with step S1028A-1. However, in embodiments, the process may continue from step S1028 or step S1028-2, and instead proceed to step S1028A-2. Additionally, in embodiments, the process may instead skip step S1028A-1 and proceed directly to step S1030. At step S1028A-1, the digital software system 560 may determine a second refractive-index structure coefficient indicative of optical turbulence during the first period of time based at least on the second temperature structure coefficient, the second temperature measurement information, and the first barometric pressure measurement information. In embodiments, this step may be performed by the remote control system 566. In embodiments, the second refractive-index structure coefficient may be determined by the formula:

$$C_{n2}^2 = \left[79\frac{P}{T_2^2}\right]^2 \times 10^{-12} C_{T2}^2 \qquad \text{Equation 19}$$

wherein $C_{n2}^2$ is the second refractive-index structure coefficient, P is a first barometric pressure value based on the first barometric pressure measurement information, $T_2$ is the second temperature measurement value based on the second temperature measurement information, and $C_{t2}^2$ is the second temperature structure coefficient. In embodiments, the second temperature measurement value may be a local temperature measurement value. In embodiments, the first barometric pressure value may be a local pressure measurement value.

In embodiments, referring to FIG. 11A-8, the process may skip step S1028A-1, and continue from step S1028 or step S1028-2 with step S1028A-2. However, in embodiments, the process may instead skip step S1028A-2, and proceed directly to step S1030. In embodiments, at step S1028A-2, the digital software system 560 may determine the second refractive-index structure coefficient indicative of optical turbulence during the first period of time based at least on the second temperature structure coefficient, the first temperature measurement information, and the first barometric pressure measurement information. In embodiments, this step may be performed by the remote control system 566. In embodiments, the second refractive-index structure coefficient may be determined by the formula:

$$C_{n2}^2 = \left[79\frac{P}{T_1^2}\right]^2 \times 10^{-12} C_{T2}^2 \qquad \text{Equation 20}$$

wherein $C_{n2}^2$ is the second refractive-index structure coefficient, P is the first barometric pressure value based on the first barometric pressure measurement information, $T_1$ is the first temperature measurement value based on the first measurement information, and $C_{t2}^2$ is the second temperature structure coefficient. In embodiments, the first temperature measurement value may be a local temperature measurement value. In embodiments, the first barometric pressure value may be a local pressure measurement value.

In embodiments, referring to FIG. 11A-10, the process may continue from step S1028B-1, step S1028B-2, or step S1028B-3 with step S1028C-1. However, in embodiments, the process may continue from step S1028B-1, step S1028B-2, or step S1028B-3, and instead proceed to step S1028C-2. In embodiments, the process may continue from step S1028B-1, step S1028B-2, or step S1028B-3, and instead proceed to step S1028C-3. Additionally, in embodiments, the process may instead skip step S1028B-1 and proceed directly to step S1030. In embodiments, at step S1028C-1, the digital software system 560 may determine a fourth refractive-index structure coefficient indicative of optical turbulence during the first period of time based at least on the fourth temperature structure coefficient, the third temperature measurement information, and the first barometric pressure measurement information. In embodiments, this step may be performed by the remote control system 566. In embodiments, the fourth refractive-index structure coefficient may be determined by the formula:

$$C_{n4}^2 = \left[79\frac{P}{T_3^2}\right]^2 \times 10^{-12} C_{T4}^2 \qquad \text{Equation 21}$$

wherein $C_{n4}^2$ is the fourth refractive-index structure coefficient, P is the first barometric pressure value based on the first barometric pressure measurement information, $T_3$ is the third temperature measurement value based on the third temperature measurement information, and $C_{r4}^2$ is the fourth temperature structure coefficient. In embodiments, the third temperature measurement value may be a local temperature measurement value. In embodiments, the first barometric pressure value may be a local pressure measurement value.

In embodiments, referring to FIG. 11A-10, the process may skip step S1028C-1, and continue from step S1028B-1, step S1028B-2, or step S1028B-3 with step S1028C-2. However, in embodiments, the process may continue from step S1028B-1, step S1028B-2, or step S1028B-3, and instead proceed to step S1028C-3. Additionally, in embodiments, the process may instead skip step S1028C-2 and proceed directly to step S1030. In embodiments, at step S1028C-2, the digital software system 560 may determine the fourth refractive-index structure coefficient indicative of optical turbulence during the first period of time based at least on the fourth temperature structure coefficient, the first temperature measurement information, and the first barometric pressure measurement information. In embodiments, this step may be performed by the remote control system 566. In embodiments, the fourth refractive-index structure coefficient is determined by the formula:

$$C_{n4}^2 = \left[79\frac{P}{T_1^2}\right]^2 \times 10^{-12} C_{T4}^2 \qquad \text{Equation 22}$$

wherein $C_{n4}^2$ is the fourth refractive-index structure coefficient, P is the first barometric pressure value based on the first barometric pressure measurement information, $T_1$ is the first temperature measurement value based on the first temperature measurement information, and $C_{r4}^2$ is the fourth temperature structure coefficient. In embodiments, the first temperature measurement value may be a local temperature measurement value. In embodiments, the first barometric pressure value may be a local pressure measurement value.

In embodiments, referring to FIG. 11A-10, the process may skip step S1028C-1 and step S1028C-2, and continue from step S1028B-1, step S1028B-2, or step S1028B-3 with step S1028C-3. However, in embodiments, the process may instead skip step S1028C-3 and proceed directly to step S1030. In embodiments, at step S1028C-3, the digital software system 560 may determine the fourth refractive-index structure coefficient indicative of optical turbulence during the first period of time based at least on the fourth temperature structure coefficient, the second temperature measurement information, and the first barometric pressure measurement information. In embodiments, this step may be performed by the remote control system 566. In embodiments, the fourth refractive-index structure coefficient may be determined by the formula:

$$C_{n4}^2 = \left[79\frac{P}{T_2^2}\right]^2 \times 10^{-12} C_{T4}^2 \qquad \text{Equation 23}$$

wherein $C_{n4}^2$ is the fourth refractive-index structure coefficient, P is the first barometric pressure value based on the first barometric pressure measurement information, $T_2$ is the second temperature measurement value based on the second temperature measurement information, and $C_{r4}^2$ is the fourth temperature structure coefficient. In embodiments, the second temperature measurement value may be a local temperature measurement value. In embodiments, the first barometric pressure value may be a local pressure measurement value.

In embodiments, referring back to FIG. 11B, the process may continue from step S1028 or step S1028-2 with step S1030. At step 1030, in embodiments, the digital software system 560 may transmit the first refractive-index structure coefficient to an optical system. In embodiments, this step may be performed by the remote control system 566. In embodiments, the optical system may use the first refractive-index structure coefficient to modify, calibrate, or correct the optical system. For example, in embodiments, an optical weapon system may use the refractive-index structure coefficient for atmospheric profiling. In embodiments, an optical system may use the refractive-index structure coefficient for urban terrain profiling, such as for determining the optical turbulence around buildings or other structures. In embodiments, an optical system may use the refractive-index structure coefficient monitoring wildfires. That is, in embodiments, the optical system may determine the turbulent profile of the fire to determine and the predict the path of the wildfire.

In embodiments, the process may stop at step S1030. In embodiments, referring to FIG. 11A-11, the process may continue with step S1030A. At step S1030A, the digital software system 560 may transmit the second refractive-index structure coefficient to the optical system. In embodiments, this step may be performed by the remote control system 566. In embodiments, the process may stop at step S1030A. In embodiments, referring to FIG. 11A-11, the process may continue with step S1030B. At step S1030B, the digital software system 560 may transmit the third refractive-index structure coefficient to the optical system. In embodiments, the process may stop at step S1030B. In embodiments, this step may be performed by the remote control system 566. In embodiments, referring to FIG. 11A-11, the process may continue with step S1030C. At step S1030C, the digital software system 560 may transmit the fourth refractive-index structure coefficient to the optical system. In embodiments, this step may be performed by the remote control system 566.

Power Spectrum Method

Figure 14:
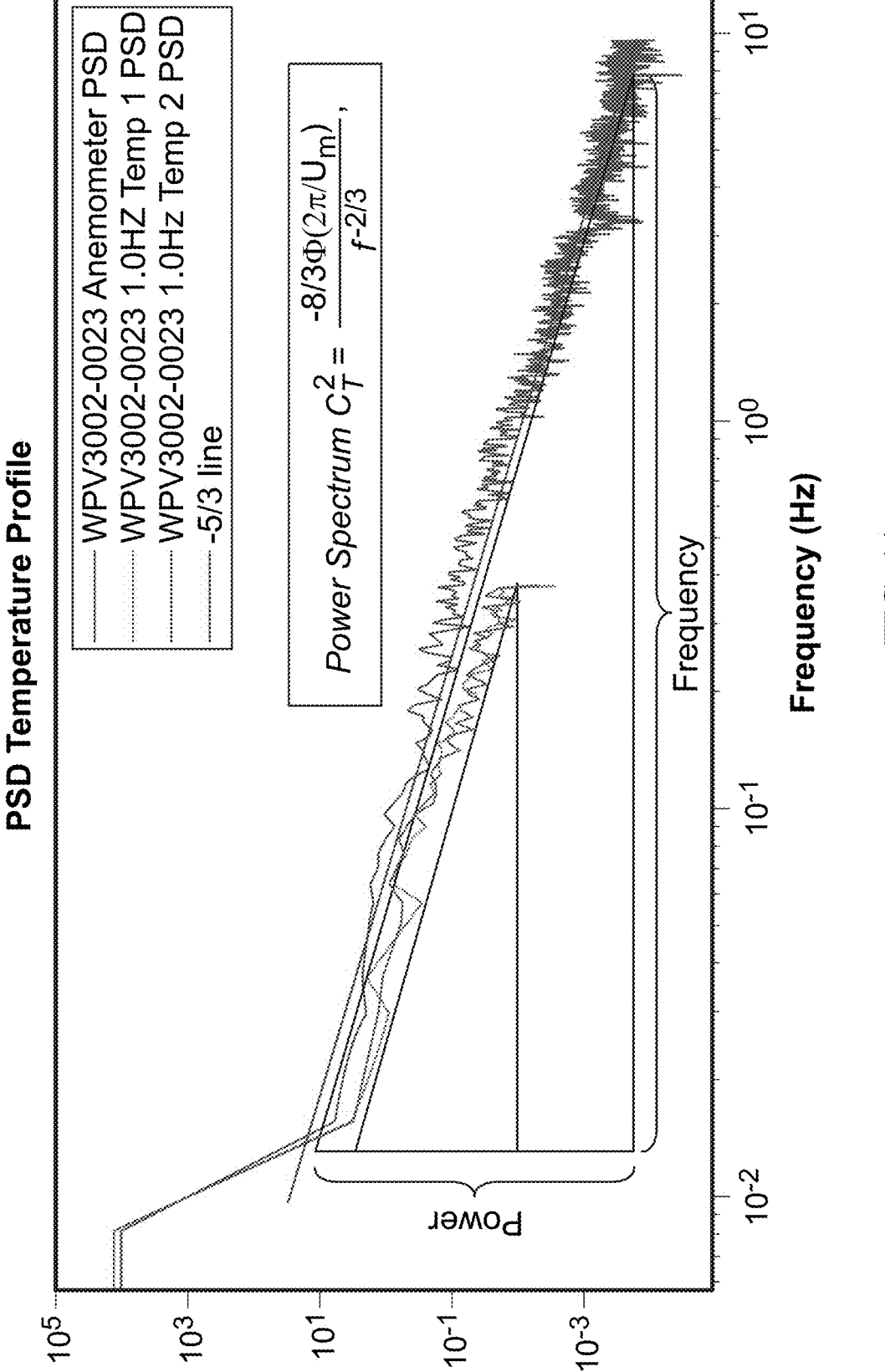
FIG. 14 is a graph depicting an exemplary power spectral density temperature profiles of a plurality of sensors in accordance with embodiments of the present invention.

In embodiments, referring to FIG. 11C after steps S1022, S1022A, or S1022B, the process may continue with the power spectrum method starting at step S1032. At step S1032, the digital software system 560 may determine first temperature power spectrum information based at least on the first power spectral density information and the first sensor cutoff frequency. In embodiments, this step may be performed by the remote control system 566. FIG. 14 is a graph depicting an exemplary power spectral density temperature profiles of a plurality of sensors in accordance with embodiments of the present invention. In embodiments, referring to FIG. 14, the first temperature power spectrum information may include the y-axis range of the first power spectral density information associated with the first temperature sensor. In embodiments, referring to FIG. 11C, the process may continue with step S1034. At step S1034, the digital software system 560 may determine first spectral frequency range information based at least on the first power spectral density information and the first sensor cutoff frequency. In embodiments, this step may be performed by the remote control system 566. In embodiments, referring to FIG. 14, the first spectral frequency range information may include the x-axis range of the first power spectral density information associated with the first temperature sensor.

In embodiments, referring to FIG. 11C, the process may continue with step S1036. At step 1036, the digital software system 560 may determine a fifth temperature structure coefficient based at least on the first temperature power spectrum, the first spectral frequency range information, and the first wind speed measurement information during the first period of time. In embodiments, this step may be performed by the remote control system 566. In embodiments, the fifth temperature structure coefficient may be determined by the formula:

$$C_{T5}^2 = \frac{-8/3\Phi_1(2\pi/U_m)}{f_1^{-2/3}} \qquad \text{Equation 24}$$

wherein $C_{T5}^2$ is the fifth temperature structure coefficient, $\Phi_1$ is the first temperature power spectrum, $f_1$ is the first spectral frequency range information, and $U_m$ is the first wind speed value from the first wind speed measurement information. In embodiments, the first wind speed value may be an average wind speed of the first wind speed measurement information generated at the first sample rate or the second sample rate (after data decimation) during the first period of time.

In embodiments, referring to FIG. 11C, the process may continue with step S1038. In embodiments, the process may instead skip step S1038 and continue with step S1038A or step S1038B. At step S1038, the digital software system 560 may determine a fifth refractive-index structure coefficient indicative of optical turbulence during the first period of time based at least on the fifth temperature structure coefficient, the first temperature measurement information, and the first barometric pressure measurement information. In embodiments, this step may be performed by the remote control system 566. In embodiments, wherein the fifth refractive-index structure coefficient may be determined by the formula:

$$C_{n5}^2 = \left[79\frac{P}{T_1^2}\right]^2 \times 10^{-12}C_{T5}^2 \qquad \text{Equation 25}$$

wherein $C_{n5}^2$ is the fifth refractive-index structure coefficient, P is the first barometric pressure value based on the first barometric pressure measurement information, $T_1$ is the first temperature measurement value based on the first temperature measurement information, and $C_{t5}^2$ is the fifth temperature structure coefficient. In embodiments, the first temperature measurement value may be a local temperature measurement value. In embodiments, the first barometric pressure value may be a local pressure measurement value.

In embodiments, referring to FIG. 11C-1, the process may skip step S1038 and continue with step S1038A. At step S1038A, the digital software system 560 may determine the fifth refractive-index structure coefficient based at least on the fifth temperature structure coefficient, the second temperature measurement information, and the first barometric pressure measurement information. In embodiments, this step may be performed by the remote control system 566. In embodiments, the fifth refractive-index structure coefficient may be determined by the formula:

$$C_{n5}^2 = \left[79\frac{P}{T_2^2}\right]^2 \times 10^{-12}C_{T5}^2 \qquad \text{Equation 26}$$

wherein $C_{n5}^2$ is the fifth refractive-index structure coefficient, P is the first barometric pressure value based on the first barometric pressure measurement information, $T_2$ is the second temperature measurement value based on the second temperature measurement information, and $C_{t5}^2$ is the fifth temperature structure coefficient. In embodiments, the second temperature measurement value may be a local temperature measurement value. In embodiments, the first barometric pressure value may be a local pressure measurement value.

In embodiments, referring to FIG. 11C-1, the process may instead skip steps S1038 and S1038A and continue with step S1038B. At step S1038B, the digital software system 560 may determine the fifth refractive-index structure coefficient based at least on the fifth temperature structure coefficient, the third temperature measurement information, and the first barometric pressure measurement information. In embodiments, this step may be performed by the remote control system 566. In embodiments, the wherein the fifth refractive-index structure coefficient may be determined by the formula:

$$C_{n5}^2 = \left[79\frac{P}{T_3^2}\right]^2 \times 10^{-12}C_{T5}^2 \qquad \text{Equation 27}$$

wherein $C_{n5}^2$ is the fifth refractive-index structure coefficient, P is the first barometric pressure value based on the first barometric pressure measurement information, $T_3$ is the third temperature measurement value based on the third temperature measurement information, and $C_{t5}^2$ is the fifth temperature structure coefficient. In embodiments, the third temperature measurement value may be a local temperature measurement value. In embodiments, the first barometric pressure value may be a local pressure measurement value.

In embodiments, referring to FIG. 11C, the process may continue from steps S1038, S1038A, or S1038B with step S1040. At step S1040, the digital software system 560 may transmit the fifth refractive-index structure coefficient to an optical system. In embodiments, this step may be performed by the remote control system 566.

In embodiments, referring to FIG. 11D, after step S1020 and prior to proceeding to step S1022, the process may instead continue with step S1020A. At step S1020A, in embodiments, the digital software system 560 may determine a second sensor cutoff frequency associated with at least one of the first temperature sensor and the first wind speed sensor. In embodiments, this step may be performed by the remote control system 566. In embodiments, the second sensor cutoff frequency may be based at least on at least one or more of the first power spectral density information and the second power spectral density information. In embodiments, the second sensor cutoff frequency may be determined in the same way as discussed with respect to the first sensor cutoff frequency. In embodiments, after step S1020A and prior to step S1022, the process may continue with step S1020B. At step S1020B, the digital software system 560 may determine a third sensor cutoff frequency associated with the second temperature sensor. In embodiments, this step may be performed by the remote control system 566. In embodiments, the third sensor cutoff frequency may be determined based at least on the second power spectral density information.

In embodiments, referring to FIG. 11E after steps S1022, S1022A, or S1022B, the process may continue with step S1042. In embodiments, at step S1042, the digital software system 560 may determine second temperature power spectrum information based at least on the second power spectral density information and the second sensor cutoff frequency. In embodiments, this step may be performed by the remote control system 566. In embodiments, referring to FIG. 14, the second temperature power spectrum information may include the y-axis range of the second power spectral density information associated with the second temperature sensor. In embodiments, referring to FIG. 11E, the process may continue with step S1044. At step S1044, the digital software system 560 may determine second spectral frequency range information based at least on the second power spectral density information and the second sensor cutoff frequency. In embodiments, this step may be performed by the remote control system 566. In embodiments, referring to FIG. 14, the second spectral frequency range information may include the x-axis range of the second power spectral density information associated with the second temperature sensor.

In embodiments, referring to FIG. 11E, the process may continue with step S1046. At step S1046, the digital software system 560 may determine a sixth temperature structure coefficient based at least on the second temperature power spectrum, the second spectral frequency range information, and the first wind speed measurement information during the first period of time. In embodiments, this step may be performed by the remote control system 566. In embodiments, the sixth temperature structure coefficient is determined by the formula:

$$C_{T6}^2 = \frac{-8/3\Phi_2(2\pi/U_m)}{f_2^{-2/3}}$$

Equation 28 wherein $C_{T6}^2$ is the sixth temperature structure coefficient, $\Phi_2$ is the second temperature power spectrum, $f_2$ is the second spectral frequency range information, and $U_m$ is the first wind speed value from the first wind speed measurement information. In embodiments, the first wind speed value may be an average wind speed of the first wind speed measurement information generated at the first sample rate or the second sample rate (after data decimation) during the first period of time.

In embodiments, referring to FIG. 11E, the process may continue with step S1048. In embodiments, the process may instead skip step S1048 and continue with step S1048A or step S1048B. At step S1048, the digital software system 560 may determine a sixth refractive-index structure coefficient indicative of optical turbulence during the first period of time based at least on the sixth temperature structure coefficient, the second temperature measurement information, and the first barometric pressure measurement information. In embodiments, this step may be performed by the remote control system 566. In embodiments, the sixth refractive-index structure coefficient may be determined by the formula:

$$C_{n6}^2 = \left[79\frac{P}{T_2^2}\right]^2 \times 10^{-12} C_{T6}^2$$

Equation 29 wherein $C_{n6}^2$ is the sixth refractive-index structure coefficient, P is the first barometric pressure value based on the first barometric pressure measurement information, $T_2$ is the second temperature measurement value based on the second temperature measurement information, and $C_{T6}^2$ is the sixth temperature structure coefficient. In embodiments, the second temperature measurement value may be a local temperature measurement value. In embodiments, the first barometric pressure value may be a local pressure measurement value.

In embodiments, referring to FIG. 11E-1, the process may instead skip step S1048 and continue with step S1048A. In embodiments, at step S1048A, the digital software system 560 may determine the sixth refractive-index structure coefficient based at least on the sixth temperature structure coefficient, the first temperature measurement information, and the first barometric pressure measurement information. In embodiments, this step may be performed by the remote control system 566. In embodiments, the sixth refractive-index structure coefficient is determined by the formula:

$$C_{n6}^2 = \left[79\frac{P}{T_1^2}\right]^2 \times 10^{-12} C_{T6}^2$$

Equation 30 wherein $C_{n6}^2$ is the sixth refractive-index structure coefficient, P is the first barometric pressure value based on the first barometric pressure measurement information, $T_1$ is the first temperature measurement value based on the first temperature measurement information, and $C_{T6}^2$ is the sixth temperature structure coefficient. In embodiments, the first temperature measurement value may be a local temperature measurement value. In embodiments, the first barometric pressure value may be a local pressure measurement value.

In embodiments, referring to FIG. 11E-1, the process may instead skip steps S1048 and S1048A and continue with step S1048B. In embodiments, at step S1048B, the digital software system 560 may determine the sixth refractive-index structure coefficient based at least on the sixth temperature structure coefficient, the third temperature measurement information, and the first barometric pressure measurement information. In embodiments, this step may be performed by the remote control system 566. In embodiments, the sixth refractive-index structure coefficient is determined by the formula:

$$C_{n6}^2 = \left[79\frac{P}{T_3^2}\right]^2 \times 10^{-12} C_{T6}^2 \qquad \text{Equation 31}$$

wherein $C_{n6}^2$ is the sixth refractive-index structure coefficient, P is the first barometric pressure value based on the first barometric pressure measurement information, $T_3$ is the third temperature measurement value based on the third temperature measurement information, and $C_{r6}^2$ is the sixth temperature structure coefficient. In embodiments, the third temperature measurement value may be a local temperature measurement value. In embodiments, the first barometric pressure value may be a local pressure measurement value.

In embodiments, referring to FIG. 11E, the process may continue from steps S1048, S1048A, or S1048B with step S1050. At step S1050, the digital software system 560 may transmit the sixth refractive-index structure coefficient to an optical system. In embodiments, this step may be performed by the remote control system 566.

In embodiments, referring to FIG. 11F after steps S1022, S1022A, or S1022B, the process may continue with step S1052. In embodiments, at step S1052, the digital software system 560 may determine third temperature power spectrum information based at least on the second power spectral density information and the third sensor cutoff frequency. In embodiments, this step may be performed by the remote control system 566. In embodiments, referring to FIG. 14, the third temperature power spectrum information may include the y-axis range of the third power spectral density information associated with the third temperature sensor. In embodiments, referring to FIG. 11F, the process may continue with step S1054. At step S1054, the digital software system 560 may determine third spectral frequency range information based at least on the third power spectral density information and the third sensor cutoff frequency. In embodiments, this step may be performed by the remote control system 566. In embodiments, referring to FIG. 14, the third spectral frequency range information may include the x-axis range of the third power spectral density information associated with the third temperature sensor.

In embodiments, referring to FIG. 11F, the process may continue with step S1056. At step S1056, the digital software system 560 may determine a seventh temperature structure coefficient based at least on the third temperature power spectrum, the third spectral frequency range information, and the first wind speed measurement information during the first period of time. In embodiments, this step may be performed by the remote control system 566. In embodiments, the seventh temperature structure coefficient is determined by the formula:

$$C_{T7}^2 = \frac{-8/3\Phi_3(2\pi/U_m)}{f_3^{-2/3}} \qquad \text{Equation 32}$$

wherein $C_{r7}^2$ is the seventh temperature structure coefficient, $\Phi_3$ is the third temperature power spectrum, $f_2$ is the third spectral frequency range information, and $U_m$ is the first wind speed value from the first wind speed measurement information. In embodiments, the first wind speed value may be an average wind speed of the first wind speed measurement information generated at the first sample rate or the second sample rate (after data decimation) during the first period of time.

In embodiments, referring to FIG. 11F, the process may continue with step S1058. In embodiments, the process may instead skip step S1058 and continue with step S1058A or step S1058B. At step S1058, the digital software system 560 may determine a seventh refractive-index structure coefficient indicative of optical turbulence during the first period of time based at least on the seventh temperature structure coefficient, the third temperature measurement information, and the first barometric pressure measurement information. In embodiments, this step may be performed by the remote control system 566. In embodiments, the seventh refractive-index structure coefficient may be determined by the formula:

$$C_{n7}^2 = \left[79\frac{P}{T_3^2}\right]^2 \times 10^{-12} C_{T7}^2 \qquad \text{Equation 33}$$

wherein $C_{n7}^2$ is the seventh refractive-index structure coefficient, P is the first barometric pressure value based on the first barometric pressure measurement information, $T_3$ is the third temperature measurement value based on the third temperature measurement information, and $C_{r7}^2$ is the seventh temperature structure coefficient. In embodiments, the third temperature measurement value may be a local temperature measurement value. In embodiments, the first barometric pressure value may be a local pressure measurement value.

In embodiments, referring to FIG. 11F-1, the process may instead skip step S1058 and continue with step S1058A. In embodiments, at step S1048A, the digital software system 560 may determine the seventh refractive-index structure coefficient based at least on the seventh temperature structure coefficient, the first temperature measurement information, and the first barometric pressure measurement information. In embodiments, this step may be performed by the remote control system 566. In embodiments, the seventh refractive-index structure coefficient is determined by the formula:

$$C_{n7}^2 = \left[79\frac{P}{T_1^2}\right]^2 \times 10^{-12} C_{T7}^2 \qquad \text{Equation 34}$$

wherein $C_{n7}^2$ is the seventh refractive-index structure coefficient, P is the first barometric pressure value based on the first barometric pressure measurement information, $T_1$ is the first temperature measurement value based on the first temperature measurement information, and $C_{r7}^2$ is the seventh temperature structure coefficient. In embodiments, the first temperature measurement value may be a local temperature measurement value. In embodiments, the first barometric pressure value may be a local pressure measurement value.

In embodiments, referring to FIG. 11F-1, the process may instead skip step S1058A and continue with step S1058B. At step 1058B, the digital software system 560 may determine the seventh refractive-index structure coefficient based at least on the seventh temperature structure coefficient, the second temperature measurement information, and the first barometric pressure measurement information. In embodiments, this step may be performed by the remote control system 566. In embodiments, the seventh refractive-index structure coefficient may be determined by the formula:

$$C_{n7}^2 = \left[79\frac{P}{T_3^2}\right]^2 \times 10^{-12}C_{T7}^2 \qquad \text{Equation 35}$$

wherein $C_{n7}^2$ is the seventh refractive-index structure coefficient, P is the first barometric pressure value based on the first barometric pressure measurement information, $T_2$ is the second temperature measurement value based on the second temperature measurement information, and $C_{T7}^2$ is the seventh temperature structure coefficient. In embodiments, the second temperature measurement value may be a local temperature measurement value. In embodiments, the first barometric pressure value may be a local pressure measurement value.

In embodiments, referring to FIG. 11F, the process may continue with step S1060. At step S1060, the digital software system 560 may transmit the seventh refractive-index structure coefficient to an optical system. In embodiments, this step may be performed by the remote control system 566.

FIG. 9 is a graph depicting the refractive index structure coefficient measured by an unmanned aerial vehicle 502 in accordance with embodiments of the present invention. In embodiments, the measured $C_n^2$ values may be plotted over time and at specific nodal locations.

In embodiments, referring to FIG. 9, the $C_n^2$ measurements generated by the unmanned aerial vehicle 502 closely match the expected vertical profile of optical turbulence determined known by a conventional optical turbulence measurement system (BLS900).

Figure 9A:
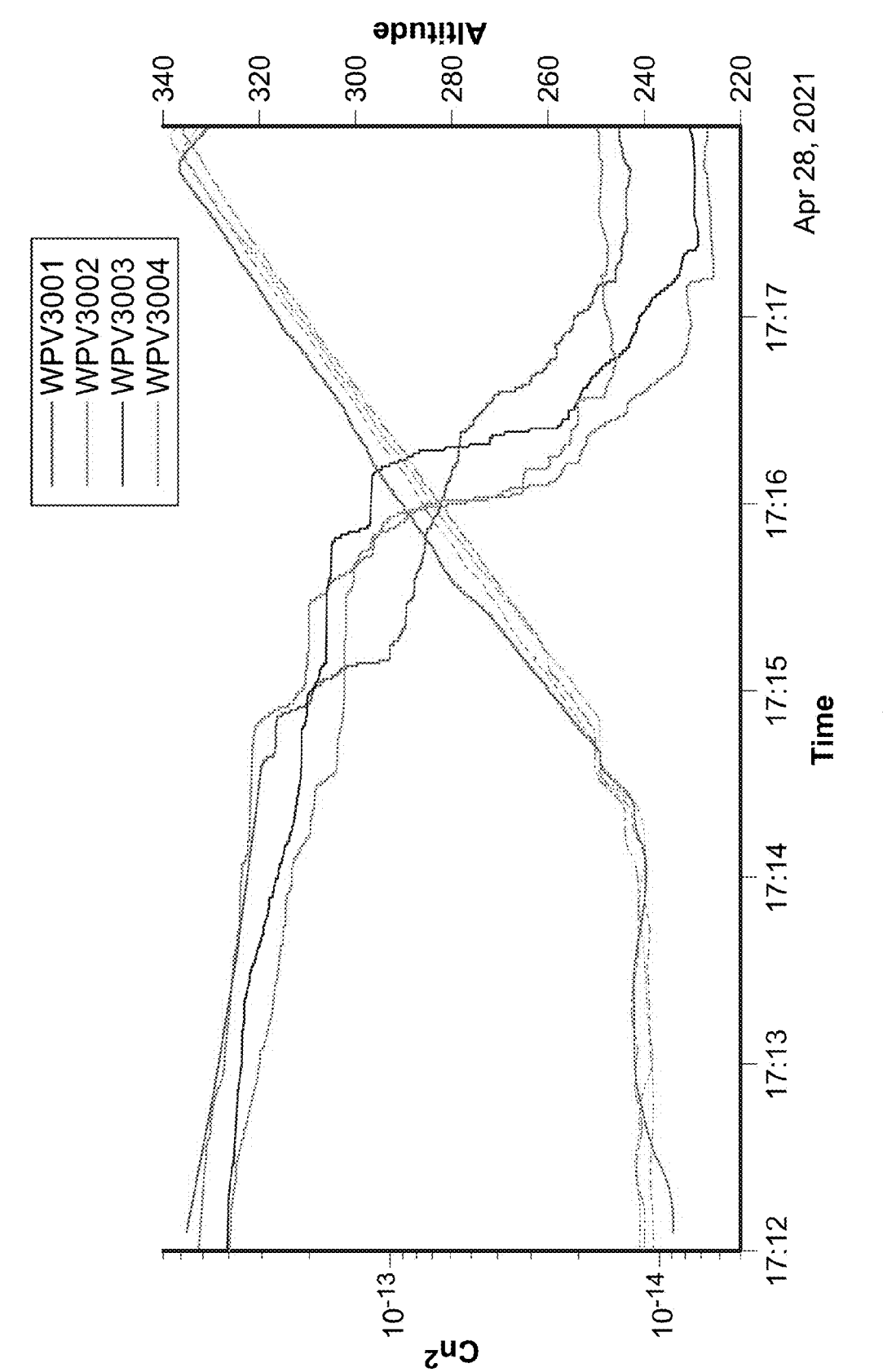
FIG. 9A is a graph depicting the refractive index structure coefficient measured by a plurality of unmanned aerial vehicles in accordance with embodiments of the present invention.

FIG. 9A is a graph depicting the refractive index structure coefficient measured by a plurality of unmanned aerial vehicles 502 in accordance with embodiments of the present invention. In embodiments, referring to FIG. 9A, a plurality of unmanned aerial vehicles 502 may be used to generate $C_n^2$ measurements at a plurality of three-dimensional space locations simultaneously. In embodiments, the $C_n^2$ measurements may be generated over a period of time and across a vertical profile.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. An unmanned aerial vehicle used for measuring optical turbulence comprising:
   a) a first temperature sensor, operatively connected to a central processing board, configured to generate first temperature measurement information at a first sampling rate, wherein the first temperature measurement information is associated with a first temperature at the first temperature sensor during a first period of time defined by a first start time and a first end time;
   b) a first wind speed sensor, operatively connected to the central processing board, configured to generate first wind speed measurement information at the first sampling rate, wherein the first wind speed measurement information is associated with a first wind speed at the first wind speed sensor during the first period of time;
   c) a first barometric pressure sensor, operatively connected to the central processing board, configured to generate first barometric pressure measurement information at the first sampling rate, wherein the first barometric pressure measurement information is associated with a first barometric pressure at the first barometric pressure sensor during the first period of time;
   d) the central processing board, configured to:
      a. receive, from the first temperature sensor, the first temperature measurement information generated during the first period of time;
      b. receive, from the first wind speed sensor, the first wind speed measurement information generated during the first period of time;
      c. receive, from the first barometric pressure sensor, the first barometric pressure measurement information generated during the first period of time;
      d. store, in memory operatively connected to the central processing board, the first temperature measurement information, the first wind speed measurement information, and the first barometric pressure measurement information;
   e) a digital software system operably connected to the memory, wherein the digital software system is configured to:
      a. obtain from the memory the first temperature measurement information, the first wind speed measurement information, and the first barometric pressure measurement information;
      b. determine:
         i. first power spectral density information associated with a first plurality of frequencies based at least on the first temperature measurement information;
         ii. second power spectral density information associated with the first plurality of frequencies based at least on the first wind speed measurement information; and
         iii. a first sensor cutoff frequency associated with at least one of the first temperature sensor and the first wind speed sensor;
      c. decimate the first temperature measurement information, the first wind speed measurement information, and the first barometric pressure measurement information to a second sampling rate during the first period of time based at least on the first power spectral density information, the second power spectral density information, and the first sensor cutoff frequency;
      d. calculate a first estimated sensor spacing value based at least on the decimated first wind speed measurement information, and the first start time and the first end time associated with the first period of time;
      e. determine a first temperature structure coefficient based at least on the first estimated sensor spacing value and the decimated first temperature measurement information during the first period of time;
      f. determine a first refractive-index structure coefficient indicative of optical turbulence during the first period of time based at least on the first temperature structure coefficient, the decimated first temperature measurement information, and the decimated first barometric pressure measurement information; and
      g. transmit, to an optical system, the first refractive-index structure coefficient.

2. The unmanned aerial vehicle of claim 1, wherein the unmanned aerial vehicle is configured to move between a plurality of positions in three-dimensional space.

3. The unmanned aerial vehicle of claim 1, wherein the first wind speed sensor is one of an anemometer, a sonic anemometer and a standing wave waver anemometer.

4. The unmanned aerial vehicle of claim 1, wherein the first power spectral density information is determined based on a Fourier transform of the decimated first temperature measurement information during the first period of time, and wherein the second power spectral density information is determined based on a Fourier transform of the decimated first wind speed measurement information during the first period of time.

5. The unmanned aerial vehicle of claim 1, wherein the first sensor cutoff frequency is based on at least one of the first power spectral density information and the second power spectral density information.

6. The unmanned aerial vehicle of claim 1, wherein the first sensor cutoff frequency is one of a plurality of predetermined frequencies and the determining the first sensor cutoff frequency includes selecting a predetermined frequency from the plurality of predetermined frequencies.

7. The unmanned aerial vehicle of claim 6, wherein the predetermined frequency is selected based at least on the first wind speed measurement information.

8. The unmanned aerial vehicle of claim 1, wherein the first sensor cutoff frequency is determined based at least on a linear relationship between the first power spectral density information and the first plurality of frequencies.

9. The unmanned aerial vehicle of claim 1, wherein the first sensor cutoff frequency is determined based at least on a linear relationship between the second power spectral density information and the first plurality of frequencies.

10. The unmanned aerial vehicle of claim 1, wherein the first estimated sensor spacing value is calculated by the formula:

$$r = \frac{\overline{U}}{(t_2 - t_1)}$$

wherein r is the first estimated sensor spacing value, $\overline{U}$ is a first wind speed value from the first wind speed measurement information, $t_1$ corresponds to the first start time associated with the first period of time, and $t_2$ corresponds to the first end time associated with the first period of time.

11. The unmanned aerial vehicle of claim 1, wherein the first temperature structure coefficient is determined by the formula:

$$C_{t1}^2 = \frac{(\Delta T_1)^2}{r^{2/3}}$$

wherein $$C_{t1}^2$$

is the first temperature structure coefficient, $\Delta T_1$ is a first temperature differential value based on the first temperature measurement information, and r is the first estimated sensor spacing value.

12. The unmanned aerial vehicle of claim 10, wherein the first refractive-index structure coefficient is determined by the formula:

68

$$C_{n1}^2 = \left[79\frac{P}{T_1^2}\right]^2 \times 10^{-12} C_{T1}^2$$

wherein $C_{n1}^2$ is the first refractive-index structure coefficient, P is a first barometric pressure value based on the first barometric pressure measurement information, Tris a first temperature measurement value based on the first temperature measurement information, and $$C_{T1}^2$$

is the first temperature structure coefficient.

13. An unmanned aerial vehicle used for measuring optical turbulence comprising:

a) a first temperature sensor, operatively connected to a central processing board, configured to generate first temperature measurement information at a first sampling rate, wherein the first temperature measurement information is associated with a first temperature at the first temperature sensor during a first period of time defined by a first start time and a first end time;

b) a second temperature sensor, operatively connected to the central processing board, configured to generate second temperature measurement information at the first sampling rate, wherein the second temperature measurement information is associated with a second temperature at the second temperature sensor during the first period of time;

c) a first wind speed sensor, operatively connected to the central processing board, configured to generate first wind speed measurement information at the first sampling rate, wherein the first wind speed measurement information is associated with a first wind speed at the first wind speed sensor during the first period of time;

d) a first barometric pressure sensor, operatively connected to the central processing board, configured to generate first barometric pressure measurement information at the first sampling rate, wherein the first barometric pressure measurement information is associated with a first barometric pressure at the first barometric pressure sensor during the first period of time;

e) the central processing board, configured to:

i. receive, from the first temperature sensor, the first temperature measurement information generated during the first period of time;

ii. receive, from the second temperature sensor, the second temperature measurement information generated during the first period of time;

iii. receive, from the first wind speed sensor, the first wind speed measurement information generated during the first period of time;

iv. receive, from the first barometric pressure sensor, the first barometric pressure measurement information generated during the first period of time;

v. store, in memory operatively connected to the central processing board, the first temperature measurement information, the second temperature measurement information, the first wind speed measurement information, and the first barometric pressure measurement information;

f) a digital software system operably connected to the memory, wherein the digital software system is configured to:

i. obtain from the memory the first temperature measurement information, the second temperature measurement information, the first wind speed measurement information, and the first barometric pressure measurement information;

ii. determine:

1. first power spectral density information associated with a first plurality of frequencies based at least on the first temperature measurement information;

2. second power spectral density information associated with the first plurality of frequencies based at least on the first wind speed measurement information;

3. a first sensor cutoff frequency associated with at least one of the first temperature sensor and the first wind speed sensor; and 4. third power spectral density information associated with the first plurality of frequencies based at least on the second temperature measurement information;

iii. decimate the first temperature measurement information, the first wind speed measurement information, and the first barometric pressure measurement information to a second sampling rate during the first period of time based at least on the first power spectral density information, the second power spectral density information, and the first sensor cutoff frequency;

iv. decimate the second temperature measurement information to the second sampling rate based at least on the third power spectral density information;

v. calculate a first estimated sensor spacing value based at least on the decimated first wind speed measurement information, and the first start time and the first end time associated with the first period of time;

vi. determine a first temperature structure coefficient based at least on the first estimated sensor spacing value and the decimated first temperature measurement information during the first period of time;

vii. determine a second temperature structure coefficient based at least on the first estimated sensor spacing value and the decimated second temperature measurement information during the first period of time;

viii. determine a first refractive-index structure coefficient indicative of optical turbulence during the first period of time based at least on the first temperature structure coefficient, the decimated first temperature measurement information, and the decimated first barometric pressure measurement information;

ix. determine a second refractive-index structure coefficient indicative of optical turbulence during the first period of time based at least on the second temperature structure coefficient, the decimated second temperature measurement information, and the first barometric pressure measurement information; and x. transmit, to an optical system, the first refractive-index structure coefficient and the second refractive-index structure coefficient.

14. The unmanned aerial vehicle of claim 13, wherein the first temperature sensor is an anemometer temperature sensor.

15. The unmanned aerial vehicle of claim 14, wherein the second temperature sensor is a first differential temperature sensor.

16. The unmanned aerial vehicle of claim 13, wherein the third power spectral density information is determined based on a Fourier transform of the decimated second temperature measurement information.

17. The unmanned aerial vehicle of claim 13, wherein the first sensor cutoff frequency is associated with the second temperature sensor and is based at least on the third power spectral density information.

18. The unmanned aerial vehicle of claim 17, wherein the first sensor cutoff frequency is determined based at least on a linear relationship between the third power spectral density information and the first plurality of frequencies.

19. The unmanned aerial vehicle of claim 13, wherein the second temperature structure coefficient is determined by the formula:

$$C_{T2}^2 = \frac{-8/3\Phi_1\left(2\pi/U_m\right)}{f_1^{-2/3}}$$

wherein $$C_{T2}^2$$

is the second temperature structure coefficient, $\Phi_1$ is a first temperature power spectrum, $f_1$ is a first spectral frequency range information, and $U_m$ is a first wind speed value from the first wind speed measurement information.

20. The unmanned aerial vehicle of claim 19, wherein the second refractive-index structure coefficient is determined by the formula:

$$C_{n2}^2 = \left[79\frac{P}{T_1^2}\right]^2 \times 10^{-12}C_{T2}^2$$

wherein $C_{n2}^2$ is the second refractive-index structure coefficient, P is a first barometric pressure value based on the first barometric pressure measurement information, $T_1$ is a first temperature measurement value based on the first temperature measurement information, and $$C_{T2}^2$$

is the second temperature structure coefficient.

21. The unmanned aerial vehicle of claim 20, wherein the digital software system determines the second refractive-index structure coefficient based at least on the second temperature structure coefficient, the second temperature measurement information, and the first barometric pressure measurement information; and the second refractive-index structure coefficient is determined by the formula:

$$C_{n2}^2 = \left[79\frac{P}{T_2^2}\right]^2 \times 10^{-12}C_{T2}^2$$

wherein $C_{n2}^2$ is the second refractive-index structure coefficient, P is the first barometric pressure value based on the first barometric pressure measurement information, $T_2$ is a second temperature measurement value based on the second temperature measurement information, and $$C_{T2}^2$$

is the second temperature structure coefficient.

* * * * *